US005493514A

United States Patent [19]

Keith et al.

[11] Patent Number: 5,493,514

[45] Date of Patent: Feb. 20, 1996

[54] PROCESS, APPARATUS, AND SYSTEM FOR ENCODING AND DECODING VIDEO SIGNALS

[75] Inventors: Michael Keith, Beaverton; Brian Nickerson, Aloha, both of Oreg.

[73] Assignee: Intel Corporation, Santa Clara, Calif.

[21] Appl. No.: 235,955

[22] Filed: Apr. 28, 1994

Related U.S. Application Data

[63] Continuation-in-part of Ser. No. 158,855, Nov. 24, 1993.

[51] Int. Cl.[6] .................................... G06F 17/00

[52] U.S. Cl. .................................... 364/514 R; 364/514 A

[58] Field of Search .................... 364/514 R, 514 A; 348/13, 15, 19, 409, 416, 469; 395/155; 360/33.1; 358/426

[56] References Cited

U.S. PATENT DOCUMENTS

| | | | |
|---|---|---|---|
| 5,124,688 | 1/1992 | Rumball | 348/660 |
| 5,177,608 | 1/1993 | Ohki et al. | 348/416 |
| 5,220,410 | 6/1993 | Wakeland et al. | 348/472 |
| 5,241,382 | 8/1993 | Palka et al. | 348/472 |
| 5,311,602 | 5/1994 | Nieglos et al. | 358/426 |
| 5,317,397 | 5/1994 | Odaka et al. | 348/416 |
| 5,327,254 | 7/1994 | Daher | 358/426 |
| 5,351,085 | 9/1994 | Coolho et al. | 348/409 |
| 5,377,051 | 12/1994 | Lang et al. | 360/33.1 |
| 5,381,145 | 1/1995 | Allen et al. | 358/426 |

*Primary Examiner*—Ellis B. Ramirez
*Attorney, Agent, or Firm*—Steve Mendelsohn; William H. Murray

[57] ABSTRACT

For encoding, each video frame is segmented into slices; each slice, into macroblocks; and each macroblock, into blocks. Encoded macroblock and block signals are generated corresponding to macroblock and block information of each slice, respectively. An encoded bitstream is generated in accordance with the encoded macroblock and block signals, wherein all of the macroblock signals for each slice precede all of the block signals for each slice. For decoding, an encoded bitstream is received, wherein (1) a portion of the encoded bitstream corresponding to each video frame corresponds to slices; and (2) a portion of the encoded bitstream corresponding to each slice comprises encoded macroblock signals followed by block signals for the entire slice. The macroblock and block signals of each slice are decoded and decoded video signals are generated in accordance with the decoded macroblock and block signals.

43 Claims, 33 Drawing Sheets

FIG. 6

| | | | | | | | |
|---|---|---|---|---|---|---|---|
| 0 | 1 | 5 | 6 | 14 | 15 | 27 | 28 |
| 2 | 4 | 7 | 13 | 16 | 26 | 29 | 42 |
| 3 | 8 | 12 | 17 | 25 | 30 | 41 | 43 |
| 9 | 11 | 18 | 24 | 31 | 40 | 44 | 53 |
| 10 | 19 | 23 | 32 | 39 | 45 | 52 | 54 |
| 20 | 22 | 33 | 38 | 46 | 51 | 55 | 60 |
| 21 | 34 | 37 | 47 | 50 | 56 | 59 | 61 |
| 35 | 36 | 48 | 49 | 57 | 58 | 62 | 63 |

FIG. 15

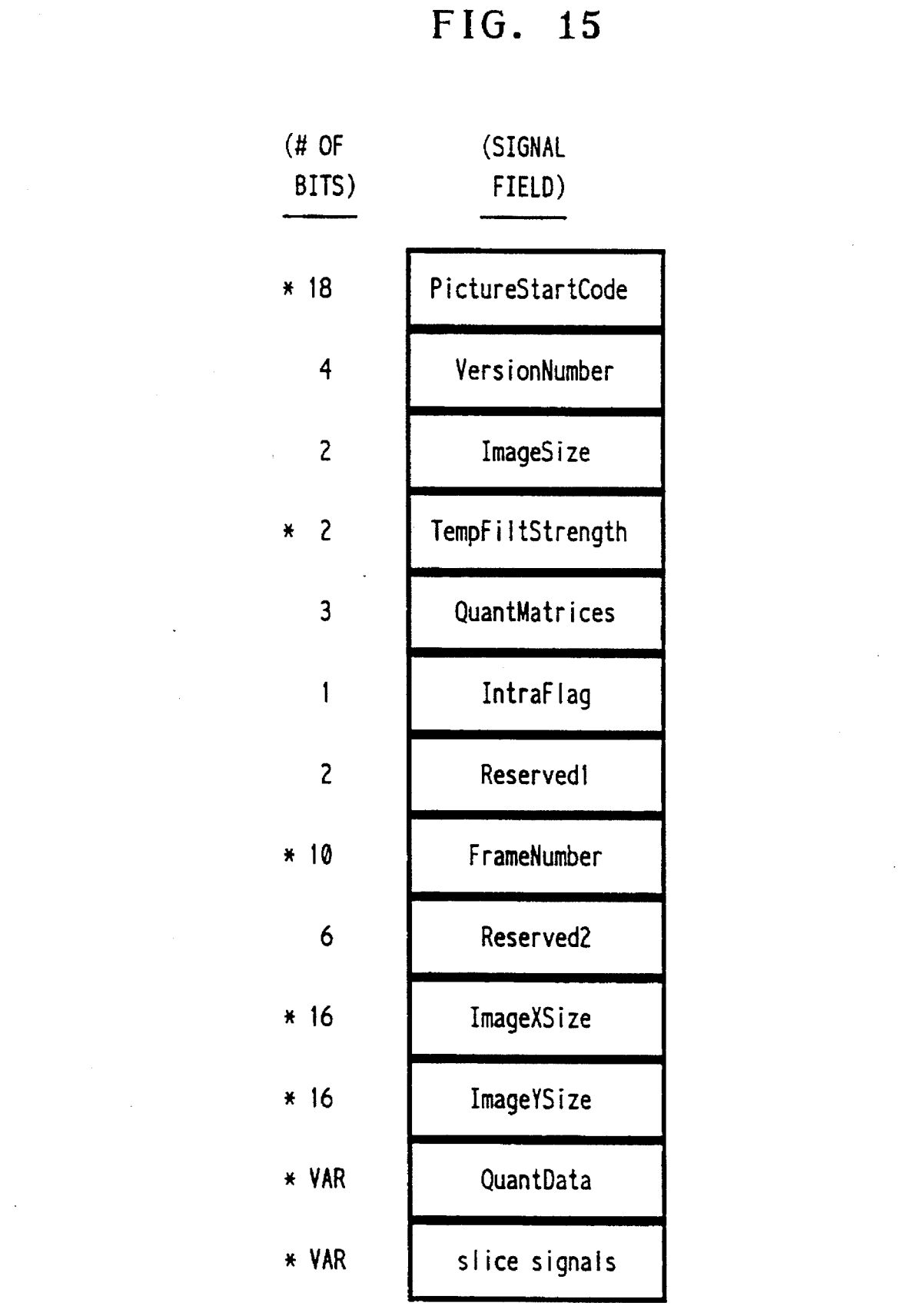

| (# OF BITS) | (SIGNAL FIELD) |
|---|---|
| * 18 | PictureStartCode |
| 4 | VersionNumber |
| 2 | ImageSize |
| * 2 | TempFiltStrength |
| 3 | QuantMatrices |
| 1 | IntraFlag |
| 2 | Reserved1 |
| * 10 | FrameNumber |
| 6 | Reserved2 |
| * 16 | ImageXSize |
| * 16 | ImageYSize |
| * VAR | QuantData |
| * VAR | slice signals |

FIG. 16

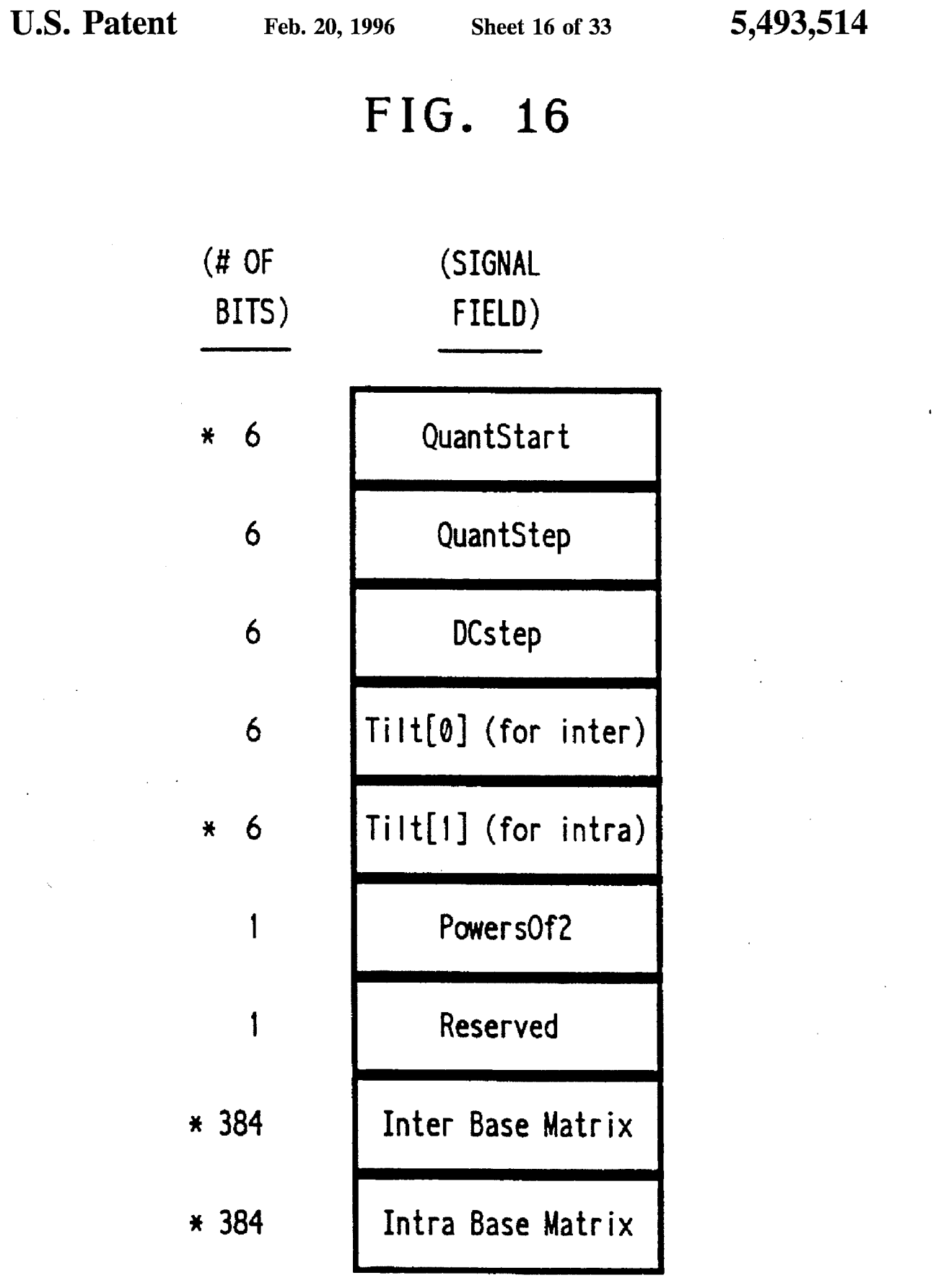

| (# OF BITS) | (SIGNAL FIELD) |
|---|---|
| * 6 | QuantStart |
| 6 | QuantStep |
| 6 | DCstep |
| 6 | Tilt[0] (for inter) |
| * 6 | Tilt[1] (for intra) |
| 1 | PowersOf2 |
| 1 | Reserved |
| * 384 | Inter Base Matrix |
| * 384 | Intra Base Matrix |

FIG. 24

COLUMN

| ROW | 0 | 1 | 2 | 3 | 4 | 5 | 6 | 7 |
|---|---|---|---|---|---|---|---|---|
| 0 | 106+106 (212) | 106+48 (154) | 106+8 (114) | 106+64 (170) | 106+28 (134) | 106+8 (114) | 106+6 (112) | 106+14 (120) |
| 1 | 48 | 48 | 48 | 48 | 48 | 48 | 48 | 48 |
| 2 | 8 | 8 | 8 | 8 | 8 | 8 | 8 | 8 |
| 3 | 64 | 64 | 64 | 64 | 64 | 64 | 64 | 64 |
| 4 | 28 | 28 | 28 | 28 | 28 | 28 | 28 | 28 |
| 5 | 8 | 8 | 8 | 8 | 8 | 8 | 8 | 8 |
| 6 | 6 | 6 | 6 | 6 | 6 | 6 | 6 | 6 |
| 7 | 14 | 14 | 14 | 14 | 14 | 14 | 14 | 14 |

```
    31 30 29 28 27 26 25 24 23 22 21 20 19 18 17 16 15 14 13 12 11 10  9  8  7  6  5  4  3  2  1  0
2602 0  0  0  0  0  0  0  0  0  0  0  0  0  1  1  0  1  0  1  0  0  0  0  0  0  0  0  0  0  0  0  0
                                       |←———— BIAS SIGNAL ————→|
```

```
    31 30 29 28 27 26 25 24 23 22 21 20 19 18 17 16 15 14 13 12 11 10  9  8  7  6  5  4  3  2  1  0
2604 1  1  1  1  1  1  1  1  1  1  1  1  1  1  1  1  1  1  1  1  1  1  1  1  1  1  1  0  1  1  0  1  1
    |←——————————————— UNBIASED LOW-ORDER SIGNAL ———————————————→|
```

COLUMN

| ROW | 0 | 1 | 2 | 3 | 4 | 5 | 6 | 7 |
|---|---|---|---|---|---|---|---|---|
| 0 | X | O | X | O | O | O | O | O |
| 1 | O | X | O | X | O | O | O | O |
| 2 | X | O | O | O | O | O | O | O |
| 3 | O | X | O | O | O | O | O | O |
| 4 | O | O | O | O | O | O | O | O |
| 5 | X | O | O | O | O | O | O | O |
| 6 | O | O | O | O | O | O | O | O |
| 7 | O | O | O | O | O | O | O | O |

2900

| COL 0 | COL 1 | COL 2 | COL 3 | COL 4 | COL 5 | COL 6 | COL 7 |
|---|---|---|---|---|---|---|---|
| 1 | 0 | 1 | 0 | 0 | 0 | 0 | 0 |
| 0 | 1 | 0 | 1 | 0 | 0 | 0 | 0 |
| 1 | 1 | 0 | 0 | 0 | 0 | 0 | 0 |
| 1 | 0 | 0 | 0 | 0 | 0 | 0 | 0 |

PROCESS, APPARATUS, AND SYSTEM FOR ENCODING AND DECODING VIDEO SIGNALS

CROSS-REFERENCES TO RELATED APPLICATIONS

This is a continuation-in-part of co-pending application Ser. No. 08/158,855, filed on Nov. 24, 1993, entitled "Computer-Implemented Process and System for Decompressing a Compressed Image," the entire disclosure of which is incorporated herein by reference.

BACKGROUND OF THE INVENTION

1. Field of the Invention

The present invention relates to video processing, and, in particular, to computer-implemented processes, apparatuses, and systems for compressing and decompressing video signals for applications with limited transmission, storage, and/or processing capacities.

2. Description of the Related Art

It is desirable to provide real-time video conferencing over a conferencing network in which each node in the network is a personal computer (PC) system. Each PC-based node transmits and receives video signals with each other PC-based node over a communications link. Conventional communications links include, but are not limited to, a local area network (LAN) or an integrated services digital network (ISDN) line.

Conventional communications links have finite transmission bandwidth. In order to provide video conferencing of sufficient quality, it is desirable to apply compression processing to the video signals to reduce the amount of information used to represent each frame of the video stream for transmission. Decompression processing is then applied by the receiving node to reconstruct each video frame for display.

In addition, conventional PC-based conferencing systems have finite processing bandwidth in which to implement the video compression and decompression processes. It is therefore further desirable to provide video compression and decompression processes that may be implemented in real time on PC-based conferencing systems to provide video conferencing of sufficient quality.

It is accordingly an object of this invention to provide computer-based processes, apparatuses, and systems for performing video compression and decompression processing to provide real-time video conferencing of sufficient quality over a video conferencing network comprising nodes of finite processing bandwidth and communications links of finite transmission bandwidth.

Further objects and advantages of this invention will become apparent from the detailed description of a preferred embodiment which follows.

SUMMARY OF THE INVENTION

The present invention is a computer-implemented process, apparatus, and system for encoding video signals comprising a plurality of video frames. Each video frame of the plurality of video frames is segmented into one or more slices; each slice is segmented into one or more macroblocks; and each macroblock is segmented into one or more blocks. Encoded macroblock signals are generated corresponding to macroblock information of each slice and encoded block signals are generated corresponding to block information of each slice. An encoded bitstream is generated in accordance with the encoded macroblock signals and the encoded block signals, wherein all of the macroblock signals for each slice precede all of the block signals for each slice.

The present invention is also a computer-implemented process, apparatus, and system for decoding video signals. An encoded bitstream corresponding to a plurality of video frames is received, wherein (1) a portion of the encoded bitstream corresponding to each video frame of the plurality of video frames corresponds to one or more slices; and (2) a portion of the encoded bitstream corresponding to each slice comprises encoded macroblock signals for the entire slice followed by block signals for the entire slice. The macroblock signals and the block signals of each of the slices of each of the video frames are decoded and decoded video signals are generated in accordance with the decoded macroblock signals and the decoded block signals.

BRIEF DESCRIPTION OF THE DRAWINGS

Other objects, features, and advantages of the present invention will become more fully apparent from the following detailed description of the preferred embodiment, the appended claims, and the accompanying drawings in which:

FIG. 6 is a representation of a preferred zig-zag scanning sequence for run-length encoding for the processing of FIG. 4;

FIG. 15 is a representation of the bitstream format of the compressed video signals generated by the pixel processor of FIG. 3 and decoded by the host processor of FIG. 2;

FIG. 16 is a representation of the bitstream format of the QuantData signal of the compressed video signal format of FIG. 15;

FIG. 24 is a representation of the preferred bias values corresponding to the (8×8) blocks of DST coefficients for the pseudo-SIMD inverse DST processing of the present invention;

FIG. 28 is a representation of an illustrative example of an (8×8) block of DST coefficients;

DESCRIPTION OF THE PREFERRED EMBODIMENT(S)

Point-To-Point Conferencing Network

Figure 1:
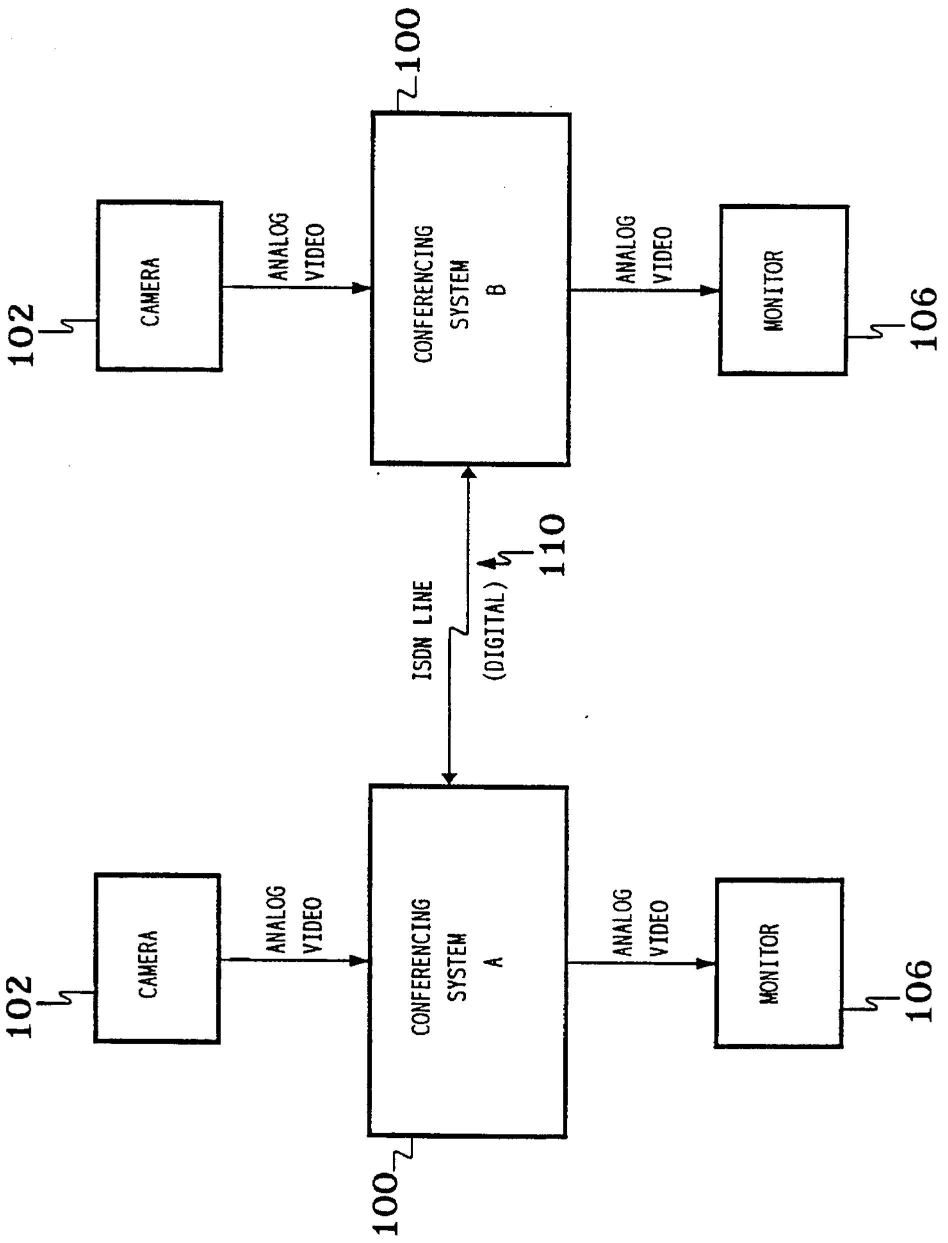
FIG. 1 is a block diagram representing real-time point-to-point video conferencing between two PC systems, according to a preferred embodiment of the present invention.

Referring now to FIG. 1, there is shown a block diagram representing real-time point-to-point video conferencing between two PC systems, according to a preferred embodiment of the present invention. Each PC system has a conferencing system 100, a camera 102, and a monitor 106. The conferencing systems communicate via an integrated services digital network (ISDN) line 110. Each conferencing system 100 receives, digitizes, and compresses the analog video signals generated by camera 102. The compressed digital video signals are transmitted to the other conferencing system via ISDN line 110, where they are decompressed and converted for display in a window on monitor 106. Each conferencing system 100 may also display the locally generated video signals in a separate window on monitor 106 for monitoring of the local video processing.

Camera 102 may be any suitable camera for generating NTSC or PAL analog video signals. Those skilled in the art will understand that, in alternative embodiments of the present invention, camera 102 may be replaced by any other suitable source of unencoded video signals, such as a VCR for playing back recorded unencoded video signals or an antenna or cable for receiving unencoded video signals from a remote location. Monitor 106 may be any suitable monitor for displaying video and graphics images and is preferably a VGA monitor.

Conferencing System Hardware Configuration

Figure 2:
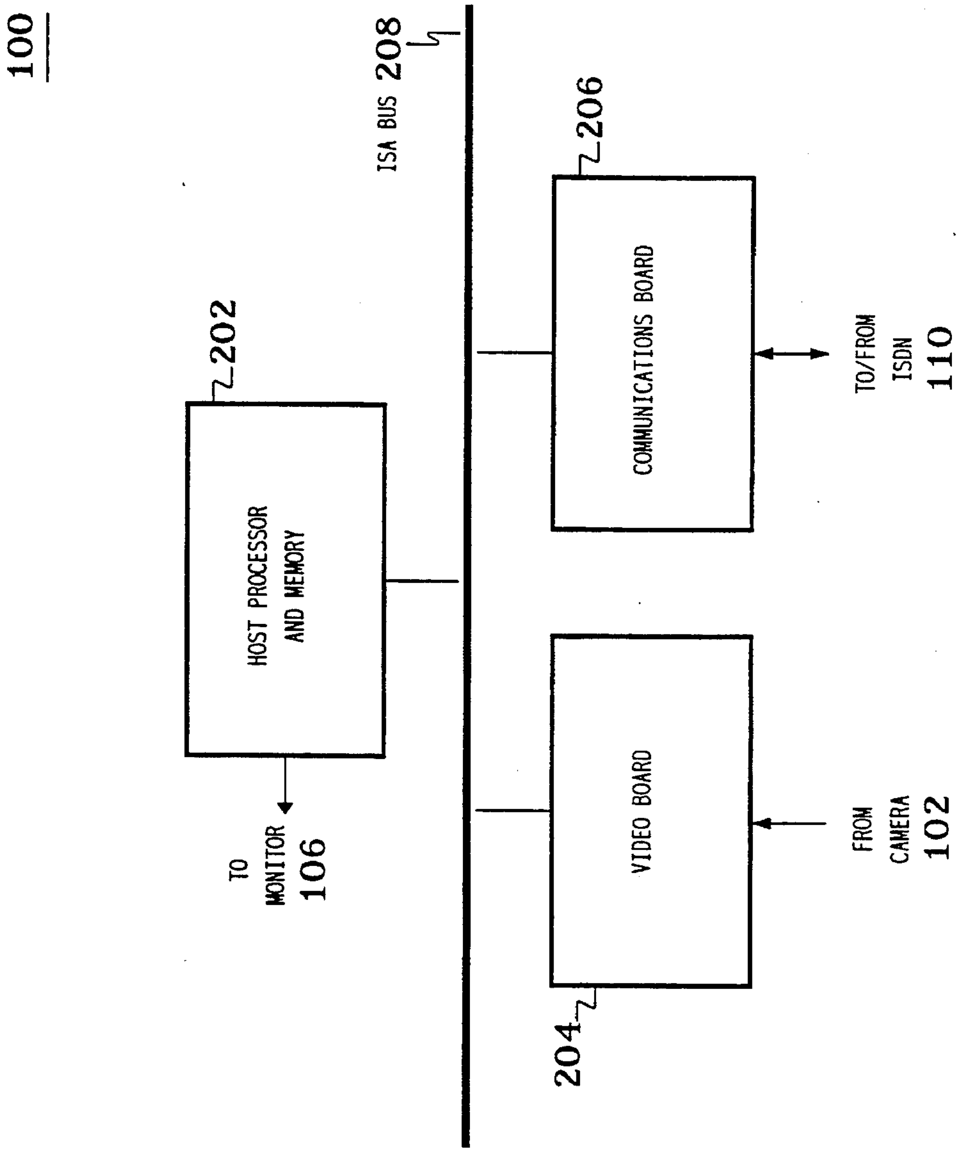
FIG. 2 is a block diagram of the hardware configuration of the conferencing system of each PC system of FIG. 1.

Referring now to FIG. 2, there is shown a block diagram of the hardware configuration of each conferencing system 100 of FIG. 1, according to a preferred embodiment of the present invention. Each conferencing system 100 comprises host processor 202, video board 204, communications board 206, and ISA bus 208.

Figure 3:
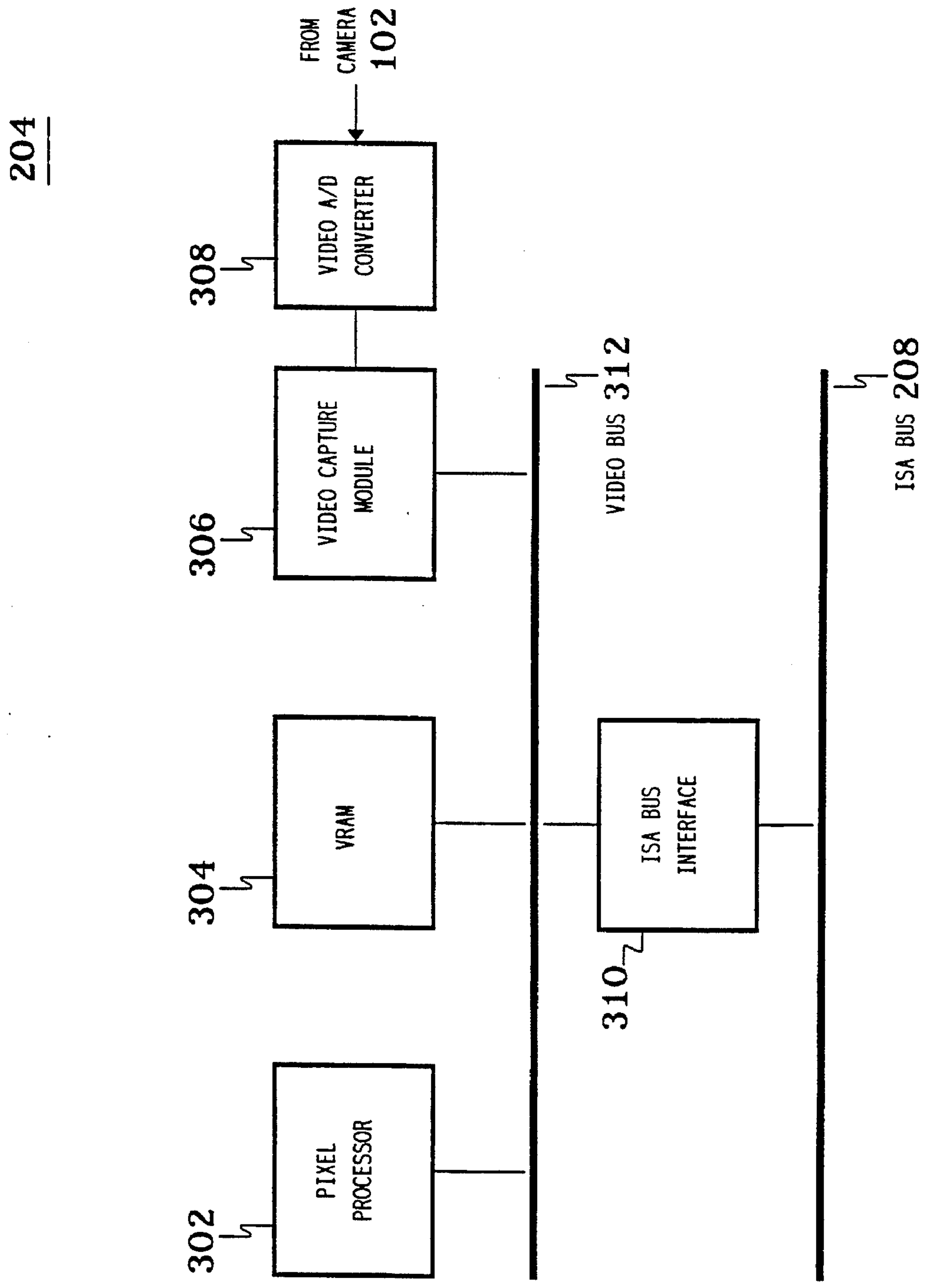
FIG. 3 is a block diagram of the hardware configuration of the video board of the conferencing system of FIG. 2.

Referring now to FIG. 3, there is shown a block diagram of the hardware configuration of video board 204 of FIG. 2, according to a preferred embodiment of the present invention. Video board 204 comprises industry standard architecture (ISA) bus interface 310, video bus 312, pixel processor 302, video random access memory (VRAM) device 304, video capture module 306, and video analog-to-digital (A/D) converter 308.

Video Signal Processing

Referring to FIGS. 2 and 3, software running on host processor 202 provides the top-level local control of video conferencing between a local conferencing system (i.e., local site, local node, or local endpoint) and a remote conferencing system (i.e., remote site, remote node, or remote endpoint). Host processor 202 controls local video signal processing and establishes links with the remote site for transmitting and receiving audio and video signals over the ISDN.

During video conferencing, video A/D converter 308 of video board 204 digitizes analog video signals received from camera 102 and transmits the resulting digitized video to video capture module 306. Video capture module 306 decodes the digitized video into YUV color components and delivers subsampled digital YUV9 video bitmaps to VRAM 304 via video bus 312. Video microcode running on pixel processor 302 compresses the subsampled video bitmaps and stores the resulting compressed video signals back to VRAM 304. ISA bus interface 310 then transmits via ISA bus 208 the compressed video to host processor 202. Host processor 202 transmits the compressed video signals to communications board 206 via ISA bus 208 for transmission to the remote site over ISDN line 110.

In addition, communications board 206 receives from ISDN line 110 compressed video signals generated by the remote site and transmits the compressed video signals to host processor 202 via ISA bus 208. Host processor 202 decompresses the compressed video signals and transmits the decompressed video to the graphics device interface (GDI) (not shown) of the operating system (for example, Microsoft® Windows) for eventual display in a display window on monitor 106.

Those skilled in the art will understand that, if there is sufficient processing bandwidth, the video compression processing of the present invention may alternatively be implemented in a host processor such as host processor 202. Similarly, the video decompression processing of the present invention may alternatively be implemented in a pixel processor such as pixel processor 302.

Preferred Hardware Configuration for Conferencing System

Referring again to FIG. 2, host processor 202 may be any suitable general-purpose processor and is preferably an Intel® processor such as an Intel® i486™ or Pentium™ microprocessor. Host processor 202 preferably has at least 8 megabytes of host memory. Bus 208 may be any suitable digital communications bus and is preferably an Industry Standard Architecture (ISA) PC bus. Communications board 206 may be any suitable hardware/software for performing communications processing for conferencing system 100.

Referring again to FIG. 3, video A/D converter 308 of video board 204 may be any standard hardware for digitizing and decoding analog video signals that are preferably NTSC or PAL standard video signals. Video capture module 306 may be any suitable device for capturing digital video color component bitmaps and is preferably an Intel® ActionMedia® II Capture Module. Video capture module 306 preferably captures video as subsampled 4:1:1 YUV bitmaps (i.e., YUV9 or YVU9). Memory 304 may be any suitable computer memory device for storing data during video processing such as a random access memory (RAM) device and is preferably a video RAM (VRAM) device with at least 1 megabyte of data storage capacity. Pixel processor 302 may be any suitable processor for compressing video data and is preferably an Intel® pixel processor such as an Intel® i750® Pixel Processor. Video bus 312 may be any suitable digital communications bus and is preferably an Intel® DVI® bus. ISA bus interface 310 may be any suitable interface between ISA bus 208 and video bus 312, and preferably comprises three Intel® ActionMedia® Gate Arrays and ISA configuration jumpers.

Video Signal Encoding

Figure 4:
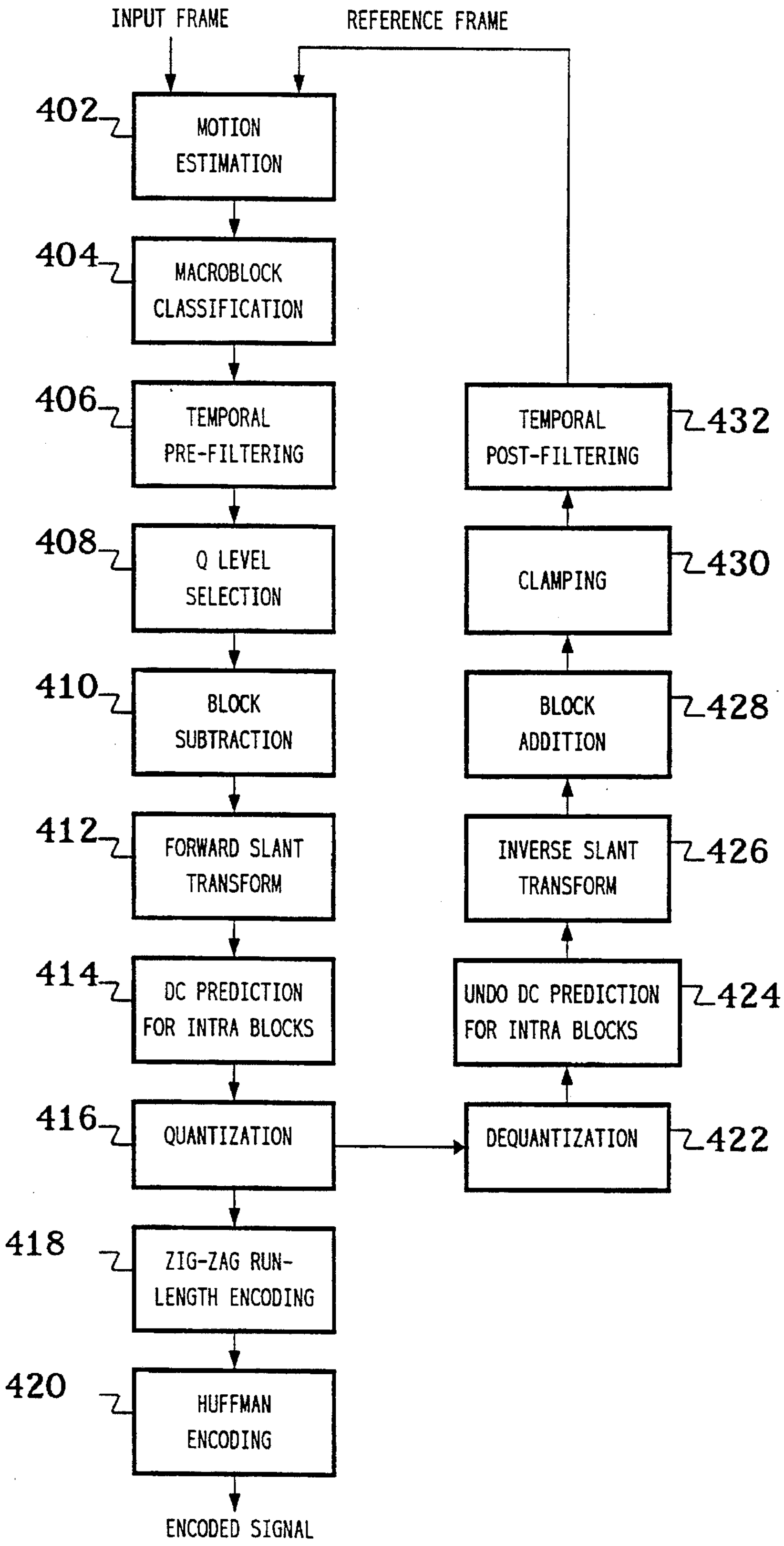
FIG. 4 is a top-level flow diagram of the processing implemented by the pixel processor of FIG. 3 to compress subsampled YUV9 video signals.

Referring now to FIG. 4, there is shown a top-level flow diagram of the processing implemented by pixel processor 302 of FIG. 3 to compress (i.e., encode) the subsampled YUV9 video signals generated by video capture module 306 and stored to VRAM 304, according to a preferred embodiment of the present invention. YUV9 video signals comprise sequences of video frames having three planes of 8-bit component signals (Y, U, and V) with U and V subsampled by 4× in both directions. Thus, for every (4×4) block of Y component signals, there is one U component signals and one V component signal.

Pixel processor 302 preferably encodes each component plane independently for each video frame with no grouping or interleaving of the component signals. The component planes are preferably encoded in the order Y, V, and U. For purposes of encoding, each component plane is subdivided into a grid of (16×16) macroblocks. Each macroblock is further divided into a set of four (8×8) blocks.

Each component plane may be divided into one or more slices, where each slice comprises a integer number of rows of macroblocks. A slice may not span different component planes. The segmentation of component planes into slices may be dictated by such parameters as the transmission bandwidth and reliability of the communications line between nodes in the conferencing network, the processing bandwidth of decoders, and the video quality requirements of the video conferencing. These factors contribute to the selection of numbers of rows of macroblocks to be encoded into a single slice.

Figure 5:
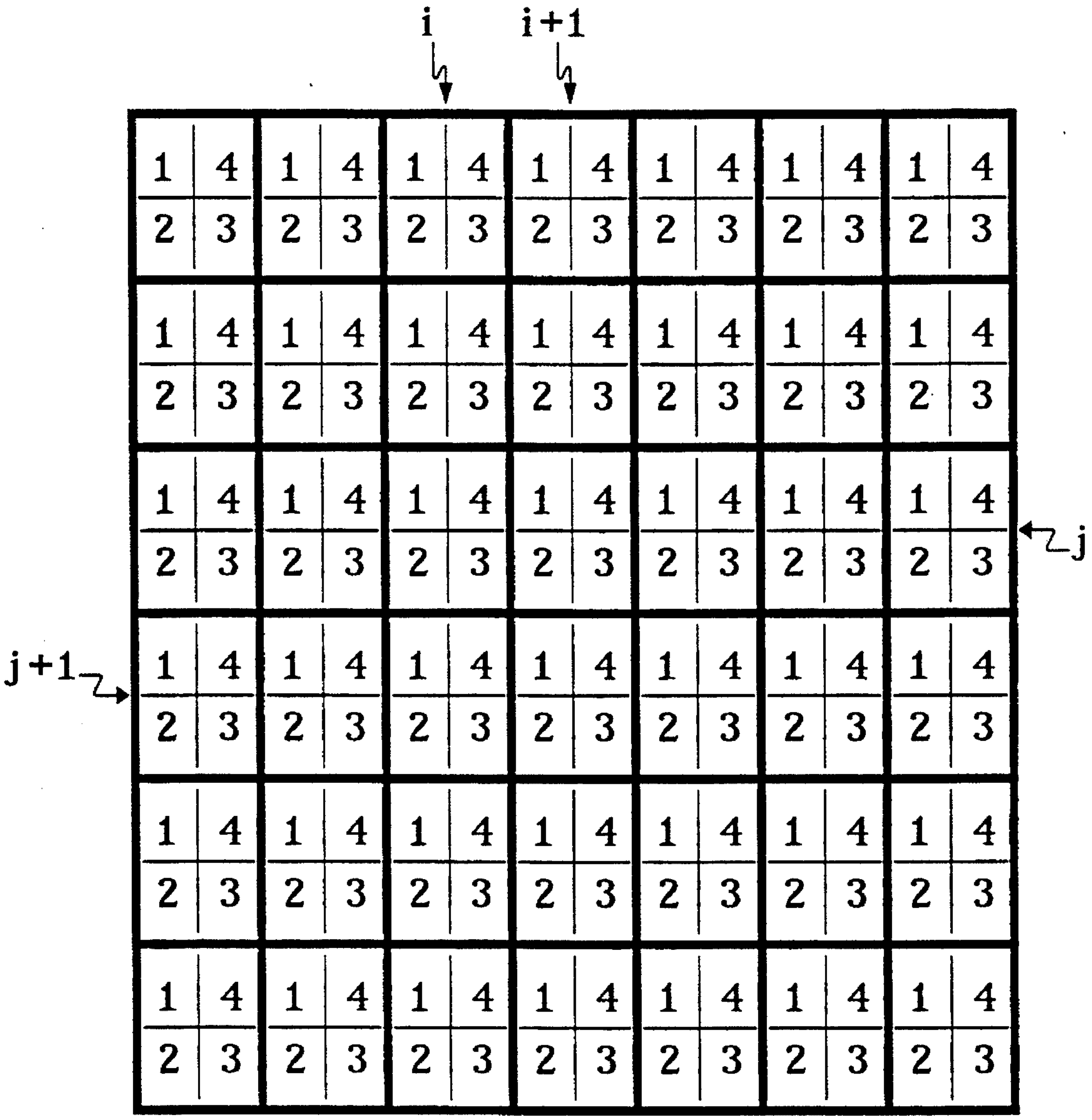
FIG. 5 is a representation of a preferred sequence of processing the blocks and macroblocks of each component plane of each video frame during video encoding.

Referring now to FIG. 5, there is shown a representation of a preferred sequence of processing the blocks and macroblocks of each component plane of each video frame during encoding (and decoding). The macroblocks of each component plane are traversed in raster-scan order starting at the top-left corner (i.e., macroblock i+1 immediately following macroblock i and macroblock j+1 immediately following macroblock j), while the blocks within each macroblock are processed in the order top-left (block 1), bottom-left (block 2), bottom-right (block 3), and top-right (block 4). As a result, for adjacent macroblocks i and i+1, block 4 of macroblock i is adjacent to block 1 of macroblock i+1.

If the width (i.e., number of columns) of a component plane is not evenly divisible by 16, then partial macroblocks are preferably added at the right edge of the plane. Similarly, if the height (i.e., number of rows) of a component plane is not evenly divisible by 16, then partial macroblocks are preferably added at the bottom edge of the plane. If either dimension is not evenly divisible by 8, then partial blocks are preferably added at the appropriate edges.

The encoder (i.e., preferably pixel processor 302 of FIG. 3) preferably encodes partial blocks by padding them out to the full (8×8) size (using a selected method such as replicating the last column or row). The resulting padded blocks are encoded as if they were originally full blocks. The decoder (i.e., preferably host processor 202 of FIG. 2) reconstructs an original partial block by decoding the full (8×8) padded block and then saving only the appropriate partial block to the final image bitmap in memory. The decoder determines the location and size of partial blocks from the image dimensions which are encoded in the compressed video signal, as described in further detail later in this specification in conjunction with FIG. 15.

Blocks that are part of partial macroblocks but which lie completely outside the image are called "phantom blocks." Phantom blocks are preferably not encoded and are therefore not processed by the decoder.

Referring again to FIG. 4, the encoder begins video signal encoding for the current input frame by performing motion estimation (step 402 of FIG. 4). Motion estimation generates a motion vector for each (16×16) macroblock of each component plane of the current frame. The motion vector specifies the (16×16) macroblock of the reference frame that most closely matches the macroblock of the current frame (within specified ranges of allowable motion). The reference frame (i.e., companded frame) is the result of compressing and expanding the previous input frame. Motion estimation is described in further detail later in this specification in the section entitled "Motion Estimation."

After motion estimation, each macroblock is classified as to whether it is to be encoded as an inter macroblock or an intra macroblock (step 404). An inter macroblock is encoded with respect to the corresponding motion-compensated macroblock of the reference frame. An intra macroblock is not encoded with respect to any previous frame. The classification of macroblocks as inter and intra is described in further detail later in this specification in the section entitled "Macroblock Classification."

After macroblock classification, a temporal pre-filter is applied to the current input frame (step 406). The temporal pre-filter is described in further detail later in this specification in the section entitled "Temporal Pre-Filtering."

After temporal pre-filtering, a quantization level is selected for each macroblock (step 408). The quantization level identifies the quantization table used in quantization (step 416), as described below. Selection of quantization level is described in further detail later in this specification in the section entitled "Quantization Level Selection."

Block subtraction is then applied to all those (8×8) blocks that are part of macroblocks to be encoded as inter macroblocks (step 410). Block subtraction involves generating the differences between the components of a temporally pre-filtered block of the current frame and the corresponding components of the corresponding motion-compensated block of the reference frame.

A forward discrete slant transform (FDST) is then applied (step 412). For inter blocks, the FDST is applied to the component differences generated during block subtraction. For intra blocks, the FDST is applied to the temporally pre-filtered component values. The forward (and inverse) discrete slant transforms are described in further detail later in this specification in the section entitled "Discrete Slant Transform." The result of applying the FDST to an (8×8) block in the pixel component domain is an (8×8) block of DST coefficients in the spatial frequency domain.

If the current block is an intra block, then the DC coefficient (i.e., the (0,0) DST coefficient in the (8×8) block) is encoded as a predicted value with respect to prevDC, where prevDC is the DC coefficient of the previous intra block in the current slice (following the block scanning sequence of FIG. 5) (step 414). The value that is encoded is the difference between the DC coefficient for the current block and prevDC. The value of prevDC is preferably initialized to 8*64 or 512 at the start of each image slice. Those skilled in the art will understand that this preferred initial value for prevDC represents the gray level midway between 0 and 127, times 8 (to scale the integer arithmetic to allow three fractional bits).

Quantization is then applied to the blocks of DST coefficients (step 416) using the quantization table previously selected for the current block (in step 408) the current DST coefficient. Those skilled in the art will understand that, for typical blocks of YUV video component signals, many of the 64 DST coefficients are close enough to zero to be represented in the compressed video bitstream as zero without significant loss of video quality at playback. Quantization is described in further detail later in this specification in the section entitled "Quantization."

After quantization, the quantized DST coefficients are run-length encoded using the zig-zag scan sequence represented in FIG. 6 (step 418). The quantized DST coefficients are run-length encoded as run-val pairs comprising a run of sequential zero DST coefficients followed by a non-zero quantized DST coefficient. Common run-val pairs may be further encoded as a single value that represents an index to a run table and a val table.

The run-val pairs (or run-val table indices) are then variable-length encoded using Huffman encoding (step 420) to generate the block signals of the encoded video bitstream. Huffman encoding is also used to encode the macroblock signals of the encoded video bitstream. Variable-length encoding are described in further detail later in this specification in the section entitled "Variable-Length Encoding." The resulting Huffman encoded signals for the macroblocks and blocks are then combined with slice and picture header signals to form the compressed video bitstream. The compressed video bitstream format is described in further detail later in this specification in the section entitled "Compressed Video Signal Format."

A reference frame is generated corresponding to the current input frame for use in encoding the next input frame. The reference frame is generated by decoding the encoded video frame corresponding to the current input frame. Since zig-zag run-length encoding (step 418 of FIG. 4) and Huffman encoding (step 420) are lossless procedures (i.e., no information is lost), generation of the reference frame preferably begins with the quantized DST coefficients (generated at step 416).

The quantized DST coefficients are dequantized (step 422), the DC prediction for intra blocks is undone (step 424), and the inverse discrete slant transform (IDST) is applied to the resulting dequantized DST coefficients (step 426). If the block was encoded as an inter block, then block addition is performed to add the IDST results to the corresponding motion-compensated block of the previous reference frame (step 428). If the block was encoded as an intra block, then no block addition is performed. In either case, clamping is performed (step 430) and a temporal post-filter (corresponding to the temporal pre-filter) is applied to the clamped results (step 432). Clamping limits the signals to be within a specified range, preferably between 8 and 120, inclusive. Temporal post-filtering is described in further detail later in this specification in the section entitled "Temporal Post-Filtering." The output of the temporal post-filter is the reference frame used to encode the next input frame.

Those skilled in the art will understand that, in alternative preferred embodiments, the reference frame may be generated from the encoded video frame by pixel processor 302 or by host processor 202.

Motion Estimation

As described above in reference to step 402 of FIG. 4, the encoder performs motion estimation to identify, for each (16×16) target macroblock of the current image, a (16×16) macroblock from the reference image that matches (relatively closely) the target macroblock. In general, the encoder implements motion estimation as a three-step log search to identify a motion vector within a specified pixel range of the current macroblock. According to a preferred embodiment, the pixel range is specified as +/−7 pixels in the horizontal and vertical directions.

Motion estimation preferably is based on the sum of absolute differences (SAD(i,j)) between the component signals of the target macroblock and the component signals of the macroblock in the reference frame corresponding to the motion vector (i,j). In a preferred embodiment, only 64 of the possible 256 component differences are used to compute the SAD. These 64 differences preferably correspond to every other row and every other column starting at one corner of the (16×16) macroblock.

A preferred three-step log search is implemented for each target macroblock of the current image as follows:

(1) Compute SAD(0,0) between the target macroblock and the macroblock in the reference image corresponding to a motion vector of (0,0).

(2) If SAD(0,0) is less than a specified threshold (preferably 192 (corresponding to an average component difference magnitude of 3 for the 64 differences)), then select (0,0) as the motion vector for the target macroblock and terminate motion estimation for the current target macroblock.

(3) Otherwise, compute SAD(i,j) between the target macroblock and the macroblocks in the reference image corresponding to the motion vectors (−4,−4), (0,−4), (4,−4), (−4,0), (4,0), (−4,4), (0,4), and (4,4).

(4) Select the position ($i_1$,$j_1$,) with the lowest SAD(i,j) among all nine SAD(i,j) (including SAD(0,0).

(5) Compute SAD(i,j) between the target macroblock and the macroblocks in the reference image corresponding to the motion vectors ($i_i$−2,$j_1$−2), ($i_1$−2,$j_1$), ($i_1$−2,$j_1$+2), ($i_1$,$j_1$−2); ($i_i$,$j_1$+2), ($i_i$+2,$j_1$−2), ($i_i$+2,$j_1$), ($i_1$+2,$j_1$+2).

(6) Select the position ($i_2$,$j_2$) with the lowest SAD(i,j) among the last nine SAD(i,j) (including SAD($i_1$,$j_1$).

(7) Compute SAD(i,j) between the target macroblock and the macroblocks in the reference image corresponding to the motion vectors ($i_2$−1,$j_2$−1), ($i_2$−1,$j_2$), ($i_2$−1,$j_2$+1), ($i_2$,$j_2$−1), ($i_2$,$j_2$+1), ($i_2$+1,$j_2$−1), ($i_2$+1,$j_2$), ($i_2$+1,$j_2$+1).

(8) Select the position ($i_3$,$j_3$) with the lowest SAD(i,j) among the last nine SAD(i,j) (including SAD($i_2$,$j_2$) as the motion vector for the target macroblock and terminate motion estimation for the current target macroblock.

This method of motion estimation involves (at most) 25 SAD computations for each target macroblock. Those skilled in the art will understand that other constraints may be imposed on motion estimation to limit the number of SAD computations in the above procedure. For example, target macroblocks near the edges of a slice have a reduced number of SAD computations. Additional constraints on motion estimation may be imposed to promote error recovery as described in the next section of this specification.

Motion Estimation Rules to Provide Error Recovery

In a preferred embodiment of the present invention, each frame in a sequence of video frames has one row of macroblocks in the Y component plane that is encoded entirely as intra blocks. The position (within the Y component plane) of the macroblock row that is intra encoded changes from frame to frame in an orderly cyclical manner (e.g., from top to bottom and then jump back to top). For (160×120) frames (i.e., 160 columns and 120 rows), it takes 8 frames for the intra-encoded macroblocks to cycle through the possible positions. During the 8-frame cycling period of this example, the entire U component plane of one of the 8 frames and the entire V component plane of one of the remaining 7 frames are intra encoded. Those skilled in the art will understand that one reason for implementing this cyclical intra encoding is to refresh periodically all the pixel locations with intra encoded signals, while attempting to maintain relatively uniform bit rates over the video stream.

In a video conferencing network, frames (or portions of frames) may be lost or corrupted during transmission from one node to another, or as a result of CPU cycle bottlenecks. For encoded video signals in which some of the macroblocks of each image may be encoded as inter macroblocks, straightforward cyclical intra encoding does not ensure automatic recovery from such errors. Those skilled in the art will understand that error recovery may not be achieved if motion compensation causes "good" macroblocks (i.e., those macroblocks ultimately based only on intra macroblocks decoded after the error) to become corrupted by "bad" macroblocks (i.e., those macroblocks not ultimately based only on intra macroblocks decoded after the error).

Figure 7:
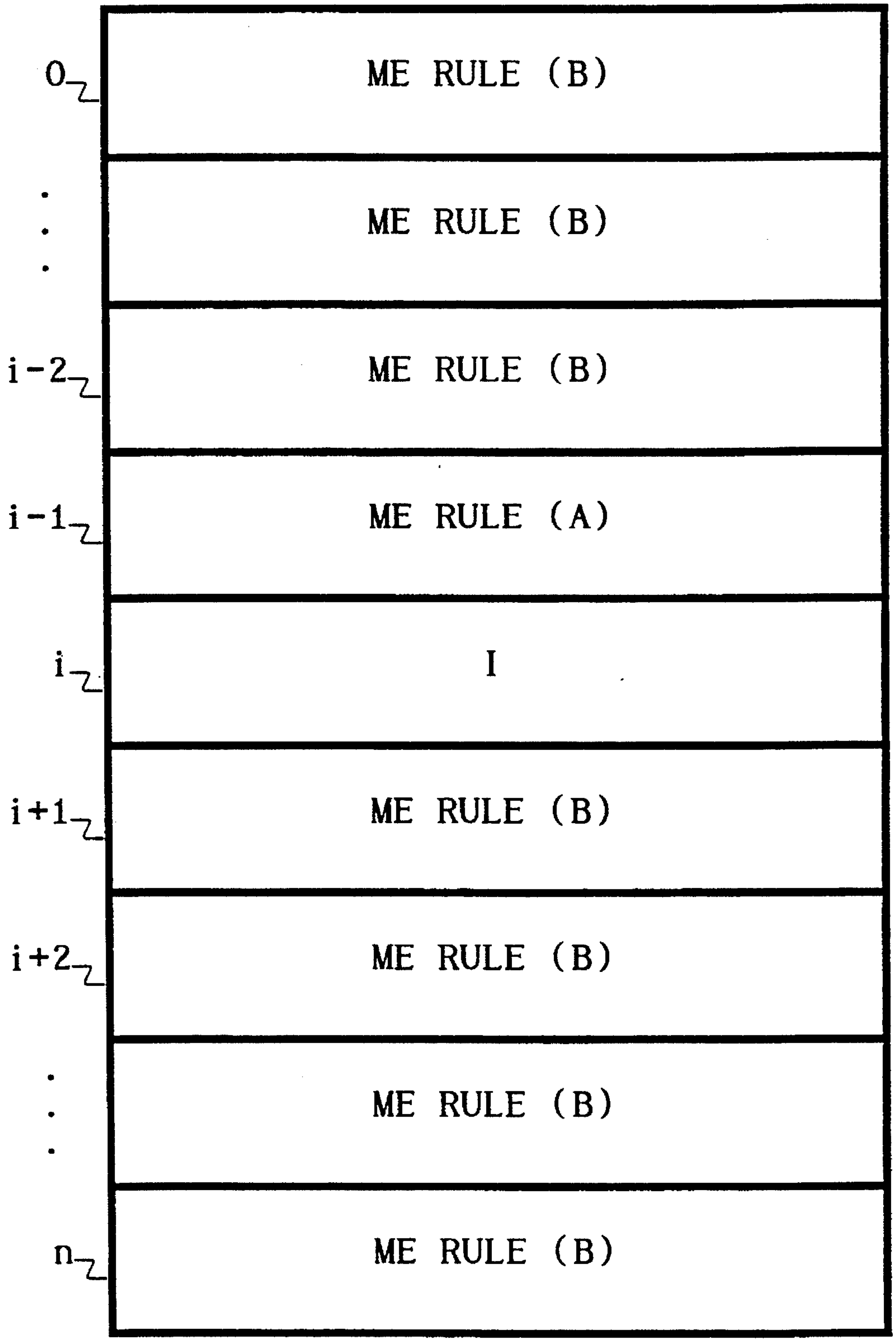
FIG. 7 is a representation of the motion estimation rules applied by the pixel processor of FIG. 3 during the encoding of video signals.

Referring now to FIG. 7, there is shown a representation of the general motion estimation rules applied by pixel processor 302 of FIG. 3 during the encoding of a Y component plane of a frame j of a sequence of video frames, according to a preferred embodiment of the present invention. The preferred general motion estimation rules may be summarized as follows:

For frame j, image region i (comprising one or more rows of macroblocks) is the cyclical intra-encoded image region:

ME Rule (A) For all of the target macroblocks in image region i−1 (where image region i−1 is the image region immediately above image region i and has the same number of rows of macroblocks as image region i), motion estimation may consider only those reference macroblocks within image region i−1 of the reference frame j−1 (i.e., the companded frame corresponding to the previous frame j−1).

ME Rule (B) For each of the other image regions k (having the same number of rows of macroblocks as image region i), the target macroblocks of image region k (1) may not have motion vectors that correspond to image regions above image region k of the reference frame j−1 and (2) may not have motion vectors that correspond to image region i of the reference frame j−1.

These preferred rules ensure automatic error recovery within a finite recovery period, when the intra encoding cycles from frame to frame in top-to-bottom order. The finite recovery period is equal to the intra-encoding cycling period.

Those skilled in the art will understand that motion estimation under the above rules for error recovery will be affected by the edges of the Y component plane, the number of rows of macroblocks per intra-encoded image region, and the limitations on range of allowable motion vectors. In a preferred embodiment, each intra-encoded image region has only one row of macroblocks and the allowable motion vectors are limited to +/−7 pixels in the horizontal and vertical directions.

Those skilled in the art will also understand that the preferred motion estimation rules ensure that, during the error recovery period, no part of the image that recovers (via the cyclical intra-encoded rows) becomes corrupted again. To provide faster error recovery (at the expense of a higher average bit rate), the number of rows of macroblocks in the intra-encoded image region may be increased.

The motion compensation rules of the present invention, along with the cyclical intra encoding, also ensure accurate decoding of encoded video signals within a finite initialization period at the beginning of a networking session and for video conferencing nodes that join a networking session already in progress.

Macroblock Classification

As described above in reference to step 404 of FIG. 4, the encoder performs macroblock classification to decide, for each macroblock, whether the macroblock should be intra coded or inter coded. In a preferred embodiment, each target macroblock in the current image is classified as follows:

(1) Calculate

InterSAD=sum of |c(i,j)−p(i,j)| where c(i,j) are all of the component signals for the target macroblock and p(i,j) are all of the component signals for the motion-compensated macroblock of the reference frame (identified during the motion estimation of step 402).

(2) Calculate

IntraSAD=sum of |c(i,j)−C| where C is the average value of all of the components of the target macroblock.

(3) If InterSAD is less than IntraSAD, then classify target macroblock as an inter macroblock.

(4) Else if InterSAD is less than a specified threshold (preferably 1024 (corresponding to an average component difference magnitude of 4 of the 256 differences)), then classify target macroblock as an inter macroblock.

(5) Otherwise classify target macroblock as an intra macroblock.

Step (4) forces a macroblock with a relatively small InterSAD to be inter encoded. Those skilled in the art will understand that this helps prevent artifacts that may occur when macroblocks in non-moving parts of the image are intra encoded.

Temporal Pre-Filtering

As described above in reference to step 406 of FIG. 4, the encoder applies temporal pre-filtering to the current frame. In a preferred embodiment, temporal pre-filtering is applied only to the Y-component intra macroblocks and is represented by the following equation:

$$c'=\{c+(p-c+(1<<s))\}>>(s+1)$$

where c is a Y component of an intra macroblock of the current frame, p is the corresponding non-motion-compensated Y component of the reference frame, and s is the temporal filter strength. The temporal filter strength s may be either 1, 2, or 3, where s=1 corresponds to taking ¼ of the reference image, s=2 corresponds to taking ⅛ of the reference image, and s=3 corresponds to taking 1/16 of the reference image.

In a preferred embodiment, the temporal pre-filter is identical to the temporal post-filter. Those skilled in the art will understand that, since the encoder does not have to match the decoder, the temporal pre-filter may be optimized somewhat by eliminating the (1<<s) rounding term from the above equation.

Quantization Level Selection and Bit Rate Control

It is desirable in video conferencing systems to generate encoded video signals in which the number of bits per frame is constant. When the number of bits per frame is constant, the bit rates for transmitting encoded video signals will be uniform. Uniform bit rates promotes efficient use of available finite transmission bandwidth which in turn promotes reliable transmission for more accurate video conferencing sessions. Variable bit rates may result in frame dropping, which may have a severe impact on the quality of the video display.

Those skilled in the art will understand that the number of bits per video frame may be controlled to some extent by adjusting the level of quantization applied when encoding the video signals.

A Preferred Bit Rate Controller

Figure 8:
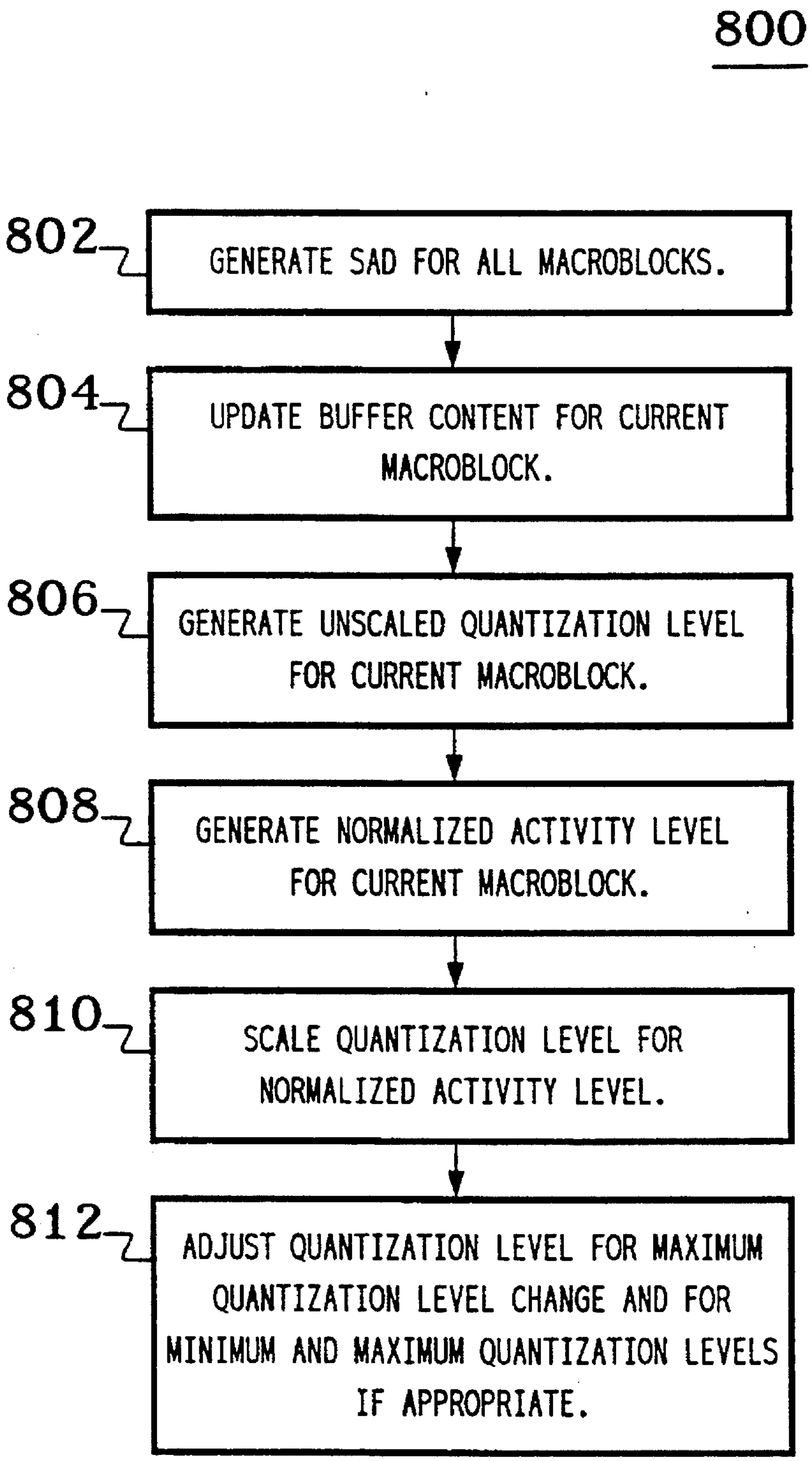
FIG. 8 is a process flow diagram of the processing of a preferred bit rate controller implemented by the pixel processor of FIG. 3 to select the quantization levels for encoding video signals to improve bit rate uniformity.

Referring now to FIG. 8, there is shown a process flow diagram of the processing of bit rate controller 800 implemented by pixel processor 302 of FIG. 3 to select the quantization levels for encoding video signals of each component plane to improve bit rate uniformity, according to a preferred embodiment of the present invention. Bit rate controller 800 of FIG. 8 operates at the macroblock level for each component plane by adjusting the quantization level for each macroblock to attempt to minimize buffering, thereby improving bit rate uniformity.

The processing of bit rate controller 800 begins by generating the sum of absolute differences SAD (i) for each macroblock i of the current component plane (step 802 of FIG. 8). Those skilled in the art will understand that, for inter-encoded macroblocks, SAD (i) is preferably the sum of the absolute values of the differences between the component signals of the current macroblock and the corresponding component signals of the corresponding motion-compensated macroblock from the reference frame. For intra-encoded macroblocks, SAD(i) is preferably the sum of the absolute values of the differences between the component signals of the current macroblock and the average component signal of the current macroblock.

For bit rate controller 800, buffering is characterized by the buffer content $C_b$ of a virtual buffer. For macroblock i, the buffer content $C_b(i)$ is generated (in step 804) using the following Equation (1):

$$C_b(i)=C_b(i-1)+K_1[B_u(i-1)-B_t(i)], \quad (1)$$

where:

$C_b(i-1)$ is the previous buffer content;

$B_u(i-1)$ is the actual number of bits used to encode the previous macroblock i−1;

$K_1$ is a specified constant that is less than or equal to 1 (and preferably equal to 1); and $B_t(i)$ is the target number of bits for the current macroblock i.

For uniform bit distribution over the macroblocks, the target number of bits for the current macroblock, $B_t(i)$ is preferably calculated as a specified target number of bits for the current component plane divided by the number of macroblocks in the current component plane. The specified target number of bits for the current component plane is a function of the transmission bandwidth, the number of frames per second, and the subsampling ratio for the component. For example, for video conferencing at 10 frames per second over ISDN lines with a transmission bandwidth of 90 Kbits/sec allocated for video, 9 Kbits are allocated per video frame. For YUV9 video signals with 16:1:1 YUV subsampling, the target numbers of bits per component plane are 8 Kbits for Y and 0.5 Kbits for U and V. The number of bits used $B_u(i-1)$ is preferably initialized to the target number of bits $B_t(i)$ at the beginning of the video stream. Bit distribution over the macroblocks may also be non-uniform.

A different buffer content $C_b(i)$ is maintained for each of the video components Y, U, and V. These buffer contents $C_b(i)$ are preferably initialized to 5000, 500, and 500 for Y, U, and V, respectively, at the beginning of the video stream. In general, the initial buffer content values may be determined (and optimized) empirically. Those skilled in the art will understand that the buffer content $C_b(i)$ is the cumulative net differential between the target number of bits for the macroblocks and the actual number of bits used.

The buffer content $C_b(i)$ is then used to generate the unscaled quantization level $Q_u(i)$ for the current macroblock i (in step 806) using the following Equation (2):

$$Q_u(i) = \frac{15*C_b(i)}{B_t(i)} . \quad (2)$$

The normalized activity index $I_{na}(i)$ for the current macroblock i is generated (in step 808) using the following Equation (3):

$$I_{na}(i) = \frac{C*MA(i) + MA_{ave}}{MA(i) + C*MA_{ave}} , \quad (3)$$

where C is a specified constant (preferably 2), MA (i) is a macroblock activity measure for the current macroblock i, and $MA_{ave}$ is the average macroblock activity measure of the entire component plane. In a preferred embodiment, the macroblock activity measure MA is the sum of absolute differences SAD. In alternative preferred embodiments, the macroblock activity measure MA may be some other activity measure, such as mean absolute difference, mean square error, or sum of square errors. The normalized activity index $I_{na}(i)$ is a measure of the relative variation with the signals used to encode the current macroblock i.

The scaled quantization level Q(i) is then generated for the current macroblock i (in step 810) using the following Equation (4):

$$Q(i)=I_{na}(i)*Q_u(i). \quad (4)$$

The scaling of Equation (4) allows well-predicted inter-encoded macroblocks and uniform intra-encoded macroblocks (i.e., those with small SADs) to be quantized finely, while poorly-predicted inter-encoded macroblocks and variegated intra-encoded macroblocks (i.e., those with large SADs) to be quantized coarsely.

If the magnitude of the difference between the scaled quantization level Q(i) for the current macroblock i and the scaled quantization level Q(i−1) for the previous macroblock i−1 is greater than a specified threshold D, then the scaled quantization level Q(i) is adjusted (in step 812) according to Equation (5) as follows:

$$Q(i)=Q(i-1)+[D*\mathrm{SIGN}(Q(i)-Q(i-1))], \quad (5)$$

where:

| | |
|---|---|
| SIGN(x) | = +1 for x > 0 |
| | = 0 for x = 0 |
| | = −1 for x < 0 |

Step 812 limits the magnitude of the change in quantization level from macroblock to macroblock. Those skilled in the art will understand that step 812 is a filter designed to reduce oscillations in quantization levels. Step 812 also hard limits the quantization level Q(i) to between 0 and 15, inclusive.

The quantization level Q(i) after step 812 is the quantization level used to encode the current macroblock i. A quantization level Q(i) of 15 corresponds to the coarsest quantization, while a quantization level Q(i) of 0 corresponds to the finest quantization.

Figure 9:
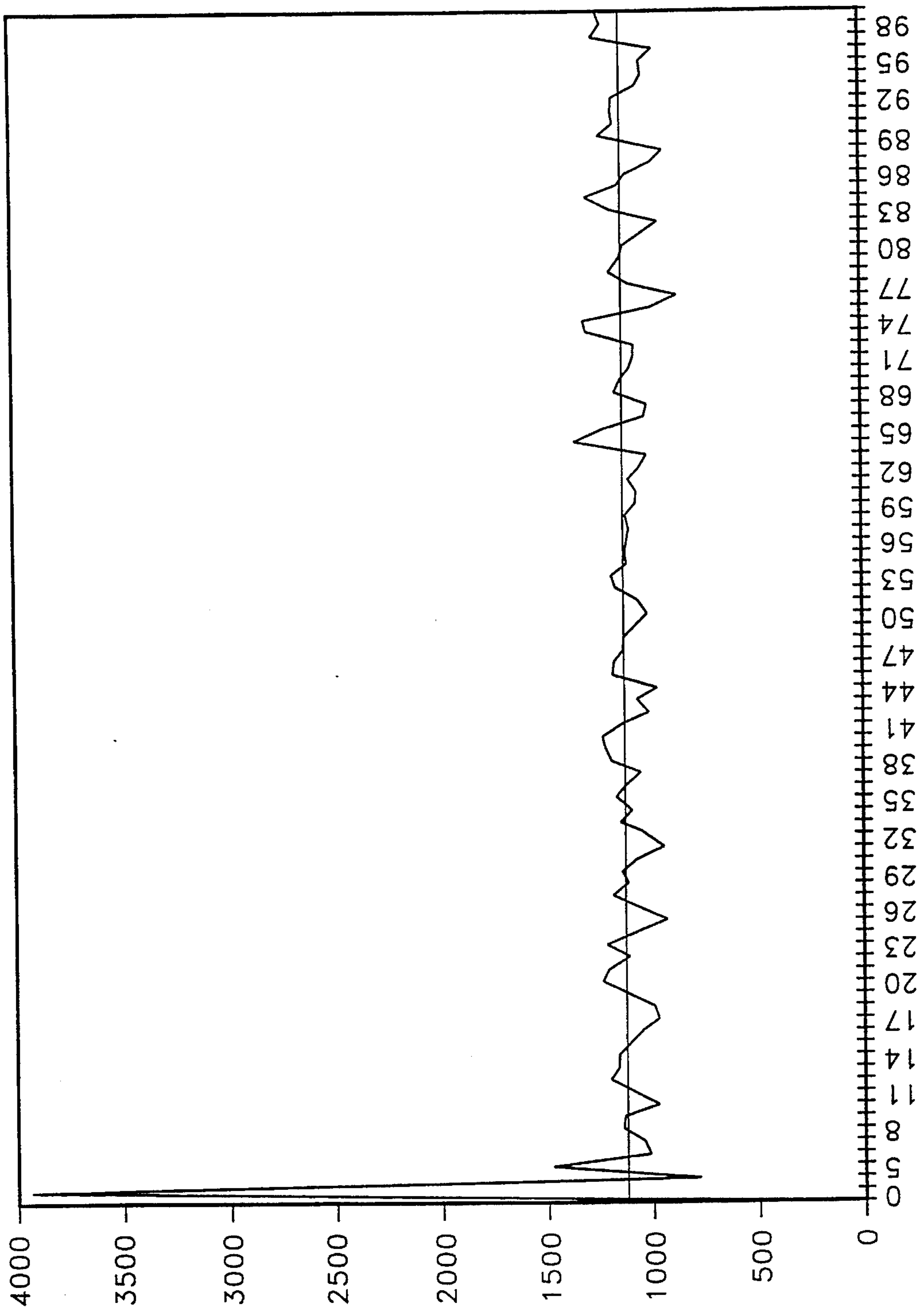
FIG. 9 is a graphical representation of the results of applying the bit rate controller of FIG. 8 to a typical sequence of video images.

Referring now to FIG. 9, there is shown a graphical representation of the results of applying bit rate controller 800 of FIG. 8 to a typical sequence of video images. In FIG. 9, the X axis is frame number and the Y axis is bytes per frame. The horizontal line at 1125 bytes per frame corresponds to the ideal uniform bit rate for a video sequence with a frame rate of 10 frame per second over a transmission line with a bandwidth of 90 kilobits per second.

As shown in Equation (1), bit rate controller 800 of FIG. 8 generates the buffer content $C_b(i)$ based upon the actual number of bits used $B_u(i-1)$ to encode the previous macroblock i−1. This implies that the previous macroblock i−1 is completely encoded before selecting the quantization level for the current macroblock i. Bit rate controller 800 may be implemented in a vertical implementation of an encoder in which the encoder fully encodes each macroblock before starting to encode the next macroblock. Those skilled in the art will understand that such vertical encoding may be inefficient.

In a preferred embodiment, the processing implemented by pixel processor 302 of FIG. 3 to encode video signals is implemented horizontally, whereby the encoder performs one operation for all the macroblocks in one component plane before starting the next operation. In such a horizontal implementation, the actual number of bits used $B_u(i-1)$ to encode the previous macroblock i−1 may not be available when the encoder selects the quantization level for encoding the current macroblock i. Bit rate controller 1000 of FIG. 10 solves this problem by using an estimate of the actual number of bits used when generating the buffer content $C_b(i)$.

An Alternative Preferred Bit Rate Controller

Figure 10:
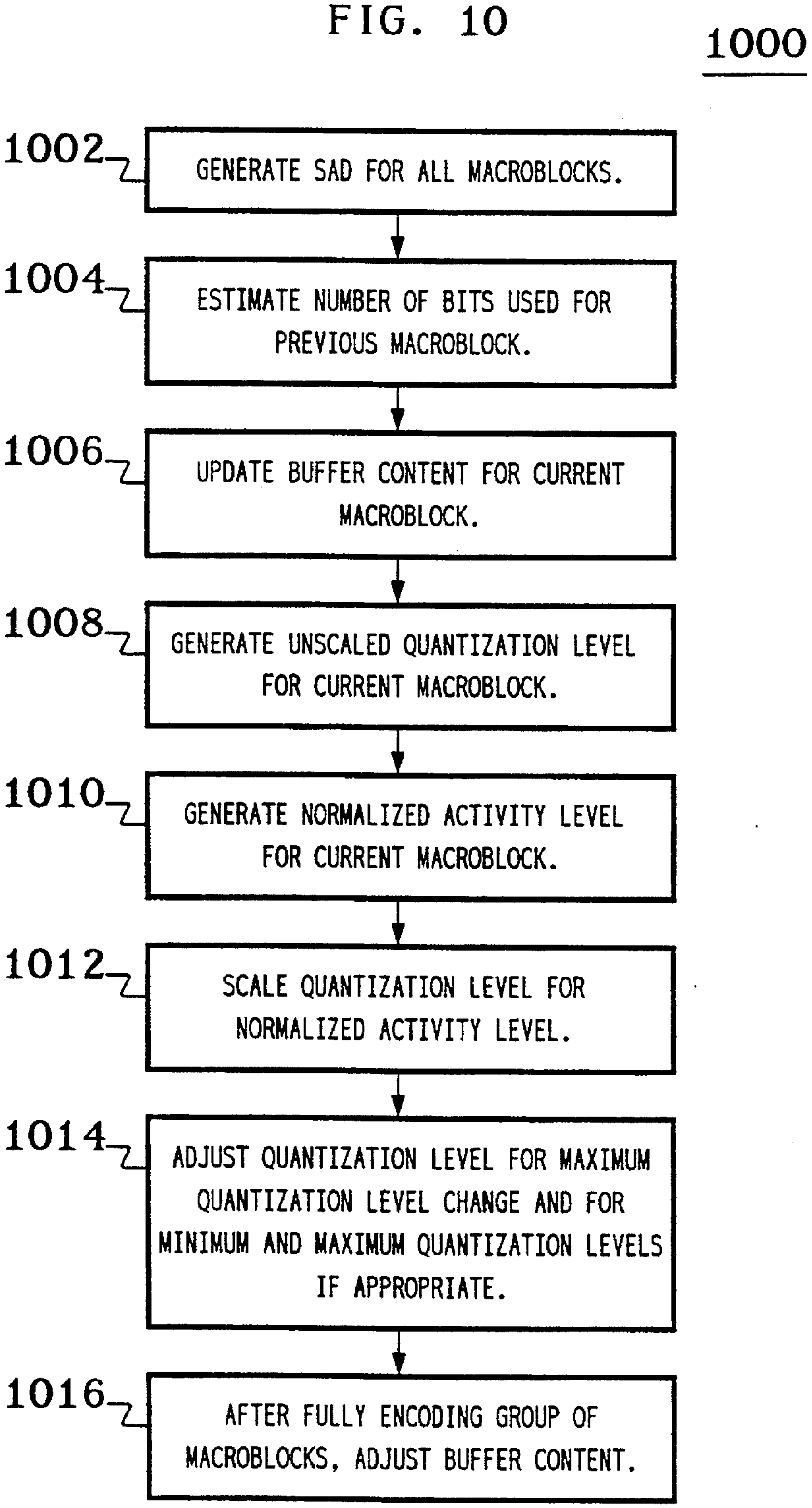
FIG. 10 is a process flow diagram of the processing of an alternative preferred bit rate controller implemented by the pixel processor of FIG. 3 to select the quantization levels for encoding video signals to improve bit rate uniformity.

Referring now to FIG. 10, there is shown a process flow diagram of the processing of bit rate controller 1000 implemented by pixel processor 302 of FIG. 3 to select the quantization levels for encoding video signals for a group of macroblocks (e.g., a slice of a component plane) to improve bit rate uniformity, according to an alternative preferred embodiment of the present invention. Step 1002 of FIG. 10 for bit rate controller 1000 is identical to step 802 of FIG. 8 for bit rate controller 800.

Bit rate controller 1000 generates an estimate $B_u^e(i-1)$ of the number of bits used to encode the previous macroblock i−1 (in step 1004 of FIG. 10) using Equation (6) as follows:

$$B_u^e(i-1) = K_2 * \frac{CM(i)}{Q(i-1)} , \quad (6)$$

where:

$K_2$ is a specified positive constant (preferably, 3);

CM(i) is a complexity measure for the current macroblock i (CM(i) is preferably equal to the sum of absolute differences SAD(i) for the current macroblock i); and Q(i−1) is the quantization level used to encode the previous macroblock i−1.

The estimated buffer content $C_b^e(i)$ is generated (in step 1006) using the following Equation (7):

$$C_b^e(i)=C_b^3(i-1)+K_1[B_u^e(i-1)-B_t(i)], \quad (7)$$

where:

$C_b^e(i-1)$ is the estimated buffer content for the previous macroblock i−1;

$K_1$ is a specified constant that is less than or equal to 1 (and preferably equal to 1); and $B_t(i)$ is the target number of bits for the current macroblock i.

The estimated buffer content $C_b^e(i)$ is then used to generate the unscaled quantization level $Q_u(i)$ for the current macroblock i (in step 1008) using the following Equation (8):

$$Q_u(i) = \frac{15*C_b^e(i)}{B_t(i)}. \quad (8)$$

Steps 1010, 1012, and 1014 of FIG. 10 for bit rate controller 1000 are identical to steps 808, 810, and 812 of FIG. 8 for bit rate controller 800, respectively.

To prevent a possible long-term drift in the buffer content due to using an estimate of the number of bits used instead of the actual number of bits used, the buffer content is preferably adjusted after encoding the group of macroblocks (step 1016) using the following Equation (9):

$$C_b = C_b^e - B_u^e(\text{TOT}) + B_u^a(\text{TOT}), \quad (9)$$

where:

$C_b^a$ is the adjusted buffer content, which is used as the previous buffer content for the similar component plane of the next frame;

$C_b^e$ is the estimated buffer content after completely encoding the current component plane;

$B_u^e$(TOT) is the total estimate number of bits used for the current component plane; and $B_{ua}$(TOT) is the total actual number of bits used for the current component plane.

Figure 11:
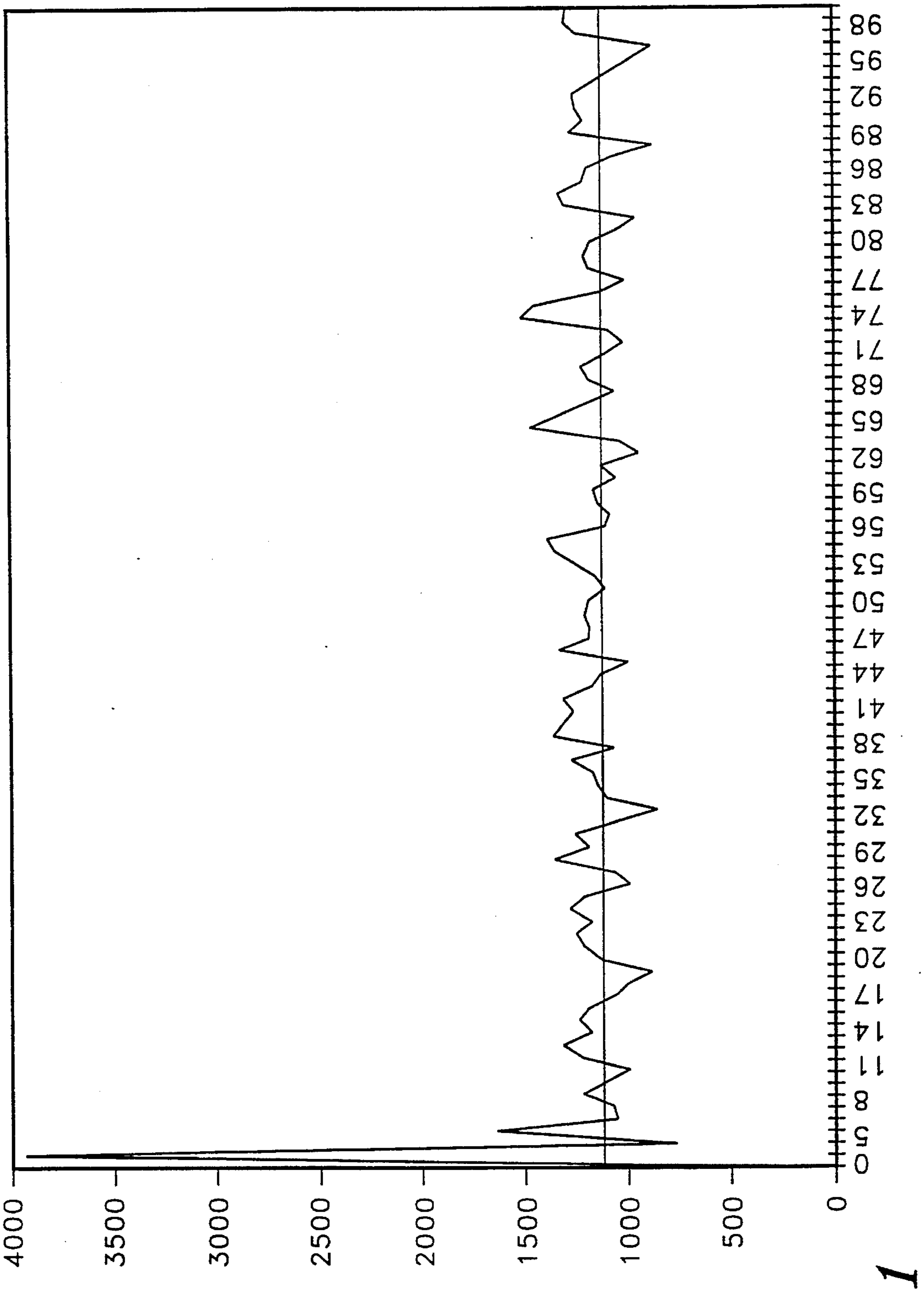
FIG. 11 is a graphical representation of the results of applying the bit rate controller of FIG. 10 to a typical sequence of video images.

Referring now to FIG. 11, there is shown a graphical representation of the results of applying bit rate controller 1000 of FIG. 10 to the same sequence of video images used to generate FIG. 9.

Despite the control over the selection of quantization levels provided by bit rate controllers 800 and 1000, the encoding of video signals may intermittently exceed the available transmission bandwidth. Those skilled in the art will understand that this may occur when encoding intra frames (i.e., frames encoded entirely as intra blocks) which typically use about 2–3 times as many bits as frames encoded using both inter and intra blocks. One way to recover from such events is to drop one or more frames (after the intra frame) to allow the encoder to re-synchronize with the signal transmission.

Figure 12:
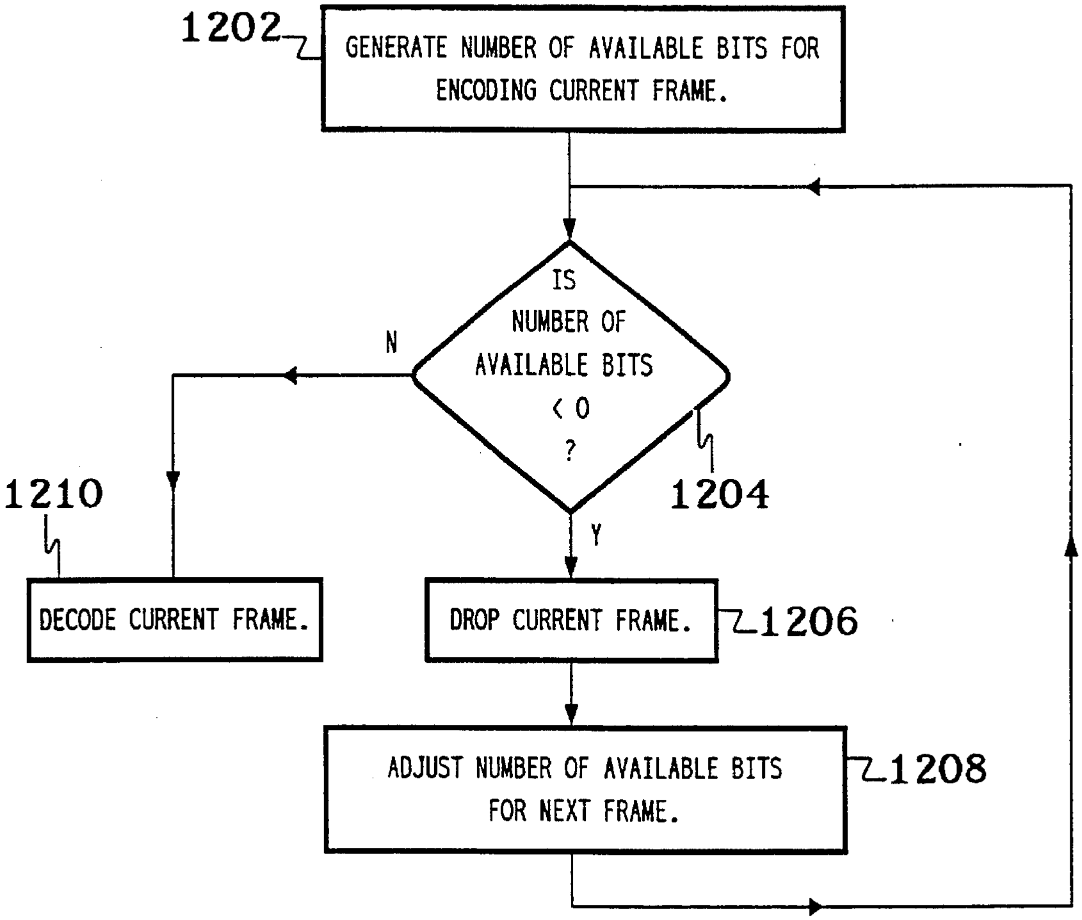
FIG. 12 is a process flow diagram of the processing implemented by the bit rate controllers of FIGS. 8 and 10 to determine when the encoder should drop a frame.

Referring now to FIG. 12, there is shown a process flow diagram of the processing implemented by bit rate controllers 800 and 1000 to determine when the encoder should drop a frame, according to a preferred embodiment of the present invention. To decide when to drop a frame, the bit rate controller generates the number of available bits $B_a(n)$ for encoding the current frame n (in step 1202 of FIG. 12) by implementing the following Equation (10):

$$B_a(n) = B_a(n-1) - B_f(n-1) + B_f^t, \quad (10)$$

where:

$B_a(n-1)$ is the number of available bits from the previous frame n−1;

$B_f(n-1)$ is the number of bits actually used to encode the previous frame n−1; and $B_f^t$ is the specified target number of bits per frame.

The target number of bits per frame $B_f^t$ may be generated by dividing the target bit rate (in bits per second) by the video frame rate (in frames per second). The number of available bits $B_a(n-1)$ from the previous frame n−1 is preferably initialized to the target number of bits per frame $B_f^t$ at the start of the video sequence. The number of bits actually used $B_f(n-1)$ to encode the previous frame n−1 is preferably initialized to 0 at the start of the video sequence.

If the number of available bits $B_a(n)$ for encoding the current frame n is negative (step 1204), then the current frame is skipped (i.e., not encoded) (step 1206) and the number of available bits $B_a(n+1)$ for the next frame n+1 is adjusted (step 1208) by adding the bits allocated for frame n as indicated in the following Equation (11):

$$B_a(n+1) = B_a(n) + B_f^t. \quad (11)$$

Processing then returns to step 1204 to test the number of available bits for encoding the next frame n+1.

If (or when) the number of available bits is not less than zero (step 1204), then the current frame is encoded (step 1210).

Those skilled in the art will understand that the processing of FIG. 12 is equivalent to skipping as many frames as needed to bring the buffer content within a specified threshold, where the specified threshold is preferably set to one frame of bits.

Another Alternative Preferred Bit Rate Controller

Figure 13:
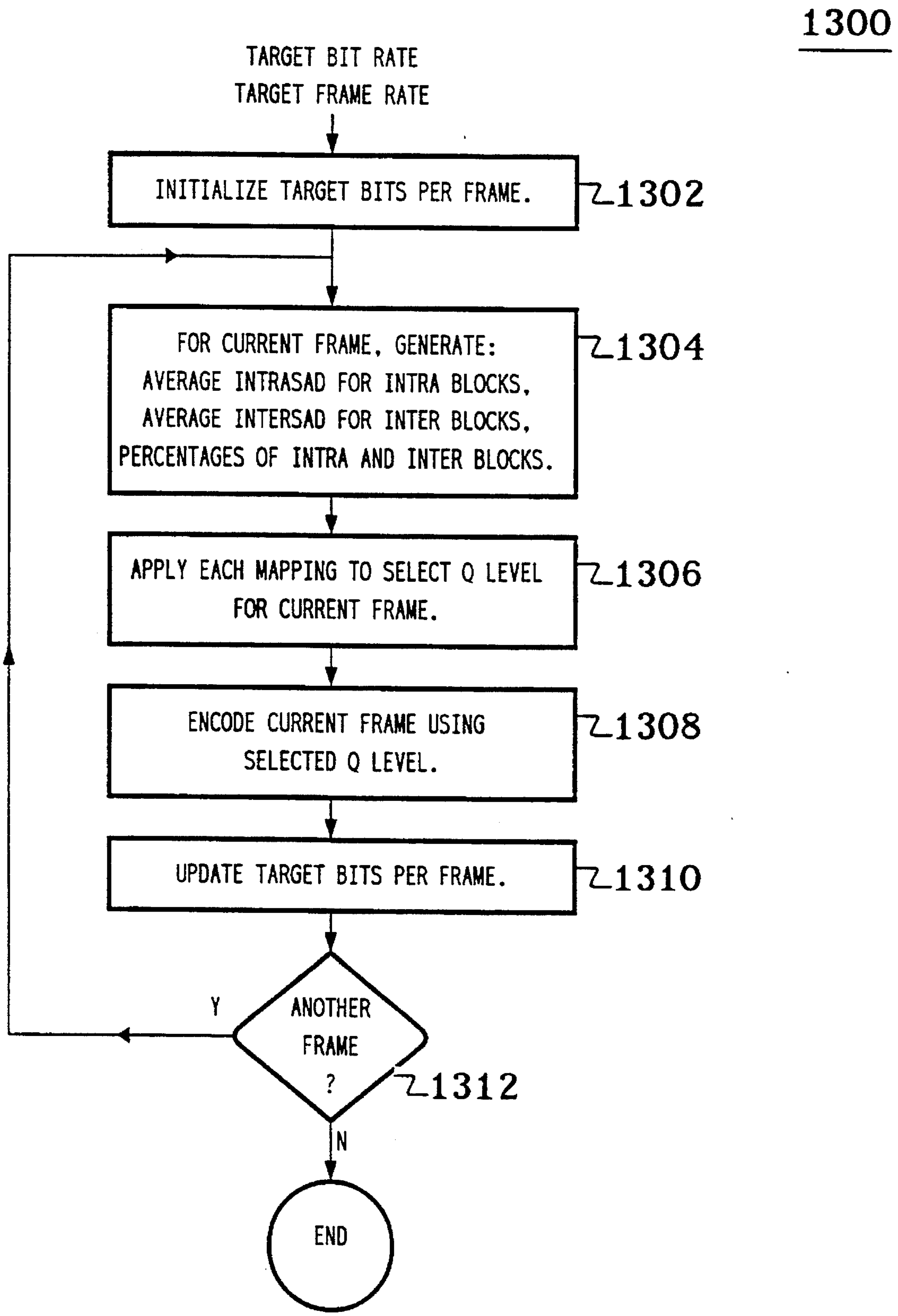
FIG. 13 is a process flow diagram of the processing of another alternative preferred bit rate controller implemented by the pixel processor of FIG. 3 to select the quantization levels for encoding video signals to improve bit rate uniformity.

Referring now to FIGS. 13, there is shown a process flow diagram of the processing of bit rate controller 1300 implemented by pixel processor 302 of FIG. 3 to select the quantization levels for encoding video signals of each component plane to improve bit rate uniformity, according to another alternative preferred embodiment of the present invention. Bit rate controller 1300 uses statistical scene content-based prediction to attempt to maximize spatiotemporal video quality at a given bit rate. Bit rate controller 1300 uses off-line-generated mappings between the number of bits available to encode a typical video frame and quantization level. Bit rate controller 1300 uses the mappings in real time to select quantization levels for the current frame.

Off-Line Generation of Mappings

Figure 14:
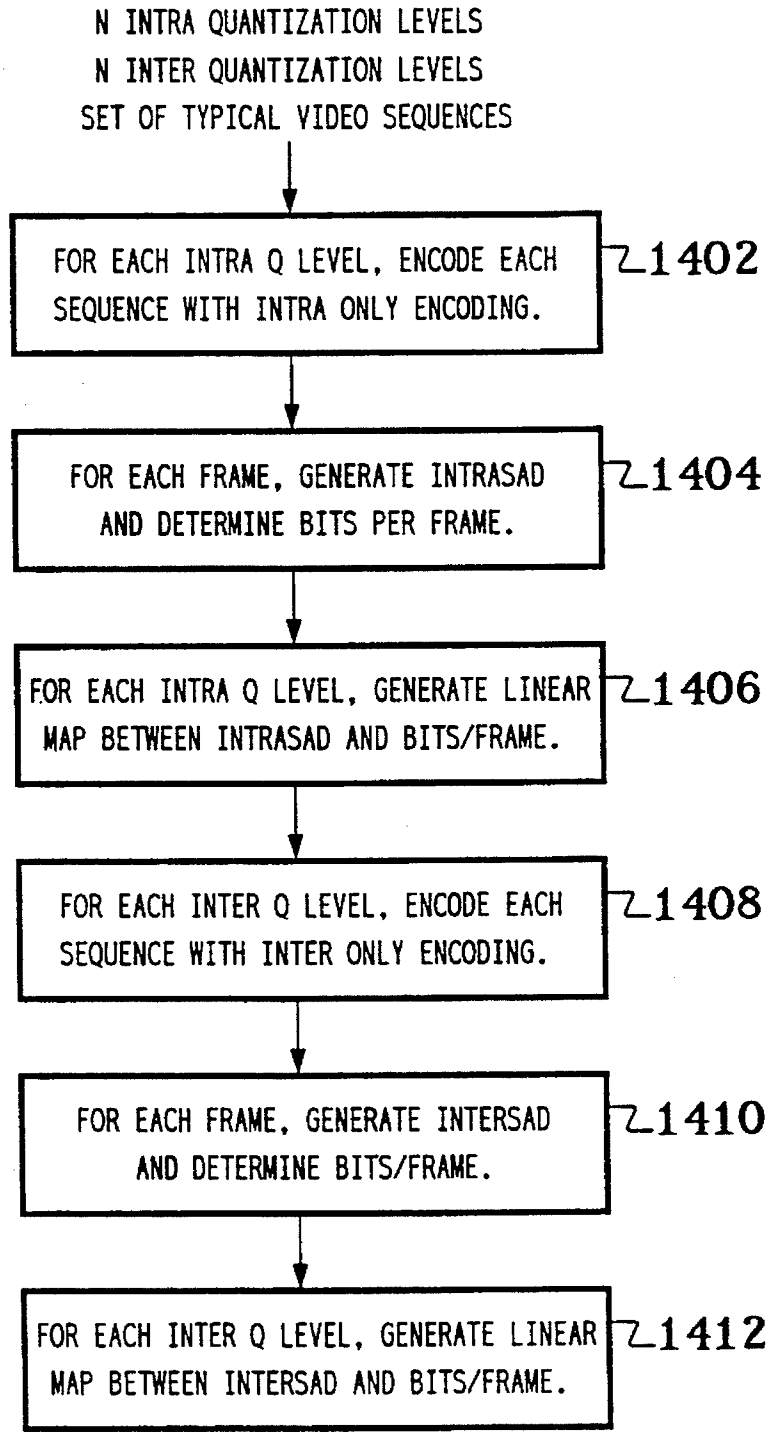
FIG. 14 is a process flow diagram of the processing implemented off line to generate the mappings used by the bit rate controller of FIG. 13.

Referring now to FIG. 14, there is shown a process flow diagram of the processing implemented off line to generate the mappings used by bit rate controller 1300 of FIG. 13, according to a preferred embodiment of the present invention. The mappings for N different intra quantization levels and N different inter quantization levels are generated from a set of video sequences that are representative of the video sequences to be processed in real time. In a preferred embodiment, N is 16.

For each intra quantization level, each video sequence is encoded using only intra encoding (step 1402 of FIG. 14). For each intra-encoded frame, the IntraSAD is generated for the entire frame and the number of bits in the encoded frame is determined (step 1404). For each quantization level q, using all the IntraSAD and bits per frame (BPF) values from step 1404 for that quantization level, generate the linear relationship that best fits the data (step 1406), where the linear relationship may be represented as follows:

$$BPF = M_{intra}^q * \text{IntraSAD} + B_{intra}^q$$

where $M_{intra}^q$ is the slope and $B_{intra}^q$ is the Y intercept for the linear relationship for intra-encoding quantization level q. For N intra quantization levels, N linear relationships are generated.

Similarly, for each inter quantization level, each video sequence is encoded using only inter encoding (step 1408). For each inter-encoded frame, the InterSAD is generated for the entire frame and the number of bits in the encoded frame is determined (step 1410). For each quantization level q, using all the InterSAD and bits per frame (BPF) values from step 1410 for that quantization level, generate the linear relationship that best fits the data (step 1412), where the linear relationship may be represented as follows:

$$BPF = M_{inter}^q * \text{InterSAD} + B_{interinter}^q$$

where $M_{inter}^q$ is the slope and $B_{inter}^q$ is the Y intercept for the linear relationship for inter-encoding quantization level q. For N inter quantization levels, N linear relationships are generated.

IntraSAD and InterSAD are defined earlier in this specification in the section entitled "Macroblock Classification."

Real-Time Bit Rate Control

Referring again to FIG. 13, bit rate controller 1300 may be used to select quantization levels for real-time encoding of video frames to provide relatively uniform bit rates. For a given target bit rate $B_t$ (in bits per second) and target frame rate $F_t$ (in frames per second), bit rate controller 1300 initializes the target bits per frame $BPF_t$ (in bits per frame) by dividing the target bit rate $B_t$ by the target frame rate $F_t$ (step 1302 of FIG. 13).

For the current frame, bit rate controller 1300 generates (1) the average IntraSAD for all the intra blocks in the current frame, (2) the average InterSAD for all the inter blocks in the current frame, (3) the percentage k of the blocks in the current frame that are intra blocks and (4) the percentage (1–k) of the blocks in the current frame that are inter blocks (step 1304).

For each quantization level q, the number of bits required to encode the current frame using that quantization level is estimated using the linear relationships generated during the off-line processing of FIG. 14. The estimated number of bits per frame ($BPF_e(q)$) for quantization level q may be generated using the following equation:

$$BPF_e = k * (M_{intra}^q * \text{IntraSAD}_{ave} + B_{intra}^q) + (1-k) * (M_{inter}^q * \text{InterSAD}_{ave} + B_{inter}^q)$$

Note that the same quantization level q is used for both the intra blocks and the inter blocks. The quantization level corresponding to the estimated number of bits per frame ($BPF_e(q)$) that is closest to but still less than the target bits per frame $BPF_t$ is selected as the quantization level for the current frame (step 1306).

The current frame is then encoded using the quantization level q selected in step 1306 (step 1308). The actual number of bits used to encode the current frame ($BPF_a$) is then used to update the target bits per frame ($BPF_t$) (step 1310), preferably using the following equation:

$$BPF_t = BPF_t * (BPF_t / BPF_a)$$

If there is another frame to encode (step 1312), then processing for bit rate controller 1300 returns to step 1304 to repeat steps 1304–1310 for the next frame.

Quantization

As described above in reference to step 416 of FIG. 4, the encoder quantizes the DST coefficients. In a preferred embodiment, quantization is performed as follows:

if $(v_u >= 0)\ v_q = v_u / q;$ else $v_q = -(-v_u / _q);$ where $v_u$ is the unquantized DST coefficient, q is the quantizer, "/" represents division with truncation, and $v_q$ is quantized DST coefficient. The different treatment of DST coefficients with negative values ensures truncation toward zero. Those skilled in the art will understand that a purpose of this is to improve compression by always truncating toward the smaller of the two nearest integer values.

Variable-Length Encoding

Several kinds of signals in the compressed video bitstream of the present invention are variable-length encoded. The variable-length codebooks used in the compressed video bitstream are preferably all variations on a single type of variable-length code, which is technically known as a Hackenbush code. Hackenbush coding is a subset of Huffman encoding in which all code words are of the form [string of k 0's][1][some additional bits]. The [string of k 0's][1] is the code prefix and the additional bits are the code bits.

In the present invention, k is preferably a value in the range $0 \leq k \leq 7$. A Hackenbush codebook is completely specified by saying for each k how many "additional bits" X(k) there are. By definition, the additional bits may range over all possible X(k)-bit binary code words.

The decoded value for a given Hackenbush code is defined as the index of that code word in a lexicographically-ordered list. For example, consider the codebook defined by X(0)=2, X(1)=1, X(2)=3, which may be written more compactly as {2, 1, 3}. The code words for this codebook are all codes of the form 1xx, 01x, and 001xxx. Table I presents the code words and corresponding values for this codebook.

TABLE I

Code Words and Corresponding Values for the {2, 1, 3} Hackenbush Codebook.

| Code Word | Value |
|---|---|
| 100 | 0 |
| 101 | 1 |
| 110 | 2 |
| 111 | 3 |
| 010 | 4 |
| 011 | 5 |
| 001000 | 6 |
| 001001 | 7 |
| 001010 | 8 |
| 001011 | 9 |
| 001100 | 10 |
| 001101 | 11 |
| 001110 | 12 |
| 001111 | 13 |

The compressed video bitstream of the present invention uses two different Hackenbush codebooks—one for decoding the macroblock signals, and one for decoding the block signals. These codebooks are:

Macroblock Codebook {1,2,3,4*}

Block Codebook {1,2,3,4,5,6,5,6*}

An asterisk denotes that in a given row of the codebook, the 1 at the end of the prefix is replaced with an x bit.

Tables II and III present the code words and corresponding values for the Macroblock Codebook and the Block Codebook, respectively.

TABLE II

Code Words and Corresponding Values for the Macroblock Codebook.

| Code Words | Values |
|---|---|
| 1x | 0–1 |

TABLE II-continued

Code Words and Corresponding Values for the Macroblock Codebook.

| Code Words | Values |
|---|---|
| 01xx | 2–5 |
| 001xxx | 6–13 |
| 00000000 | hole |
| 00000001 to 00011110 | 14–43 |
| 00011111 | separator |

TABLE III

Code Words and Corresponding Values for the Block Codebook.

| Code Words | Values |
|---|---|
| 1x | 0–1 |
| 01xx | 2–5 |
| 001xxx | 6–13 |
| 0001xxxx | 14–29 |
| 00001xxxxx | 30–61 |
| 000001xxxxxx | 62–127 |
| 0000001xxxxx | 128–159 |
| 00000000 00xxxx | hole |
| 00000000 010000 to 00000001 101111 | 160–255 |

Both of these codebooks have a "hole"—a single range of code words in the lexicographically-ordered list that is not allowed to occur. Since these code words are not part of the codebook, the codebook values continue consecutively after skipping the "hole." The hole for the macroblock codebook comprises the single code word (00000000) (the first code in the 4* section). The hole for the block codebook comprises the 16 code words beginning with (00000000 000000) (the first code in the 6* section). These holes guarantee that the picture start code PictureStartCode and the slice start code SliceStartCode cannot be emulated elsewhere in the compressed bitstream.

Temporal Post-Filtering

Referring again to FIG. 4, during the generation of the companded reference frame corresponding to the current input frame, a temporal post-filter is preferably applied to clamped Y component signals (step 432 of FIG. 4). The temporal post-filter replaces the current reconstructed frame by a weighted sum of the current and previous frames. Temporal post-filtering has the effect of reducing mosquitoes and other compression artifacts. The temporal post-filter is preferably only applied to the inter blocks of the Y-component plane.

The temporal post-filter is preferably identical to the temporal pre-filter described earlier in this specification in the section entitled "Temporal Pre-Filtering." A preferred temporal post-filter is represented as follows:

$$c'=\{c+(p-c+(1<<s))\}>>(s+1)$$

where c is a Y component of an inter macroblock of the current frame, p is the corresponding non-motion-compensated Y component of the reference frame, and s is the temporal filter strength. The temporal filter strength s may be either 1, 2, or 3, where s=1 corresponds to taking ¼ of the reference image, s=2 corresponds to taking ⅛ of the reference image, and s=3 corresponds to taking 1/16 of the reference image. The "(1<<2)" term is included to avoid drift due to integer math.

Temporal post-filtering is preferably not applied to empty macroblocks, or to empty blocks that have a motion vector of zero. In these cases, each current Y component (curr[][]) is identical to the corresponding non-motion-compensated Y component (prev[][]) from the reference frame. Temporal post-filtering is, however, preferably applied to empty blocks with non-zero motion vectors.

Compressed Video Signal Format

Referring now to FIG. 15, there is shown a representation of the bitstream format of the compressed video signals generated by pixel processor 302 of FIG. 3 and decoded by host processor 202 of FIG. 2, according to a preferred embodiment of the present invention. The asterisks (*) in FIG. 15 indicate those fields that start on a byte boundary.

The compressed video bitstream format for one video frame comprises a picture header followed by one or more slice fields for each component plane of the video frame. A slice is a contiguous group of one or more rows of macroblocks of a component plane. Each component plane may be divided into one or more slices and a slice may not extend over more than one component plane. Thus, each video frame is represented by a picture header followed by three or more slice fields. Component planes are divided into slices to provide reduced encode/decode latency as well as resilience to bitstream errors and loss of frames or partial frames on a network.

The bits of the compressed video bitstream of FIG. 15 are preferably inserted in each byte of data in the order LSB to MSB. Bytes are preferably inserted in increasing sequence (byte 0, 1, 2, . . . ). Therefore, the first bit of the bitstream is byte 0 bit 0, followed by byte 0 bit 1, up to byte 0 bit 7, and followed by byte 1 bit 0.

Picture Header

The 18-bit PictureStartCode signal of the picture header of FIG. 15 is a bitstream pattern that identifies the start of a frame. PictureStartCode is a unique code that preferably does not occur anywhere else in the bitstream. As a result, the decoder may scan a compressed signal for PictureStartCode to provide some degree of automatic synchronization and error recovery. PictureStartCode preferably has the 18-bit binary value (00000000 00000000 10).

The 4-bit VersionNumber signal identifies the particular version of the compressed video signal format and is preferably 1.

The 2-bit ImageSize signal identifies the size of the encoded image. Table IV contains the image sizes for the different values of ImageSize. An ImageSize signal value of 3 indicates that the size of the encoded image is explicitly specified in the picture header in the ImageXSize and ImageYSize signals (described below). If ImageSize is not 3, then ImageXSize and ImageYSize signals are not included in the picture header.

TABLE IV

Image Sizes Indicated by the ImageSize Signal.

| ImageSize Value | Image Size |
|---|---|
| 0 | (160x120) |
| 1 | (240x180) |
| 2 | (320x240) |
| 3 | defined |

The 2-bit TempFiltStrength signal specifies the strength of the temporal post-filter. Table V contains the temporal post-filter strengths for the different values of TempFiltStrength. A TempFiltStrength signal value of 0 indicates that the temporal post-filter is turned off for this image. The temporal post-filter is described in further detail earlier in this specification in the section entitled "Temporal Post-Filtering."

TABLE V

Temporal Post Filter Strengths Indicated by the TempFiltStrength Signal.

| TempFiltStrength Value | Filter Strength |
|---|---|
| 0 | off |
| 1 | 1/4 |
| 2 | 1/8 |
| 3 | 1/16 |

The 3-bit QuantMatrices signal encodes the quantization matrices the decoder should use for this frame. There are preferably 32 different quantization matrices—16 for use in intra blocks and 16 for use in inter blocks. These 32 quantization matrices may be derived from two base matrices (one for intra and one for inter), five quantization parameters, and a flag (PowersOf2). The generation of the 32 quantization matrices from the two base matrices, five quantization parameters, and PowersOf2 flag is described in further detail later in this specification in the section entitled "Generation of Quantization Matrices."

Table VI identifies which base matrices, quantization parameters and PowersOf2 flags to use for the different values of QuantMatrices. "Default" indicates that the specified default base matrices or specified default values for the five quantization parameters are to be used to generate the 32 quantization matrices. "In QuantData" indicates that the matrices and/or parameters are specified in the QuantData signal of the picture header. "From Past" indicates that the matrices and/or parameters (which must have been set on a previous frame) are inherited from the past). The QuantMatrices values 5–7 are preferably reserved.

TABLE VI

Base Matrices, Quantization Parameters, and PowersOf2 Flag Values Indicated by the QuantMatrices Signal.

| QuantMatrices Value | Base Matrices | Quantization Parameters | PowersOf2 |
|---|---|---|---|
| 0 | Default | Default | 0 |
| 1 | Default | Default | 1 |
| 2 | Default | In QuantData | In QuantData |
| 3 | In QuantData | In QuantData | In QuantData |
| 4 | From Past | From Past | From Past |
| 5–7 | | . . . Reserved . . . | |

A value of 1 for the 1-bit IntraFlag signal indicates that this frame is entirely intra encoded (i.e., that each block of each macroblock of each slice of each component plane of the current frame is intra encoded). If the IntraFlag signal value is 0, then this frame may include both intra and inter blocks.

The 2-bit Reserved1 signal is reserved and preferably has a value of 0.

The 10-bit FrameNumber signal contains a counter that indicates to the decoder the receipt of successive video frames. The encoder preferably increments this signal by 1 (modulo (1024) for each frame it encodes. The decoder preferably uses the FrameNumber signal to determine whether any frames have been "lost" (except in the unusual case in which a integer multiple of 1024 frames in a row are lost).

The 6-bit Reserved2 signal is reserved and preferably has a value of 0.

As indicated in Table IV, when the ImageSize signal has a value of 3, the ImageXSize signal defines the width of the image in pixels (or, equivalently, the number of Y components per image row) and the ImageYSize signal defines the height of the image in pixels (or, equivalently, the number of Y components per image column). When the ImageSize signal has a value other than 3, the picture header does not include an ImageXSize signal or an ImageYSize signal.

Referring now to FIG. 16, there is shown a representation of the bitstream format of the QuantData signal of the compressed video signal format of FIG. 15. The asterisks (*) in FIG. 16 indicate those fields that start on a byte boundary. As indicated in Table VI, when the QuantMatrices signal has a value of 2, the QuantData signal defines the five quantization parameters and the PowersOf2 flag. When the QuantMatrices signal has a value of 3, the QuantData signal defines the five quantization parameters, the PowersOf2 flag, and the two base matrices (as shown in FIG. 16). When the QuantMatrices signal has a value other than 2 or 3, the picture header does not include a QuantData signal. Each base matrix consists of 64 6-bit fields packed into 48 bytes. The inter base matrix is first, followed by the intra base matrix. How the five 6-bit quantization parameters (QuantStart, QuantStep, DCstep, Tilt[0], and Tilt [1]), the 1-bit PowersOf2 flag, and the base matrices are used to generate quantization tables is described in further detail later in this specification in the section entitled "Generation of Quantization Matrices."

Slice Signals

Figure 17:
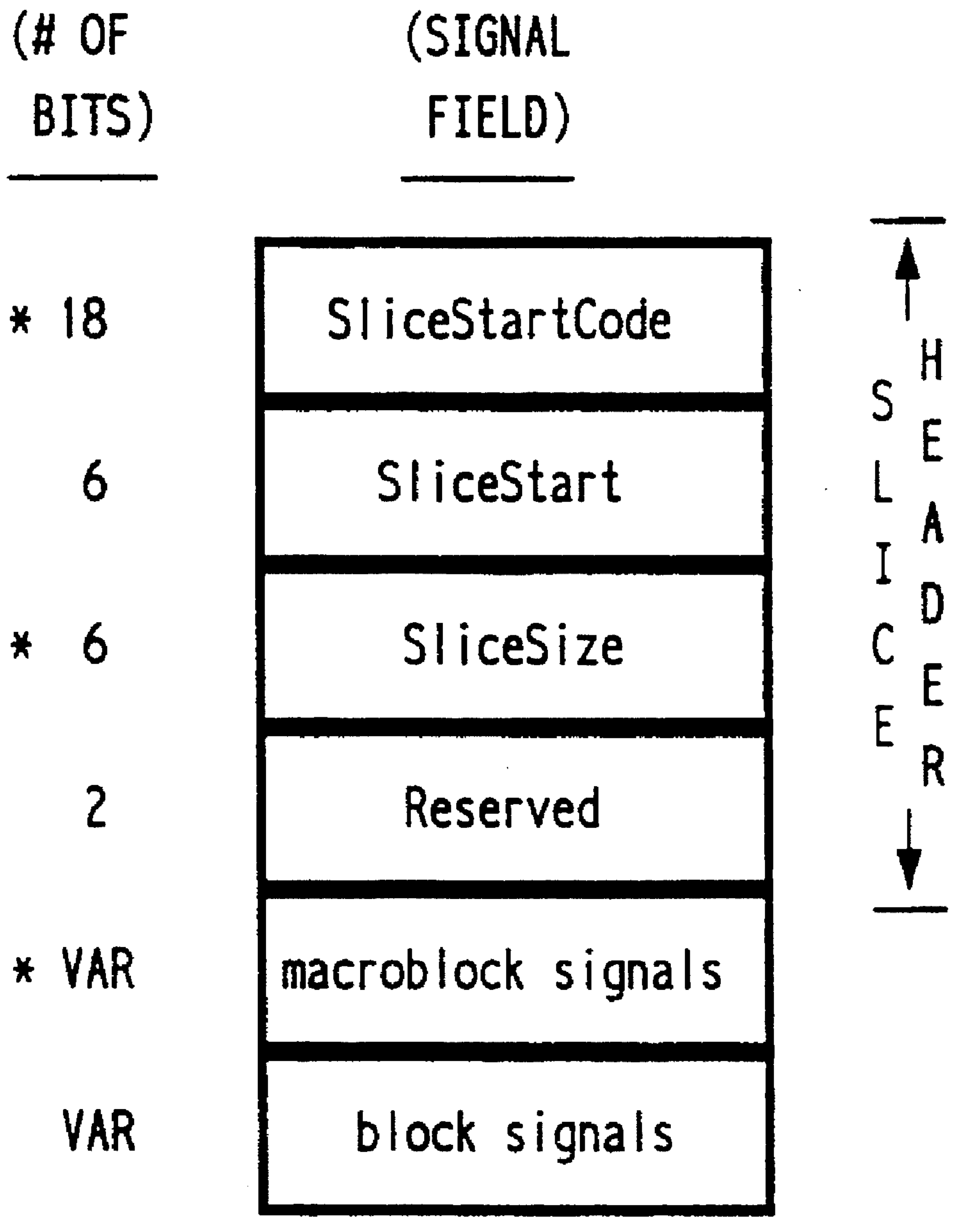
FIG. 17 is a representation of the bitstream format of each slice signal of the compressed video signal format of FIG. 15.

Referring now to FIG. 17, there is shown a representation of the bitstream format of each slice signal of the compressed video signal format of FIG. 15. The asterisks (*) in FIG. 17 indicate those fields that start on a byte boundary. The bitstream format for each slice comprises a slice header, followed by a field containing the macroblock signals, followed by a field containing the block signals. Note that the macroblock signals start on a byte boundary, but that the block signals need not, as they are concatenated to the end of the macroblock signals. Note also that all of the macroblock signals for the entire slice are encoded before any of the block signals are encoded.

Slice Header

The 18-bit SliceStartCode signal of the slice header of FIG. 17 is a bitstream pattern that identifies the start of a slice. SliceStartCode is a unique code that preferably does not occur anywhere else in the bitstream. As a result, as with the PictureStartCode signal, the decoder may scan a compressed signal for SliceStartCode to provide some degree of automatic synchronization and error recovery. SliceStartCode preferably has the 18-bit binary value (00000000 00000000 11).

The 6-bit SliceStart signal specifies where the slice starts in the image. The units of SliceStart are interpreted as follows: Take the rows of macroblocks in the Y, V, and U planes and list them in scan-line order. The value of SliceStart is the (zero-based) index into this list. For example, in a (160×120) image, there are 8 rows of macroblocks in the Y plane, and 2 rows in each of the V and U planes. For this image, SliceStart would have values from 0 to 11, where 0 represents the top row of macroblocks in the Y plane, 7 represents the bottom row of macroblocks in the Y plane, 8 represents the top row of macroblocks of the V plane, etc.

The 6-bit SliceSize signal specifies the size of the slice in rows of macroblocks.

The 2-bit Reserved signal is reserved and preferably has a value of 0.

Macroblock Signals

The macroblock signals of the slice signal format of FIG. 17 describe the structure of each macroblock in a slice. The macroblock signals comprise a series of records of the form:

Empty [Empty . . . ] Type [QValue] [MV] [CBP]

followed by an optional macroblock separator signal. The macroblock signals are run-length encoded signals comprising interleaved runs of empty macroblocks followed by information about the next non-empty macroblock. The brackets indicate that the existence of a particular signal depends on the values of other signals, as described below. The macroblock separator signal preferably has the value (00011111) and is provided as a convenience to help the decoder switch from decoding the macroblock signals to decoding the block signals.

Each record in the macroblock signals has one or more Empty signals, which indicate how many empty macroblocks there are between the current non-empty macroblock and the previous non-empty macroblock. The number of consecutive empty macroblocks is Huffman encoded using a codebook that has a maximum value that is less than the longest allowable run of empty macroblocks. As a result, there may be more than one Empty signal to indicate a long run of empty macroblocks. In that case, the run of empty macroblocks is interpreted as the sum of the values corresponding to the two or more Empty signals. A macroblock is empty if all of the quantized DST coefficients of each of the four blocks of the macroblock are zero.

The Type signal encodes four pieces of information that are encoded using both a semantic table and a Huffman codebook. The four pieces of information may be represented as four 1-bit signals (Intra, NewQ, MV, and CBP). Table VII presents the semantic table for the information encoded in the Type signal. The 4-bit value of Table VII is the value of the bits corresponding to the four pieces of information. These 4-bit values are mapped by the semantic table to Huffman values that are then encoded using the Huffman codebook.

TABLE VII

Semantic Table for Information Stored in Type Signal.

| Intra | NewO | MV | CBP | 4-bit Value | Huffman Value |
|---|---|---|---|---|---|
| 0 | 0 | 0 | 1 | 1 | 0 |
| 0 | 0 | 1 | 1 | 3 | 1 |
| 1 | 0 | 0 | 0 | 8 | 2 |
| 0 | 1 | 1 | 1 | 7 | 3 |
| 0 | 1 | 0 | 1 | 5 | 4 |
| 1 | 1 | 0 | 0 | 12 | 5 |
| 0 | 0 | 1 | 0 | 2 | 6 |

The 1-bit CBP bit (bit 0 of the 4-bit value of Table VII) is 1, if a CBP signal is present in the current record. If the CBP bit is 0, then a CBP signal is not present and all four blocks of the macroblock are empty.

The 1-bit MV bit (bit 1) is 1, if an MV signal is present in the current record. If the MV bit is 0, then an MV signal is not present and its motion vector is zero. Similarly, the motion vector for an empty macroblock is zero.

The 1-bit NewQ bit (bit 2) is 1, if a QValue signal is present in the current record. If the NewQ bit is 0, then a QValue signal is not present and the quantization level for the current macroblock is the same as the quantization level for the previous macroblock (whether empty or non-empty).

If the 1-bit Intra bit (bit 3) is 1, then all four blocks of the current macroblock are intra encoded. If the Intra bit is 0, then all four blocks of the current macroblock are inter encoded. In a preferred embodiment, a macroblock may not be partially inter encoded and partially intra encoded.

Depending upon the value encoded in the Type signal, a record may also include a QValue signal, an MV signal, and a CBP signal.

The QValue signal is a Huffman-encoded signal that represents a differential quantization level. The quantization level for this macroblock (thisQ) is calculated from the quantization level for the previous macroblock (prevQ) as follows:

thisQ=prevQ+tosigned (QV+1), where QV represents the Huffman-decoded value corresponding to the Huffman-encoded QValue signal and tosigned() is a function which converts from an unsigned signal to a signed signal and is defined the following C computer language code:

```
tosigned (val)
{
    r = (val + 1) >> 1;
    if (val is even)
        return (r);
    else
        return (-r);
}
```

The resulting thisQ signal is a 4-bit signal that specifies which of 16 quantization matrices to use. The value of prevQ is preferably initialized to 8 at the start of each slice.

The MV signal comprises two Huffman-encoded signals that represent differential motion vector X and Y components. The motion vector components for the current macroblock (thisMVx, thisMVy) are generated from the motion vector components for the previous macroblock (prevMVx, prevMVy), following the raster scan sequence of FIG. 5, as follows:

this$MVx$=prev$MVx$+tosigned ($MVx$)

and this$MVy$=prev$MVy$+tosigned ($MVy$)

where MVx and MVy represent the Huffman-decoded values corresponding to the first and second Huffman-encoded signals in the MV signal, respectively, and tosigned() is the same function as defined above. A positive X component means that the reference block in the previous frame is to the right of the block in the current frame. A positive Y component means that the reference block is below the block in the current frame. At the start of each row of macroblocks, the motion vector of the previous macroblock (prevMVx, prevMVy) is preferably set to be the zero vector (0,0).

The CBP (or coded block pattern) signal specifies which blocks in the current macroblock are empty. That information is encoded in the CBP signal using both a semantic table and a Huffman codebook. Table VIII presents the semantic table for the information encoded in the CBP signal. The 4-bit value of Table VIII specifies the emptiness of the four blocks of the macroblock in the order (4,3,2,1), where the LSB of the 4-bit value corresponds to block 1 of the macroblock as defined in FIG. 5. A bit value of 1 means that the corresponding block is non-empty; 0 means that the block is empty. The 4-bit values are mapped by the semantic table to Huffman values that are then encoded using the Huffman codebook.

TABLE VIII

Semantic Table for Information Stored in CBP Signal.

| Block 4 | Block 3 | Block 2 | Block 1 | 4-bit Value | Huffman Value |
|---|---|---|---|---|---|
| 1 | 1 | 1 | 1 | 15 | 0 |
| 0 | 0 | 1 | 1 | 3 | 1 |
| 1 | 1 | 1 | 0 | 14 | 2 |
| 1 | 1 | 0 | 1 | 13 | 3 |
| 1 | 1 | 0 | 0 | 12 | 4 |
| 0 | 1 | 1 | 1 | 7 | 5 |
| 0 | 1 | 0 | 0 | 4 | 6 |
| 1 | 0 | 0 | 0 | 8 | 7 |
| 1 | 0 | 1 | 1 | 11 | 8 |
| 0 | 0 | 0 | 1 | 1 | 9 |
| 1 | 0 | 1 | 0 | 10 | 10 |
| 0 | 0 | 1 | 0 | 2 | 11 |
| 0 | 1 | 0 | 1 | 5 | 12 |
| 0 | 1 | 1 | 0 | 6 | 13 |
| 1 | 0 | 0 | 1 | 9 | 14 |

If all four blocks are empty, then the CBP bit of the Type signal is set to 0 and no CBP signal is present in the record. As a result, Table VIII does not have a 4-bit value of 0.

There are two special cases. If the Type signal indicates that the macroblock is intra encoded, then each of the four blocks is assumed to be non-empty and no CBP signal is present in the record. If the Type signal indicates that the macroblock is inter encoded and if the Type signal indicates that the CBP signal is not present (i.e., the CBP bit is 0), then each of the four blocks is assumed to be empty.

Block Signals

The block signals of the slice signal format of FIG. 17 encode information for each of the non-empty blocks in the slice. The block signals are a series of Huffman-encoded run-val pairs terminated by a block separator signal comprising a string of 14 zero bits. Each run-val pair corresponds to a run of DST coefficients having value 0 followed by a non-zero DST coefficient value. Common run-val pairs are encoded with a single RVcode which is used as an index to a run table (runtbl) and a value table (valtbl).

The 14-bit block separator signal is provided as a convenience to help the decoder switch from decoding the block signals to decoding the next slice signal. The block separator signal permits the decoder to parse syntactically all the block signals without doing any semantic processing. The block separator signal corresponds to the first code in the "hole" in the block codebook.

For all but the last slice in a frame, the encoder preferably uses the zero bits which begin the next slice header (i.e., first part of SliceStartCode) to serve the function of the 14-bit block separator signal of the block signal, so that no extra bits in the bitstream are required. The encoder preferably pads the last byte of each slice using zero bits, and if the encoder inserts any padding bytes between slices, they are preferably all zero. At the end of the last slice in a frame, the encoder preferably specifically inserts the 14 zero bits.

Video Signal Decoding

Figure 18:
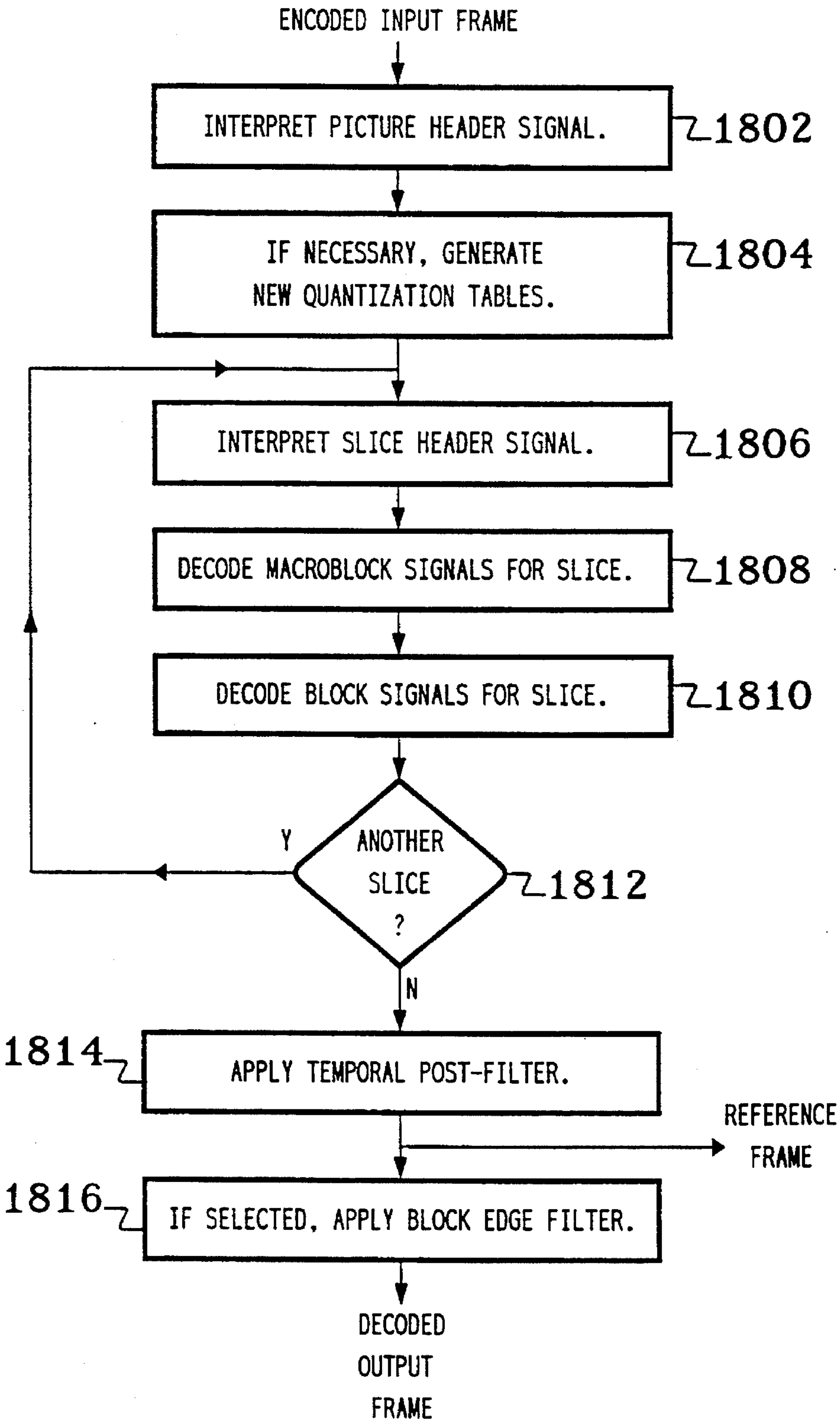
FIG. 18 is a process flow diagram of the processing implemented by the host processor of FIG. 2 to decode each frame of the encoded video signals generated by the pixel processor of FIG. 3.

Referring now to FIG. 18, there is shown a process flow diagram of the processing implemented by host processor 202 of FIG. 2 to decode each frame of the encoded video signals generated by pixel processor 302 of FIG. 3, according to a preferred embodiment of the present invention. As described earlier in the specification in conjunction with FIGS. 15, 16, and 17, the encoded signals for each video frame comprise a picture header signal followed by three or more slice signals for the three component planes. Each slice signal comprises a slice header, followed by Huffman-encoded macroblock signals, followed by Huffman-encoded block signals. Decoding the encoded video signals involves:

- Interpreting the picture and slice header signals;
- Huffman-decoding and interpreting the macroblock signals; and
- Decoding (including Huffman-decoding) the block signals.

Huffman decoding is described in further detail later in this specification in the section entitled "Variable-Length Decoding."

Referring again to FIG. 18, decoding of an encoded input frame begins by interpreting the picture header signal (step 1802 of FIG. 18). The interpretation of picture header signals is substantially dictated by the format of those signals as described earlier in the specification in conjunction with FIGS. 15 and 16.

If indicated by the picture header signal, new quantization tables are then generated (step 1804). The generation of quantization tables is described in further detail in a later section of this specification entitled "Generation of Quantization Matrices."

The signals for each slice of the frame are then decoded. Decoding a slice signal begins with interpretation of the slice header signal (step 1806). The interpretation of slice header signals is substantially dictated by the format of those signals as described earlier in the specification in conjunction with FIG. 17.

After interpreting the slice header signal, the macroblock signals for the slice are decoded (step 1808). The decoding of macroblock signals is described in further detail later in this specification in conjunction with FIGS. 19 and 20 and in the section entitled "Decoding Macroblock Signals."

After decoding the macroblock signals, the block signals for the slice are decoded (step 1810). The decoding of block signals is described in further detail later in this specification in conjunction with FIGS. 21 and 22 and in the section entitled "Decoding Block Signals."

If there is another slice for the current frame (step 1812), then steps 1806, 1808, and 1810 are repeated for the next slice. Otherwise, the entire frame has been decoded and temporal post-filtering is applied to the reconstructed Y component plane (step 1814). The results of temporal post-filtering are used as the reference frame for decoding the next frame of encoded video signals. Temporal post-filtering was described in further detail earlier in this specification in the section entitled "Temporal Post-Filtering." In an alternative preferred embodiment, the decoder applies the temporal filter to the inter encoded blocks at the same time that it adds the prediction to the correction, and then clamps the results.

After temporal post-filtering, a block edge filter is applied, if selected (step 1816). Block edge filtering is described in further detail later in this specification in the section entitled "Block Edge Filtering." The results of block edge filtering are the decoded output frame signals corresponding to the current input frame signals. These signals may then be converted for display on monitor 106 of the local conferencing system of FIG. 1.

Decoding Macroblock Signals

Figure 19:
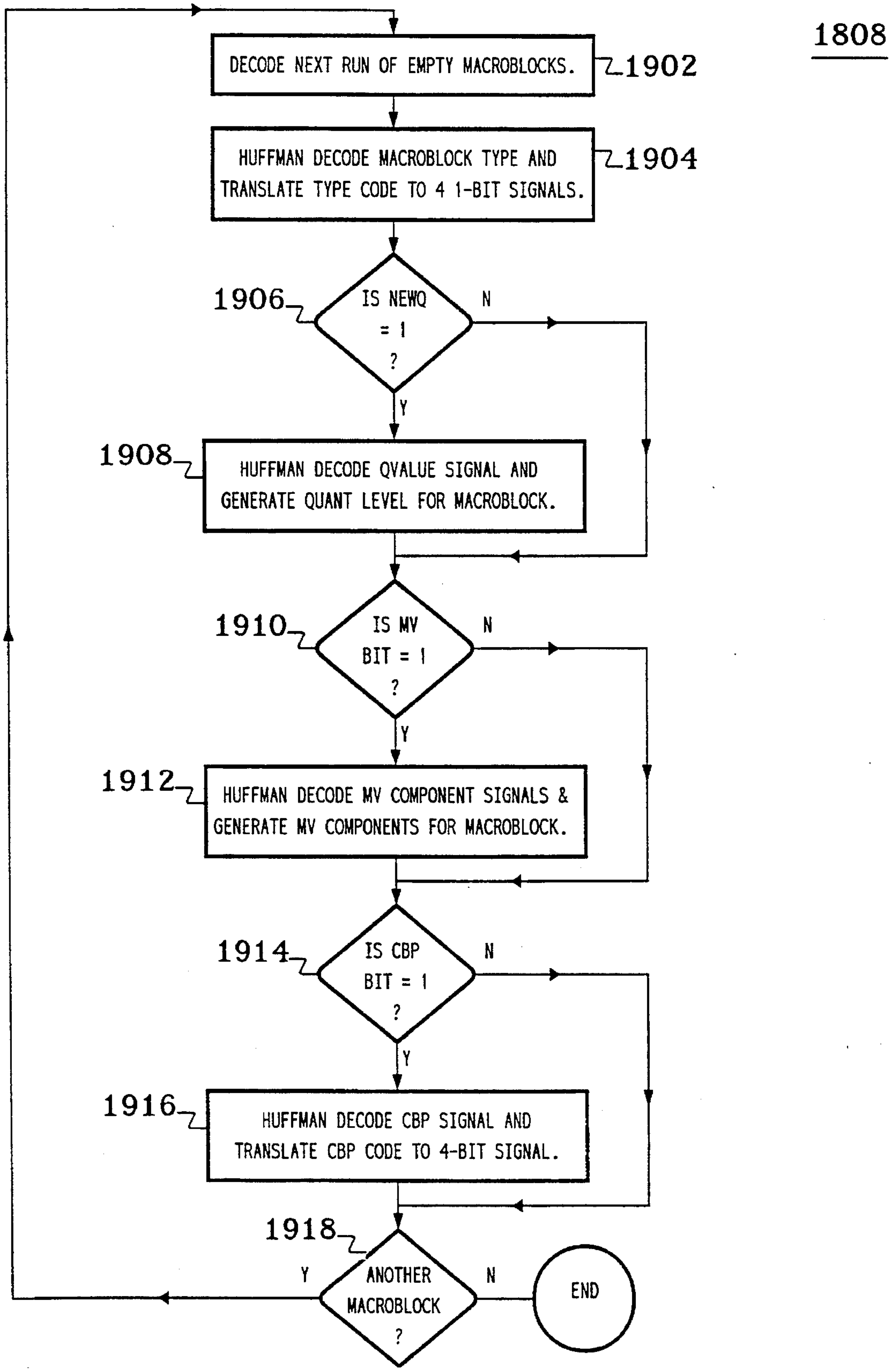
FIG. 19 is a process flow diagram of the processing implemented by the host processor of FIG. 2 to decode the macroblock signals for each slice of each frame of encoded video signals.

Referring now to FIG. 19, there is shown a process flow diagram of the processing implemented by host processor 202 of FIG. 2 to decode the macroblock signals for each slice of each frame of encoded video signals, according to a preferred embodiment of the present invention. The processing of FIG. 19 is equivalent to step 1808 of FIG. 18. As described earlier in this specification in the section entitled "Macroblock Signals," the macroblock signals comprises a series of records of the form:

Empty [Empty . . . ] Type [QValue] [MV] [CBP]

followed by a macroblock separator signal.

Decoding of the macroblock signals begins by decoding the first run of empty macroblocks encoded in the "Empty [Empty . . . ]" signals of the first macroblock record (step 1902 of FIG. 19). The decoding of runs of empty macroblocks is described in further detail later in this specification in conjunction with FIG. 20 and in the section entitled "Decoding Runs of Empty Macroblocks." Host processor 202 reconstructs the component planes using the runs of empty macroblocks, which were encoded in raster-scan sequence.

After decoding the run of empty macroblocks, the Type signal for the current macroblock (i.e., the macroblock following the run of empty macroblocks in the raster-scan sequence) is Huffman decoded and translated using the semantic relationships of Table VII into the corresponding 4 1-bit signals (Intra, NewQ, MV, and CBP) (step 1904). Huffman decoding is described in further detail later in this specification in the section entitled "Variable-Length Decoding."

If the 1-bit NewQ signal is set (i.e., preferably 1) (step 1906), then the current macroblock record contains a Huffman-encoded QValue signal. In that case, the QValue signal is Huffman decoded and the decoded value is used to generate the quantization level (thisQ) for the current macroblock using the relation described earlier in this specification in the section entitled "Macroblock Signals" (step 1908). Otherwise, the NewQ bit is not set and processing continues to step 1910.

If the 1-bit MV signal is set (i.e., preferably 1) (step 1910), then the current macroblock record contains two Huffman-encoded signals that represent differential motion vector X and Y components. In that case, the signals are Huffman decoded and the decoded component value are used to generate the motion vector components (thisMVx, thisMVy) for the current macroblock using the relation described earlier in this specification in the section entitled "Macroblock Signals" (step 1912). Otherwise, the MV bit is not set and processing continues to step 1914.

If the 1-bit CBP signal is set (i.e., preferably 1) (step 1914), then the current macroblock record contains a semantic and Huffman-encoded CBP signal. In that case, the CBP signal is Huffman decoded and translated using the semantic relationships of Table VIII into the corresponding 4-bit signal that indicates which blocks in the current macroblock are empty (step 1916), as described earlier in this specification in the section entitled "Macroblock Signals" Otherwise, the CBP bit is not set and processing continues to step 1918.

If the current slice has another macroblock record (step 1918), then processing returns to step 1902 to repeat steps 1902–1916 for the next macroblock record. Otherwise, all of the macroblock signals for the current slice have been decoded. In a preferred embodiment, the end of the macroblock signals may be detected by recognizing the macroblock separator signal.

In an alternative preferred embodiment, the decoder Huffman decodes all of the signals for an entire slice (i.e., all macroblock signals, a transition signal, and all block signals) before interpreting and applying the actions of the semantic Huffman decoded signals.

Decoding Runs of Empty Macroblocks

Figure 20:
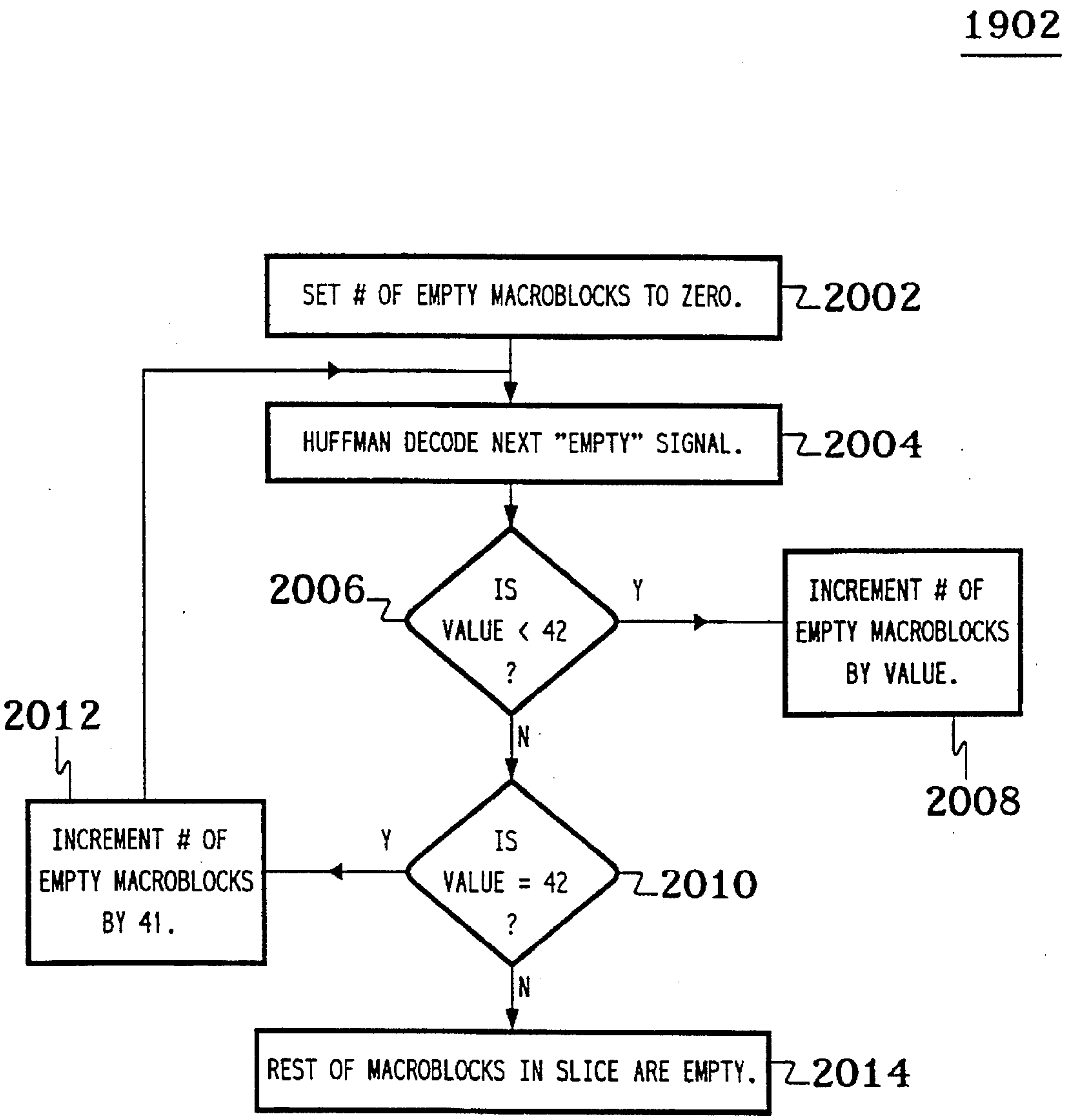
FIG. 20 is a process flow diagram of the processing implemented by the host processor of FIG. 2 to decode each run of macroblocks for each slice of each frame of encoded video signals.

Referring now to FIG. 20, there is shown a process flow diagram of the processing implemented by host processor 202 of FIG. 2 to decode each run of macroblocks for each slice of each frame of encoded video signals, according to a preferred embodiment of the present invention. The processing of FIG. 20 is equivalent to step 1902 of FIG. 19. As described earlier in this specification in the section entitled "Macroblock Signals," a run of empty macroblocks may exceed the maximum code value of 43 for the Huffman codebook used to encode macroblock signals. A run of 42 or more empty macroblocks is therefore preferably encoded using two or more Empty signals. This section describes the decoding of those two or more Empty signals.

After initializing the counter for the number of empty macroblocks (step 2002), the next Empty signal (in this case, the first Empty signal) is Huffman decoded (step 2004). If the decoded value is less than 42 (step 2006), then the current Empty signal is the last Empty signal for the current macroblock record and the counter is incremented by the decoded value (step 2008).

Otherwise, if the decoded value is equal to 42 (step 2010), then there is at least one more Empty signal for the current macroblock record, the counter is incremented by 41 (step 2012), and processing returns to step 2010 to process the next Empty signal. Otherwise, the decoded value is 43 which signifies that all of the remaining macroblocks in the current slice are empty (step 2014).

Note that, for example, when a run has exactly 42 empty macroblocks, the encoder preferably generates two Empty signals: one corresponding to a code of 42 and one corresponding to a code of 1. The decoder interprets a code of 42 as indicating 41 empty macroblocks. In general, a code of 41 implies that there are exactly 41 additional empty macroblocks, while a code of 42 implies that there are more than 41 additional empty macroblocks.

The processing of FIG. 20 may be represented by the following C computer language code:

```
empty = 0          \\ initialize number of empty macroblocks
while (1)
{
    code = gethuff();     \\ retrieve and decode next signal
    if (code < 42)
```

```
    {
      empty += code;          \\ increment empty by code
      break;
    }
    else if (code == 42)
      empty += 41;            \\ increment empty by 41
    else if (code == 43)
      all macroblocks to end of slice are empty
}
```

where the function gethuff() retrieves and decodes the next Huffman-encoded signal in the bitstream. The gethuff() function and Huffman decoding are described in further detail later in this specification in the section entitled "Variable-Length Decoding."

Decoding Block Signals

Figure 21:
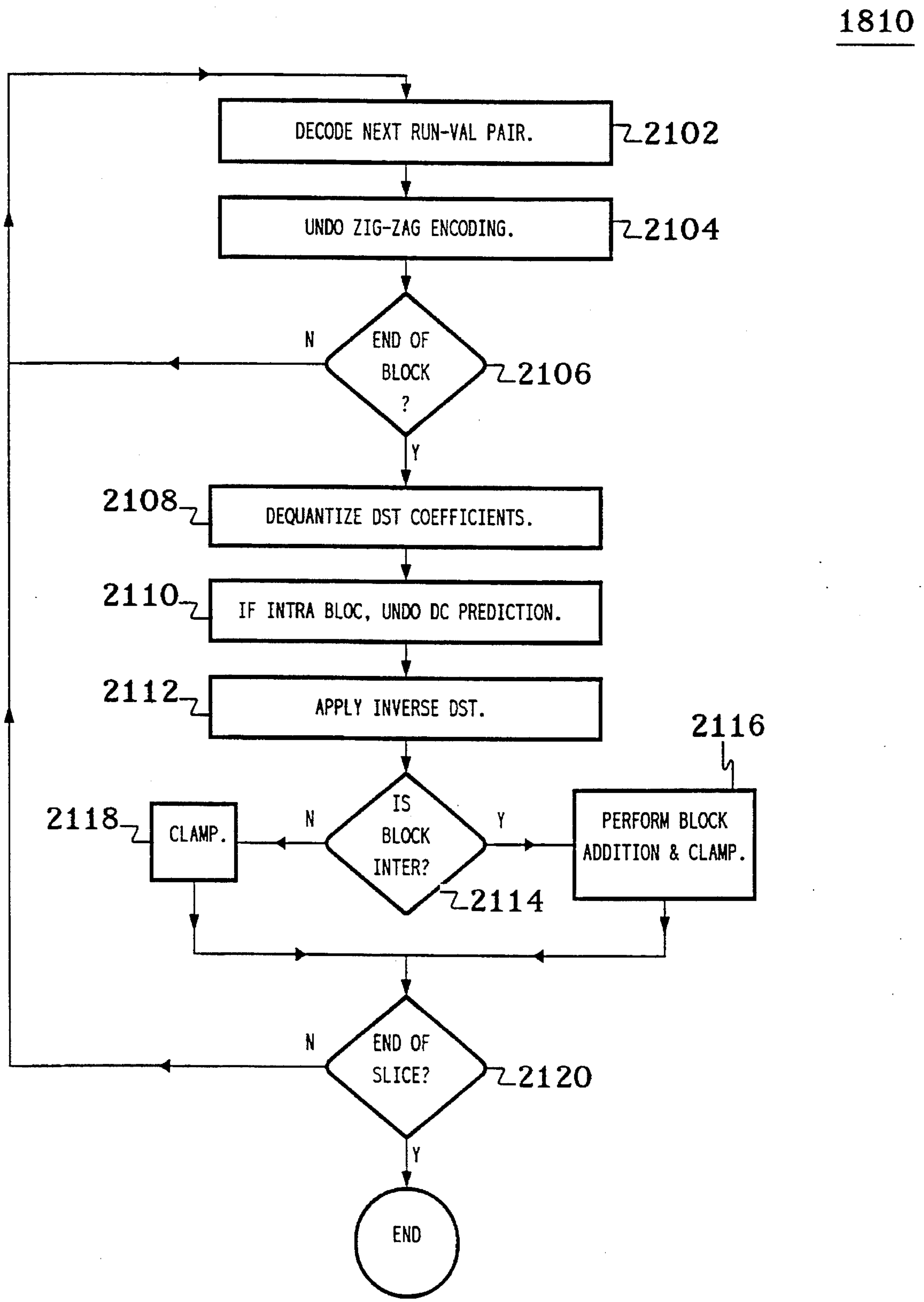
FIG. 21 is a process flow diagram of the processing implemented by the host processor of FIG. 2 to decode the block signals for each slice of each frame of encoded video signals.

Referring now to FIG. 21, there is shown a process flow diagram of the processing implemented by host processor 202 of FIG. 2 to decode the block signals for each slice of each frame of encoded video signals, according to a preferred embodiment of the present invention. The processing of FIG. 21 is equivalent to step 1810 of FIG. 18.

As described earlier in this specification in the section entitled "Block Signals," the block signals comprise a series of Huffman-encoded run-val pairs terminated by a block separator signal comprising a string of 14 zero bits. Each run-val pair corresponds to a run of DST coefficients having value 0 followed by a non-zero DST coefficient value. Common run-val pairs are encoded with a single RVcode which is used as an index to a run table (runtbl) and a value table (valtbl). Those run-val pairs that are not contained in the lookup tables are encoded as four Huffman-encoded signals per run-val pair—one for the escape code, one for the run, and two for the value.

Decoding of the block signals begins by decoding the first run-val pair of the first block in the sequence of block signals (step 2102 of FIG. 21). The decoding of run-val pairs is described in further detail later in this specification in conjunction with FIG. 22 and in the section entitled "Decoding Run-Val Pairs."

Host processor 202 reconstructs the (8×8) blocks of quantized DST coefficients using the runs of zero DST coefficients and the non-zero DST coefficient values to undo the zig-zag scanning sequence of FIG. 6 (step 2104). An (8×8) block of quantized DST coefficients (coeff[8][8]) may be created by the following procedure:

```
for (i=0; i<8; i++)
    for (j=0; j<8; j++)
        coeff [i] [j] = 0;
start at position "–1' on the zig-zag path (one step "before" 0)
for (each run/val pair)
{
    step forward by 'run' positions on the zig-zag path
    deposit 'val' at the new position
}
```

If the end of the current block has not yet been reached (step 2106), then processing returns to step 2102 to decode the next run-val pair. Otherwise, the current block of quantized coefficients is complete and the DST coefficients are dequantized (step 2108). This dequantization may be implemented using the following C computer language code:

```
for (i=0; i<8; i++)
    for (j=0; j<8; j++)
    {
      q = Qmatrix [Intra] [thisQ] [i] [j];
      c = coeff [i] [j];
      if (c > 0)
        coeff [i] [j] = (q * c) + (q >> 1) – (q & 1);
      else if (c < 0)
        coeff [i] [j] = (q * c) – (q >> 1) + (q & 1);
      else if (c == 0)
        coeff [i] [j] = 0;
}
```

where Qmatrix[2][16][8][8] is a table that contains the 32 (8×8) quantization tables. The generation of these 32 quantization tables is described in further detail later in this specification in the section entitled "Generation of Quantization Matrices." The particular quantization table to use to dequantize the current block is specified by the Intra bit (encoded in the Type signal for the current macroblock) and the quantization level (thisQ).

If the current block is an intra block, then the DC prediction for the DC coefficient (i.e., the (0,0) coefficient in the (8×8) block) is undone (step 2110). Undoing DC prediction is implemented by incrementing the DC coefficient (prevDC) for the previous intra block in the current slice (following the block scanning sequence of FIG. 5) by the dequantized (0,0) coefficient for the current block (generated in step 2108). Undoing DC prediction may be implemented by the following C computer language code:

```
coeff [0] [0] += prevDC
prevDC = coeff [0] [0]
```

The value of prevDC is preferably initialized to 8*64 or 512 at the start of each image slice. Those skilled in the art will understand that this preferred initial value for prevDC represents the gray level midway between 0 and 127, times 8 (to scale the integer arithmetic to allow three fractional bits).

The inverse discrete slant transform (IDST) is then applied to the (8×8) blocks of dequantized DST coefficients to reconstruct (8×8) blocks of pixel components (step 2112). The IDST is described in further detail later in this specification in the section entitled "Discrete Slant Transform."

If the current block is an inter block (step 2114), then the pixel component signals are generated by performing block addition with respect to the previous frame and clamping the results (step 2116). This inter block decoding may be represented by the following C computer language code:

```
for (i=0; i<8; i++)
  for (j=0; j<8; j++)
    image [i] [j] = clamp (MCprev [i] [j]) + array [i] [j],8,120);
```

where array[][] contains the results of the IDST calculation, MCprev[][] is the corresponding motion-compensated (8×8) block of component signals from the previous image, and the function clamp(n,min,max) limits a value n to the range (min,max).

In an alternative preferred embodiment, the block addition for decoding inter blocks may be implemented simultaneously for two different (8×8) blocks of the current image using pseudo-SIMD processing. Pseudo-SIMD processing is described in further detail in U.S. patent application Ser. No. 08/182,758, filed Jan. 14, 1994, assigned to the same assignee as the current application, and the disclosure of which is incorporated in its entirety herein by reference.

Otherwise, if the current block is an intra block (step 2114), then the pixel component signals for the current block are clamped (step 2118) as represented by the following C computer language code:

```
for (i=0; i<8; i++)
  for (j=0; j<8; j++)
    image [i] [j] = clamp (array [i] [j],8,120);
```

If the end of the current slice has not yet been reached (step 2120), then processing returns to step 2102 to decode the next run-val pair. Otherwise, the current slice is complete.

Decoding Run-Val Pairs

Figure 22:
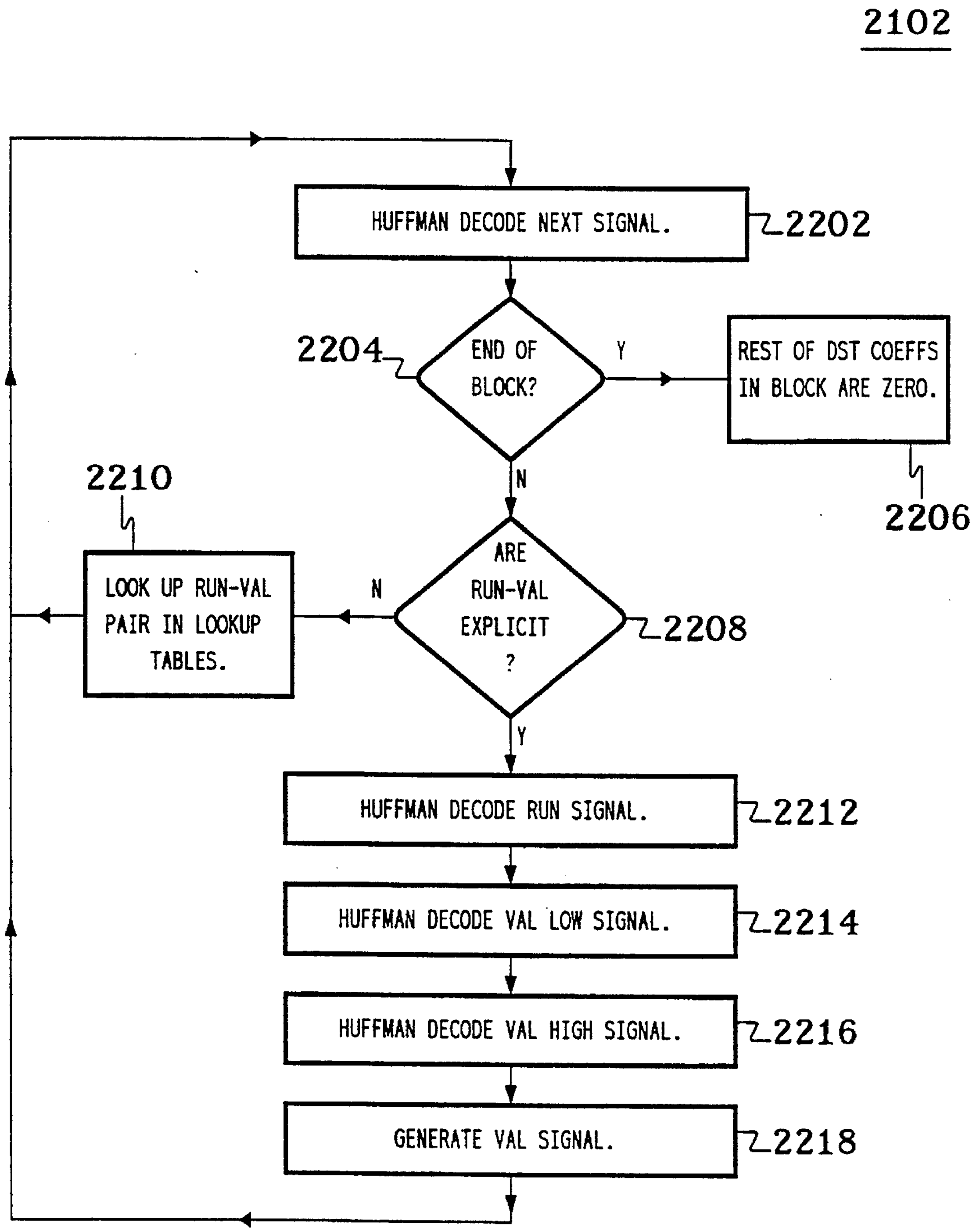
FIG. 22 is a process flow diagram of the processing implemented by the host processor of FIG. 2 to decode each run-val pair for each block of each frame of encoded video signals.

Referring now to FIG. 22, there is shown a process flow diagram of the processing implemented by host processor 202 of FIG. 2 to decode each run-val pair for each block of each frame of encoded video signals, according to a preferred embodiment of the present invention. The processing of FIG. 22 is equivalent to step 2102 of FIG. 21. As described earlier in this specification in the section entitled "Block Signals," each run-val pair is encoded either as a single Huffman-encoded signal corresponding to an index to a run table and a value table or explicitly as Huffman-encoded run and value signals.

Decoding a run-val pair begins by decoding the next Huffman-encoded signal in the bitstream (step 2202). If the decoded signal is the end of block code EOB (preferably 0) (step 2204), then the rest of the DST coefficients in the current block are zero (step 2206).

Otherwise, if the decoded signal is the escape code ESC (preferably 11) (step 2208), then the run-val pair are explicitly encoded in the bitstream. In that case, retrieving and Huffman-decoding the next signal in the bitstream produces the run code (step 2212). Similarly, retrieving and Huffman-decoding the next two signals in the bitstream produce the value low and high codes, respectively (steps 2214 and 2216). These low and high codes are then combined to generate the value code (step 2218), thereby completing the current run-val pair. Processing then returns to step 2202 to Huffman decode the next signal in the bitstream.

Otherwise, the decoded signal is not the escape code ESC (step 2208) and the run-val pair is a common pair that is encoded as an index to run table (runtbl) and value table (valtbl). In that case, the decoded index is used to access the run and value codes from the lookup tables (step 2210). Processing then returns to step 2202 to Huffman decode the next signal in the bitstream.

The processing of FIG. 22 may be represented by the following C computer language code:

```
k = 0;
while (1)
{
    v = gethuff();
    if (v == EOB)
        break;
    else if (v == ESC) // get explicit run,val from bitstream
    {
        run [k] = gethuff () + 1;
        lo = gethuff();
        hi = gethuff();
        val [k] = tosigned((lo | (hi << 6)) + 1);
    }
    else // lookup run,val in tables
```

-continued

```
    {
        run [k] = runtbl [v];
        val [k] = valtbl [v];
    }
    k++;
}
```

The gethuff() function and Huffman decoding are described in further detail later in this specification in the section entitled "Variable-Length Decoding." The tosigned() function is described earlier in this specification in the section entitled "Macroblock Signals." The preferred run and value tables are as follows:

```
runtbl[] = {
         0    1    1    2    2    1    1    3
         1    3    1    0    4    4    1    2
         1    2    5    5    1    6    1    6
         1    7    7    1    1    9    8    8
         2    9    1    2    3   10    1   10
         3    1   11    1    1    2    1   13
         1    4    4    1    1   11   12    2
        13    1    2   15    1    1   12   14
         3   14    1    2   15    5    6    5
         1    1    1    1    1    3    1    1
         6   16    2    1    1    7    1   21
         1    2    2    4    7   18    1   16
         1    1   17    2    8    4    1    8
        18   19    7   22    3   17    9    2
         4   20   10   19   10    1    1    2
        21   20   29   28   23   25    3    3
         3   24   26   26    2   12    9    2
         1    2    2   27   13   22    5    5
        28   30   23   32   27    2    3    6
         9    4   32   12   11   31   11   14
         3    3    3    3    2    6    8    7
         5   29   14    9   25   24    2    3
         2    6    6    8    7    4    4    4
        13   31   10   18    6    7    5    4
         5    5    4   10   21   30   19   18
        19   22   20   21   22   20   16   15
        15   17   17   16    3    3    4    4
         3    3    4    6    6    7    7    5
         4    4    5    6    5    5
    }
valtbl[] = {
         0   -1    1    1   -1   -2    2   -1
        -3    1    3    0    1   -1   -4   -2
         4    2   -1    1   -5    1    5   -1
        -6   -1    1    6    7   -1   -1    1
        -3    1   -7    3   -2   -1   -8    1
         2    8   -1    9   -9    4  -11    1
       -10   -2    2   10   11    1   -1   -4
        -1  -13   -5   -1  -12  -13    1    1
         3   -1   12    5    1    2    2   -2
       -15   14   16  -14   15   -3  -17   18
        -2   -1    6   17  -16    2   19   -1
       -19    7   -6   -3   -2    1  -22    1
       -20  -18   -1   -7    2    4   20   -2
        -1   -1   -3   -1   -4    1   -2   -8
         3    1   -2    1    2  -21   22    9
         1   -1   -1   -1   -1   -1    5   -5
         4   -1   -1    1    8   -2    2   11
        21   10  -11    1   -2    1    3   -3
         1   -1    1    1   -1   12    6    3
        -3   -4   -1    2   -2   -1    2    2
        -7   -9   -8    7  -12    5   -3    3
        -4    1   -2    3    1    1  -10    8
        -9   -4   -3    3   -4    6    5   -5
         2    1   -3   -2    4   -5    7   -6
         5   -5    7    3    2    1    2    2
        -2   -2    2   -2    2   -2   -2    2
        -2    2   -2    2   -6  -10   -8   -9
        10    9   -7    6   -5    5    4   -7
         9    8    6   -6   -6    4
    }
```

Note that runtbl[0]=valtbl[0]=0 and that runtbl[11]=valtbl

[11]=0, because the values 0 and 11 are reserved for the EOB and ESC signals, respectively.

Discrete Slant Transform

The forward discrete slant transform (FDST) transforms pixel components in the spatial domain to DST components in the spatial frequency domain. The inverse DST (IDST) transforms DST components back into pixel components. The discrete slant transform applies an (8×1) DST to each of the eight rows and eight columns of an (8×8) block. As described earlier in this specification in conjunction with FIG. 4, pixel processor 302 of FIG. 3 applies the FDST when generating encoded video signals (step 412 of FIG. 4). Pixel processor 302 also applies the IDST when generating the reference frame signals from the encoded video signals (step 426). Similarly, as described earlier in this specification in conjunction with FIG. 21, host processor 202 of FIG. 2 applies the IDST when decoding the encoded video signals (step 2112 of FIG. 21).

A preferred embodiment of the (8×1) DST for the present invention may be represented by the following C computer language code:

```
slant 8 x 1 (s, d, fwd)    // s = pointer to input column or row
                           // d = pointer to output column or row
int s[], d[], fwd;         fwd = 1 for forward DST, 0 for inverse
                           DST
{
    int r1, r2, r3, r4, r5, r6, r7, r8;
    int t, t2, *p;
    if (fwd)    // apply forward DST
    {
        p = s;
        r1 = *p++;         // store value pointed to by p to r1 and
                           // then increment p
        r2 = *p++;
        r3 = *p++;
        r4 = *p++;
        r5 = *p++;
        r6 = *p++;
        r7 = *p++;
        r8 = *p++;
        SlantPart1;
        SlantPart2;
        SlantPart3;
        SlantPart4;
        p = d;
        *p++ = r1;
        *p++ = r4;
        *p++ = r8;
        *p++ = r5;
        *p++ = r2;
        *p++ = r6;
        *p++ = r3;
        *p++ = r7;
}
else            // apply inverse DST
{
        p = s;
        r1 = *p++;
        r4 = *p++;
        r8 = *p++;
        r5 = *P++;
        r2 = *p++;
        r6 = *p++;
        r3 = *p++;
        r7 = *p++;
        SlantPart4;
        SlantPart3;
        SlantPart2;
        SlantPart1;
        p = d;
        *p++ = r1;
        *p++ = r2;
```

-continued

```
        *p++ = r3;
        *p++ = r4;
        *p++ = r5;
        *p++ = r6;
        *p++ = r7;
        *p++ = r8;
    }
}
```

where SlantPart1, SlantPart2, SlantPart3, SlantPart4 are four macros defined as follows:

```
    #define SlantPart1 \
    bfly (r1, r4) ; \
    bfly (r2, r3) ; \
    bfly (r5, r8) ; \
    bfly (r6, r7) ;
#define SlantPart2 \
    bfly (r1, r2) ; \
    reflect (r4, r3); \
    bfly (r5, r6) ; \
    reflect(r8, r7);
#define SlantPart3 \
    bfly (r1, r5) ; \
    bfly (r2, r6) ; \
    bfly (r7, r3) ; \
    bfly (r4, r8);
#define SlantPart4 \
    t = r5 - (r5 >> 3) + (r4 >> 1); \\ t = 7/8 r5 + 1/2 r4
    r5 = r4 - (r4 >>3) - (r5 >> 1); \\ r5 = 7/8 r4 - 1/2
    r5
    r4 = t;
```

The macros bfly and reflect are defined as follows:

```
bfly(x, y):
    t = x + y;
    y = x - y;
    x = t;
#define reflect (s1, s2)    \\ for forward transform
    \\ t = 11/8 s1 + 9/16 s2
    t = s1 + (s1 >> 2) + (s1 >> 3) + (s2 >> 1) +
    (s2 >> 4);
    \\ s2 = -11/8 s2 + 9/16 s1
    s2 = -s2 - (s2 >> 2) - (s2 >> 3) + (s1 >> 1) +
    (s1 >> 4);
    s1 = t;
#define reflect (s1, s2)    \\ for inverse transform
    \\ t = 5/4 s1 + 1/2 s2
    t = s1 + (s1 >> 2) + (s2 >> 1);
    \\ s2 = -5/4 s2 + 1/2 s1
    s2 = -s2 - (s2 >> 2) + (s1 >> 1);
    s1 = t;
```

The (8×1) DST is preferably applied to all of the columns first and then to all of the rows.

In a preferred embodiment, after applying the (8×1) inverse DST to all of the columns and rows, the 64 values in the resulting (8×8) array are rounded and truncated as follows:

```
    for (i = 0; i < 8; i++)
        for (j = 0; j < 8; j ++)
            array [i] [j] = (array[i] [j] + 4) >> 3
```

In an alternative preferred embodiment, rounding and truncated is performed by adding 4 to the DC coefficient (i.e., the (0,0) DST coefficient) before performing the inverse DST, and then truncating the resulting (8×8) array as follows:

```
for (i = 0; i < 8; i ++)
    for (j = 0; j < 8; j++)
        array[i] [j] = array[i] [j] >> 3
```

Those skilled in the art will understand that this latter preferred embodiment is more computationally efficient.

For the forward transform, instead of implementing a separate round/truncate step, rounding and truncating are built into the quantization step by making the quantizers 8 times larger. Those skilled in the art will understand that this provides computational efficiency and may also provide a slightly more accurate result.

Pseudo-SIMD Dual Slant Transform

For intra blocks, the forward DST converts 7-bit unsigned component signals in the spatial domain into 11-bit DST coefficients in the spatial frequency domain. For inter blocks, the FDST converts 8-bit signed component difference signals in the spatial domain into 11-bit DST coefficients in the spatial frequency domain. The inverse DST does the reverse. To allow for error introduced by the quantization and dequantization of the DST coefficients, 12-bit precision in the DST coefficients is preferably provided.

As described earlier in this specification in the section entitled "Preferred Hardware Configuration for Conferencing System," host processor 202 is preferably an Intel® processor. Intel® processors operate on signals stored in 32-bit registers. Since only 12 bits are used to perform DST processing, in a preferred embodiment, host processor 202 uses its 32-bit registers to apply the inverse DST to two different (8×8) blocks of DST coefficients at the same time (i.e., in parallel). Those skilled in the art will understand that, in this way, host processor 202 applies the inverse DST in a pseudo-SIMD (single-instruction, multiple-data) fashion. In addition, pixel processor 302 of FIG. 3 preferably applies both the forward and inverse DST in pseudo-SIMD fashion.

Pseudo-SIMD is a technique wherein two or more data sets are operated upon simultaneously in the space of a single register. Since Intel® processors do not have a true SIMD design, sign extension of signals in the low-order portions of the registers is preferably accounted for, to avoid corruption of the signals in the high-order portions of the registers. In addition, accounting is preferably made for bit shifting operations which may shift bits from the high-order portions into the low-order portions of the registers, or vice versa.

As described in the previous section, the discrete slant transform preferably involves multiplying signals by such constants as ⅞, ½, and 5/4. These multiplications are preferably implemented using right-shifts and adds or subtracts. In the absence of pseudo-SIMD, such shifts may shift insignificant fractional parts of signals off the right end of the registers. With pseudo-SIMD, shifting right may propagate bits from signals residing in the high-order register portions into the high-order bits of the signals residing in the low-order register portions.

To avoid corruption of the low-order signals, the bits shifted down from the right end of the high-order signals may be masked off. For example, to compute ⅞ of the signals stored in register X, the following operation may be implemented:

X–((X>>3) & MASK)

where MASK masks off those bits shifted from the signal stored in the high-order register portion into the low-order register portion. After this operation, the register contains ⅞ of each of the original signals, except when the signal in the low-order register portion is negative. In this case, the bits shifted into the low-order register portion from the high-order register portion are preferably masked on, rather than masked off. Testing the sign of the signal in the low-order register portion and deciding whether to mask shifted bits on or off would be computationally expensive and are preferably avoided.

Figure 23:
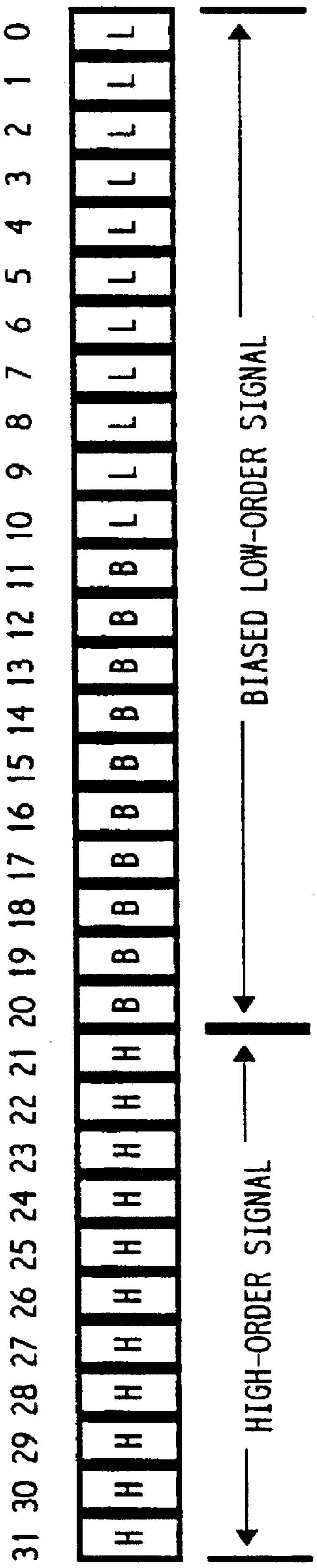
FIG. 23 is a representation of a preferred partitioning scheme for each 32-bit register for pseudo-SIMD inverse DST processing according to the present invention.

Referring now to FIG. 23, there is shown a representation of a preferred partitioning scheme for each 32-bit register for pseudo-SIMD inverse DST processing according to the present invention. Under pseudo-SIMD IDST processing, each 32-bit register is partitioned for two signals: a high-order signal and a low-order signal. The high-order signal is stored in the 11-bit high-order register portion and the low-order signal is stored in the 21-bit low-order register portion. Each of the two signals preferably corresponds to a similar location within an (8×8) block. For example, if the high-order signal corresponds to the (i,j) component of the first (8×8) block, then the low-order signal corresponds to the (i,j) component of the second (8×8) block.

The low-order signal is preferably biased by adding a bias value of magnitude sufficient to skew negative low-order signals to a non-negative representation. Since the preferred IDST transforms pairs of low-order DST coefficients (A and B) to generate both (A+B) and (A–B) signals, the bias value for A is preferably sufficiently larger than the bias value for B, to ensure that both (A+B) and (A–B) are biased into a non-negative representation. As a result, the bias values for the DST coefficients are preferably not uniform.

Referring now to FIG. 24, there is shown a representation of a preferred set of bias values for the IDST processing of the present invention. Each number corresponds to the value that is used in the upper 10 bits of the low-order register portion to bias the low-order signal. The preferred bias values of FIG. 24 were derived empirically. In general, a preferred set of bias values satisfies all of the following conditions:

(1) Throughout the IDST processing, all signals values in the low-order register portion remain non-negative.

(2) Throughout the IDST processing, there is no corruption of the high-order signal with bits from the low-order register portion.

(3) Throughout the IDST processing, all transformed bias values remain non-negative.

(4) After the IDST column and row operations are complete, the transformed bias values do not have to be subtracted to recover the correct component signals.

Figure 25:
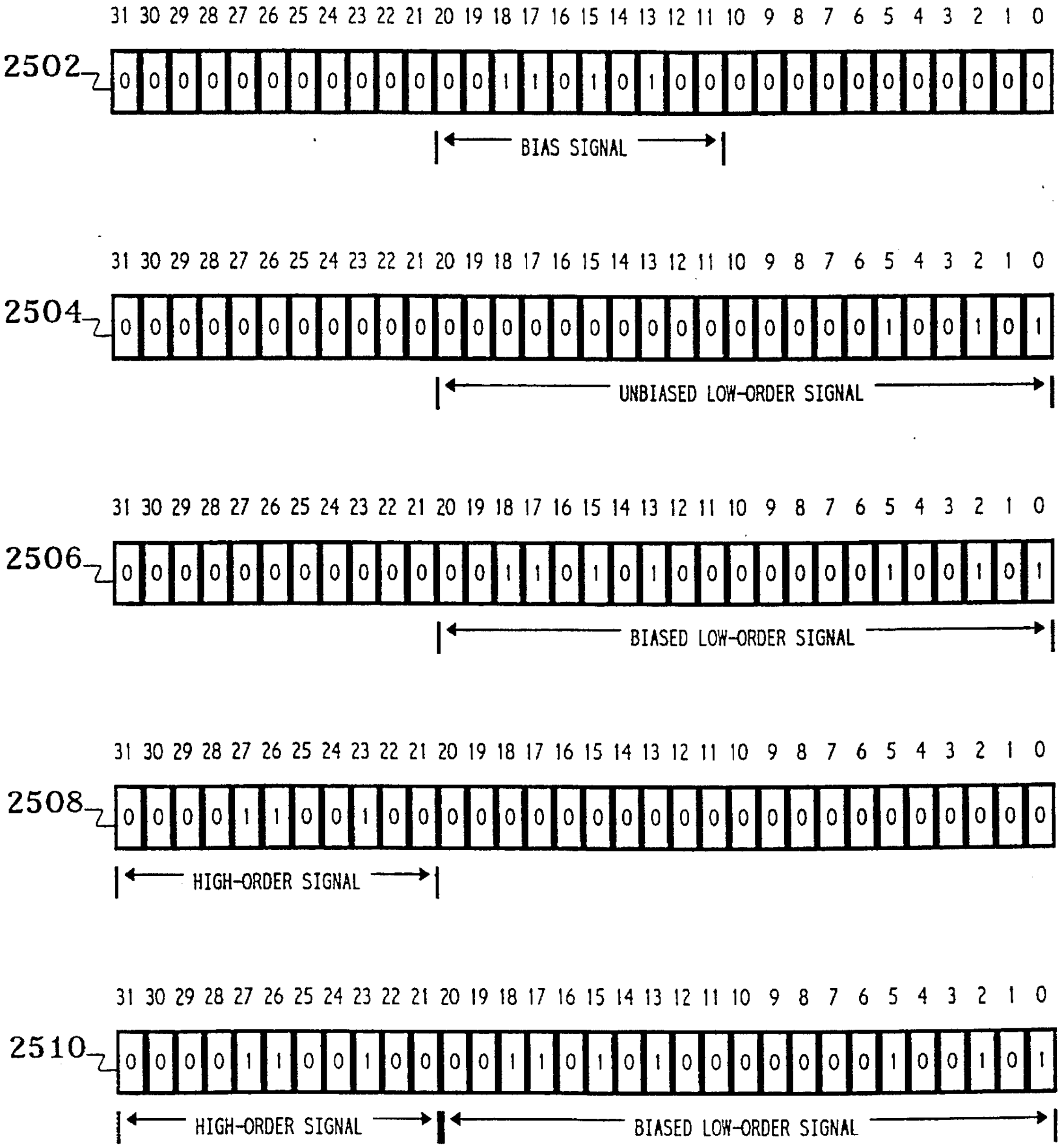
FIGS. 25 and 26 are representations of illustrative examples of the process of loading a 32-bit register with signals corresponding to the DC coefficients of two (8×8) blocks.

Referring now to FIG. 25, there is shown, for illustrative purposes, a representation of the process of loading a 32-bit register with signals corresponding to the DC coefficients of two (8×8) blocks, where the DC coefficient of the first (high-order) block is 100 and the DC coefficient of the second (low-order) block is 37. Register 2502 has the bias signal loaded into the skew field (i.e., bits 11–20 of the 32-bit register). As shown in FIG. 24, the bias signal for the low-order DC coefficient (i.e., the (0,0) DST coefficient) has a value of 212.

Register 2504 has the 11-bit unbiased low-order DST coefficient signal with a value of 37 loaded into bits 0–10. Register 2506 contains the sum of register 2502 and register 2504. The signal contained in register 2506 is the biased low-order signal.

Register 2508 has the 11-bit high-order DST coefficient signal with a value of 100 loaded into bits 21–31. Register 2510 contains the result of combining the high-order contents of register 2508 with the low-order contents of register 2506 by adding together registers 2508 and 2506. Register 2510 represents the state of the 32-bit register at the beginning of IDST processing for this example.

Figure 26:
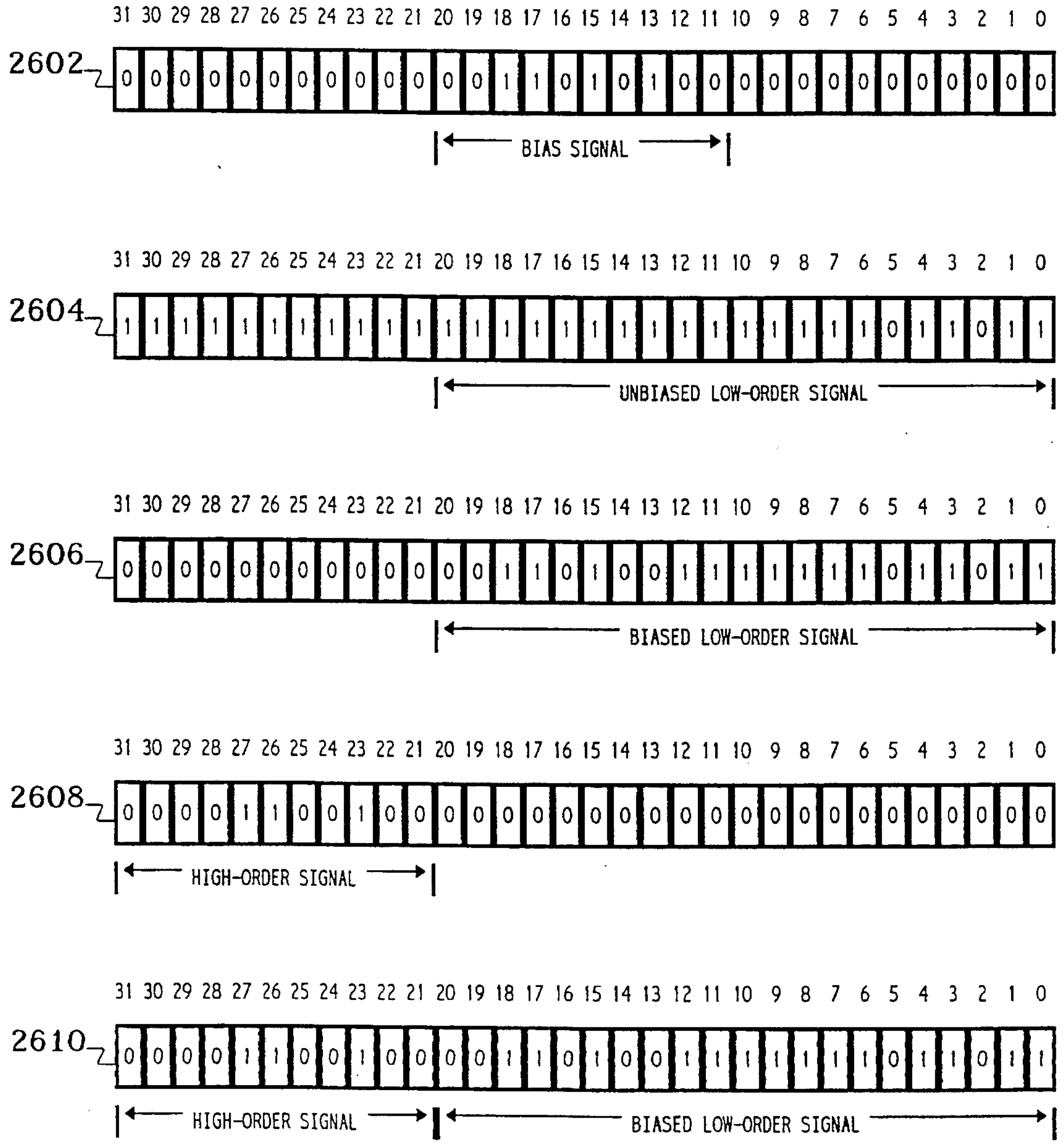

Referring now to FIG. 26, there is shown, for illustrative purposes, a representation of the process of loading a 32-bit register similar to that of FIG. 25, except that the low-order signal corresponds to a DC coefficient difference with a value of –37. As with register 2502 of FIG. 25, register 2602 of FIG. 26 contains the DC bias value of 212.

Register 2604 contains the unbiased low-order signal of –37. Note that the sign bits for the negative signal extends to the MSB of 32-bit register. Register 2606 contains the sum of register 2602 and register 2604. Note that the biased low-order signal contained in register 2606 is non-negative.

As with register 2508, register 2608 contains the high-order signal with a value of 100. Register 2610 contains the result of combining the high-order contents of register 2608 with the low-order contents of register 2606 by adding together registers 2606 and 2608. Register 2610 represents the state of the 32-bit register at the beginning of IDST processing for this example.

The function slant8×1 (defined in the previous section of the specification) represents the preferred DST column and row operations. Referring again to FIG. 24, those skilled in the art will understand that the IDST column operation propagates the full column DC value into each of the 8 elements of the column. The column DC value is the value in row 0 for that column (e.g., 170 for column 3). Given that the slant8×1 function is preferably applied first to the columns and then to the rows, the biases of FIG. 24 have been selected to ensure that, after the IDST column operations are completed, the proper biases will already be in place for the subsequent IDST row operations.

This selection involves adding the appropriate row bias value to the column DC value for each column. For example, the column DC signal for column 3 is the (0,3) signal. The preferred bias value for this column DC signal is 170, which is the column bias value of 106 plus the row bias value of 64. The IDST column operation propagates the column DC bias value of 170 into each element of column 3. In the final steps of the IDST column operation, the transformed column bias values are subtracted leaving the appropriate row bias value of 64 in each element of column 3.

In order to increase the efficiency of IDST processing, a preferred embodiment of the present invention takes advantage of the fact that, for typical video images, many DST coefficients in a non-empty (8×8) block will be zero. The likelihood of a DST coefficient being zero increases for components further away from the DC component (the (0,0) component). Thus, DST coefficients in the bottom half of each column, and those in the right half of each row, are more likely to be zero than those in the other halves.

Figure 27:
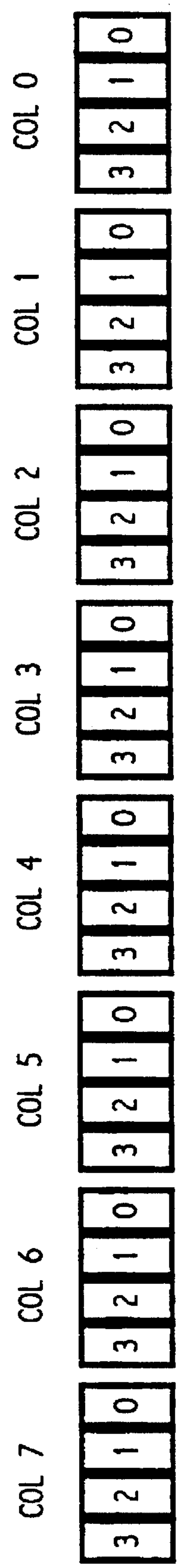
FIG. 27 is a representation of the 32-bit total column complexity mask that is used to characterize the "zero-ness" of the (8×8) blocks of DST coefficients.

Referring now to FIG. 27, there is shown a representation of the 32-bit total column complexity mask that is used to characterize the "zero-ness" of the (8×8) blocks of DST coefficients, according to a preferred embodiment of the present invention. The 32-bit total column complexity mask comprises eight 4-bit column complexity masks. For each 4-bit column complexity mask, Bit 0 (i.e., the LSB) corresponds to row 0;

Bit 1 corresponds to row 1;

Bit 2 corresponds to rows 2 and 3; and

Bit 3 corresponds to rows 4, 5, 6, and 7.

For those DST coefficients of column i that are non-zero, the corresponding bit of column complexity mask i is set to 1. A bit of column complexity mask i is set to 0, if all of the DST coefficients in the rows corresponding to that bit are zero.

Referring now to FIG. 28, there is shown, for illustrative purposes, a representation of an (8×8) block 2800 of DST coefficients. In block 2800, 0 indicates a zero DST coefficient and X indicates a non-zero DST coefficient.

Figure 29:
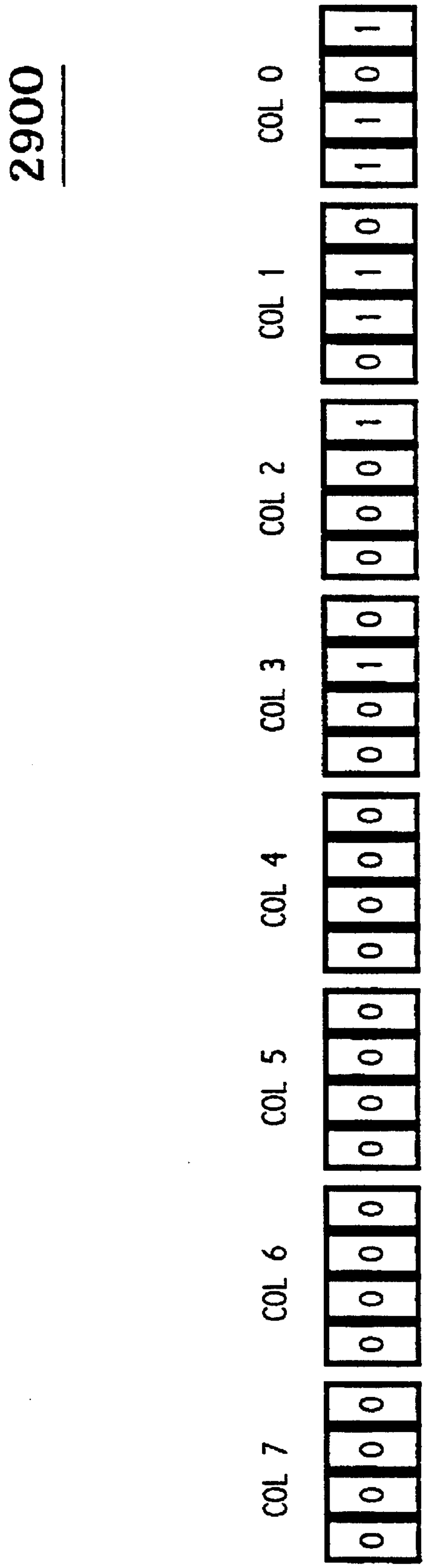
FIG. 29 is a representation of the eight 4-bit column complexity masks that comprise the total column complexity mask corresponding to the (8×8) block of FIG. 28.

Referring now to FIG. 29, there is shown a representation of the eight 4-bit column complexity masks that comprise the 32-bit total column complexity mask corresponding to the block 2800 of FIG. 28. For example, column complexity mask 0 (corresponding to column 0 of block 2800) contains the 4-bit value (1101), where (from right to left):

Bit 0 is 1 because DST coefficient (0,0) is non-zero,

Bit 1 is 0 because DST coefficient (1,0) is zero,

Bit 2 is 1 because at least one of DST coefficients (2,0) and (3,0) is non-zero, and Bit 3 is 1 because at least one of DST coefficients (4,0), (5,0), (6,0), and (7,0) is non-zero.

And, analogously, for column complexity masks 1–7. Note that the 4-bit column complexity masks for columns 4–7 each contain the value (0000).

The 4-bit column complexity masks are preferably used to control the implementation of the column DST operations to make the implementation more efficient. Those skilled in the art will understand that the computations of the column DST operation (defined previously as the function slant8×1) may be reduced for those columns having one or more zero DST coefficients. In a preferred embodiment, the present invention supports five different implementations of the column DST operation.

Each column may initially be assigned a column DST operation. Table IX identifies how the column DST operation are initially assigned to columns, where slant4×1, slant2×1, and slant1×1 are reduced column DST operations and null indicates no processing required.

TABLE IX

Initial Assignment of Column DST Operations and Final Assignment of Row DST Operations.

| 4-bit Complexity Mask | Mask Values | DST Operation |
|---|---|---|
| (1xxx) | 8–15 | slant8x1 |
| (01xx) | 4–7 | slant4x1 |
| (001x) | 2–3 | slant2x1 |
| (0001) | 1 | slant1x1 |
| (0000) | 0 | null |

For inverse DST processing, the reduced DST operation slant4×1 is based on the DST operation slant8×1 using the following assignments:

```
r1=*p++;
r4=*p++;
r8=*p++;
r5=*p++;
r2=0;
r6=0;
r3=0;
r7=0;
```

The reduced IDST operation slant2×1 is based on the DST operation slant8×1 using the following assignments:

```
r1=*p++;
r4=*p++;
r8=0;
r5=0;
r2=0;
```

r6=0;
r3=0;
r7=0;

The reduced IDST operation slant1×1 is based on the DST operation slant8×1 using the following assignments:

r1=*p++;
r4=0;
r8=0;
r5=0;
r2=0;
r6=0;
r3=0;
r7=0;

Those skilled in the art will understand that the assignments for the reduced DST operations slant4×1, slant2×1, and slant 1×1 provide opportunity for additional optimization.

The slant1×1 operation propagates the DC coefficient to each of the outputs, while the null operation does not. The null operation is preferably only used for the last four columns, or the last six columns, or the last seven columns. For example, if columns 0 and 5 are the only non-zero columns, then the row transforms will use the slant8×1 operation. Since, in this example, the bias values of the top row are to be propagated to the rest of the rows, the null operation is not used for any of the columns. If, however, columns 0 and 2 are the only non-zero columns, then the row transforms may use the slant4×1 operation. Therefore, in this example, the null operation may be used for columns 4 through 7, but not 1 and 3, to which the slant1×1 operation is applied to propagate the bias values for the subsequent row operation slant4×1.

Each column is processed according to its own complexity. Just before storing the outputs of the column transforms, the transformed bias values for the column are removed, leaving only the biases appropriate for the row transforms. These biases are propagated from element zero of each column to all the elements of the column, and are the original bias for element zero, minus 106. This is done by each of the column transformers, though each one has to subtract different values for the transformed biases.

The only case where a column is not processed according to its original complexity, is when the mask is 0000 for the column, but the slant1×1 operation is applied to propagate the bias for the subsequent row operations.

We need to perform slant 1×1 instead of Null, as I describe in my comments above.

The total column complexity mask of FIG. 27 is also used to generate a 4-bit row complexity mask, where:

Bit 0 (i.e., the LSB) corresponds to column 0;
Bit 1 corresponds to column 1;
Bit 2 corresponds to columns 2 and 3; and
Bit 3 corresponds to columns 4, 5, 6, and 7.

A bit of the 4-bit row complexity mask is set to 0, if all of the DST coefficients in all of the corresponding rows are zero. Otherwise, the bit is set to 1. Thus, for the example of FIGS. 28 and 29, the 4-bit row complexity mask contains the value (0111). Those skilled in the art will understand that the 4-bit row complexity mask may be generated directly from the 32-bit total column complexity mask.

Table IX may be used to select the row DST operation to apply to each of the eight rows of the (8×8) block, where the four possible row DST operations are the slant8×1, slant4×1, slant2×1, and slant1×1 operations described above. Those skilled in the art will understand that the null operation is preferably not one of the row DST operations, since a null row operation implies an empty block. In the example of FIGS. 28 and 29, the slant4×1 row operation may be applied to each of the eight rows of block 2800 when implementing the row DST operations (after completing the column DST operations on the eight columns of block 2800).

Those skilled in the art will understand that the various complexity masks are used to reduce the computational complexity involved in applying the inverse DST to an (8×8) block of DST coefficients. In a preferred embodiment in which the inverse DST is applied in pseudo-SIMD fashion to two (8×8) blocks at the same time, it will be understood that the complexity of the column and row DST operations is preferably dictated by the greater complexity of the corresponding columns or rows of the two blocks.

Figure 30:
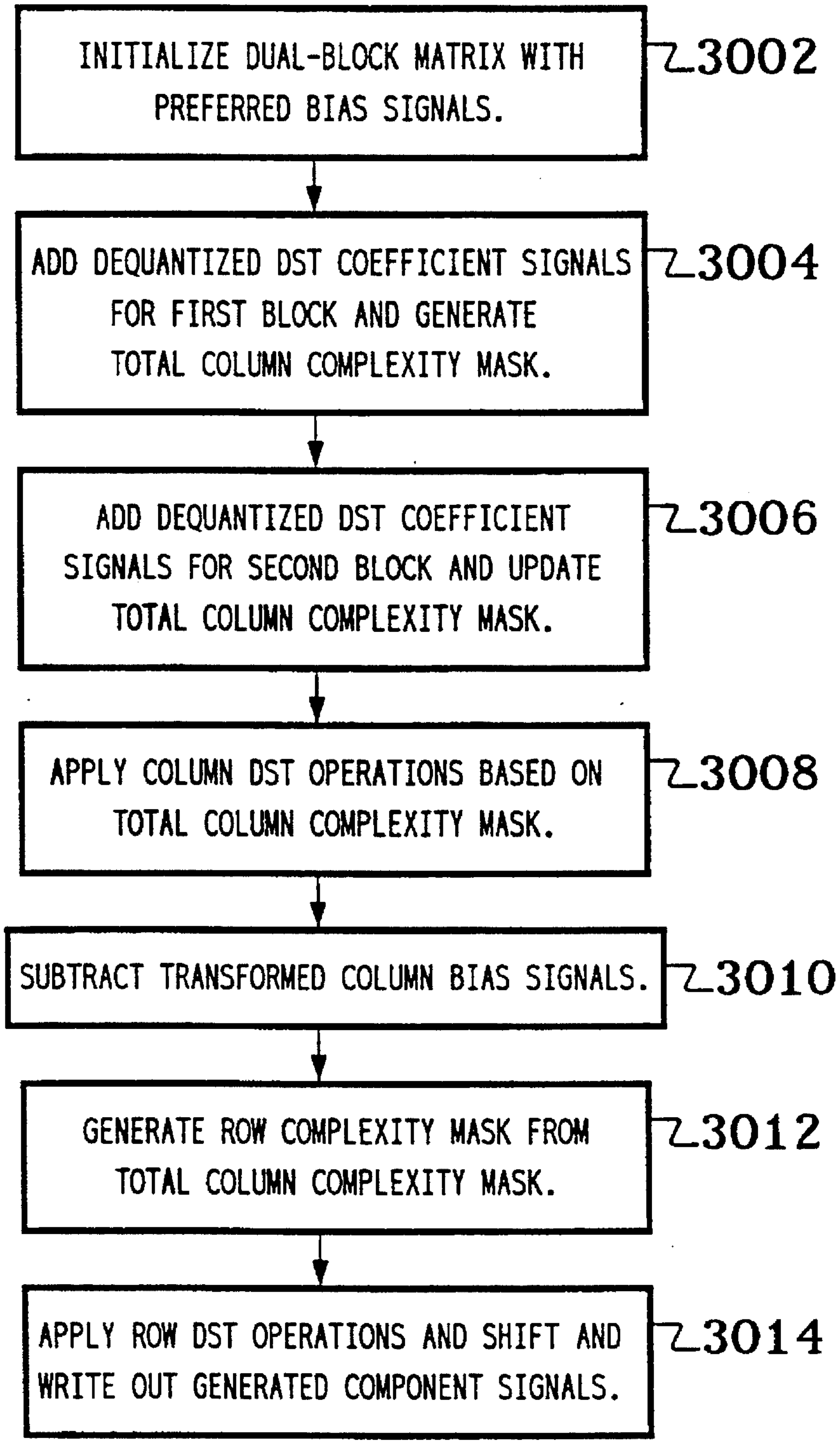
FIG. 30 is a process flow diagram of the processing implemented by the host processor of FIG. 2 to apply the inverse DST in a pseudo-SIMD fashion to two different (8×8) blocks of DST coefficients during the decoding of encoded video signals of FIG. 21.

Referring now to FIG. 30, there is shown a process flow diagram of the processing implemented by host processor 202 of FIG. 2 to apply the inverse DST in a pseudo-SIMD fashion to two different (8×8) blocks of DST coefficients during the decoding of encoded video signals of FIG. 21, according to a preferred embodiment of the present invention. The processing of FIG. 30 corresponds to step 426 of FIG. 4 and step 2112 of FIG. 21.

Pseudo-SIMD inverse DST processing begins by initializing an (8×8) dual-block matrix of 32-bit registers by inserting a preferred set of bias signals into the skew fields of the 32-bit registers (step 3002 of FIG. 30). The dequantized DST coefficient signals corresponding to a first (low-order) (8×8) block are added to the low-order portions of the 32-bit registers of the dual-block matrix and the total column complexity mask is generated corresponding to the first block (step 3004).

The dequantized DST coefficient signals corresponding to a second (high-order) (8×8) block are then added into the high-order portions of the 32-bit registers of the dual-block matrix and the total column complexity mask if updated in accordance with the complexity of the second block (step 3006). The updating of the total column complexity mask is functionally equivalent to generating a separate total column complexity mask for the second block and then "OR"ing the two masks together. The resulting updated total column complexity mask represents the more complex of each pair of corresponding columns, where column i of the first block corresponds to column i of the second block.

The column DST operations are then applied to the columns of the dual-block matrix (step 3008), where the complexity of the column DST operations is dictated by the total column complexity mask, as described earlier in this section of the specification.

The appropriate transformed column biases are then subtracted from the (8×8) matrix that is generated during the column DST operations (step 3010). Those skilled in the art will understand that the subtraction of transformed column biases is also preferably dictated by the total column complexity mask.

The row complexity mask is generated from the total column complexity mask (step 3012) and a row DST operation is applied to each of the eight rows of the matrix (step 3014), where the complexity of the row DST operation is dictated by the row complexity mask. As the row DST operations are applied, the reconstructed component signals corresponding to the two (8×8) blocks is preferably shifted and written out from the 32-bit registers to appropriate memory locations of a reconstructed bitmap. Those skilled in the art will understand that, after the row DST operation, the component signals corresponding to the low-order block are contained in bits 3–10 of the 32-bit registers of the dual-block matrix and the component signals corresponding to the high-order block are contained in bits 23–30 of the 32-bit registers of the dual-block matrix. The other bits contain either insignificant fractional bits (i.e., bits 0–2 and 20–22) or transformed bias signals (i.e., bits 11–19).

Block Edge Filtering

Referring again to FIG. 18, after the temporal post-filter is applied, block edge filtering is applied if selected (step 1816 of FIG. 18). Block edge filtering improves visual quality, especially during periods of high motion, by reducing blocking artifacts along the edges of the (8×8) blocks. If selected, block edge filtering is preferably applied only to the Y component signals.

Figure 31:
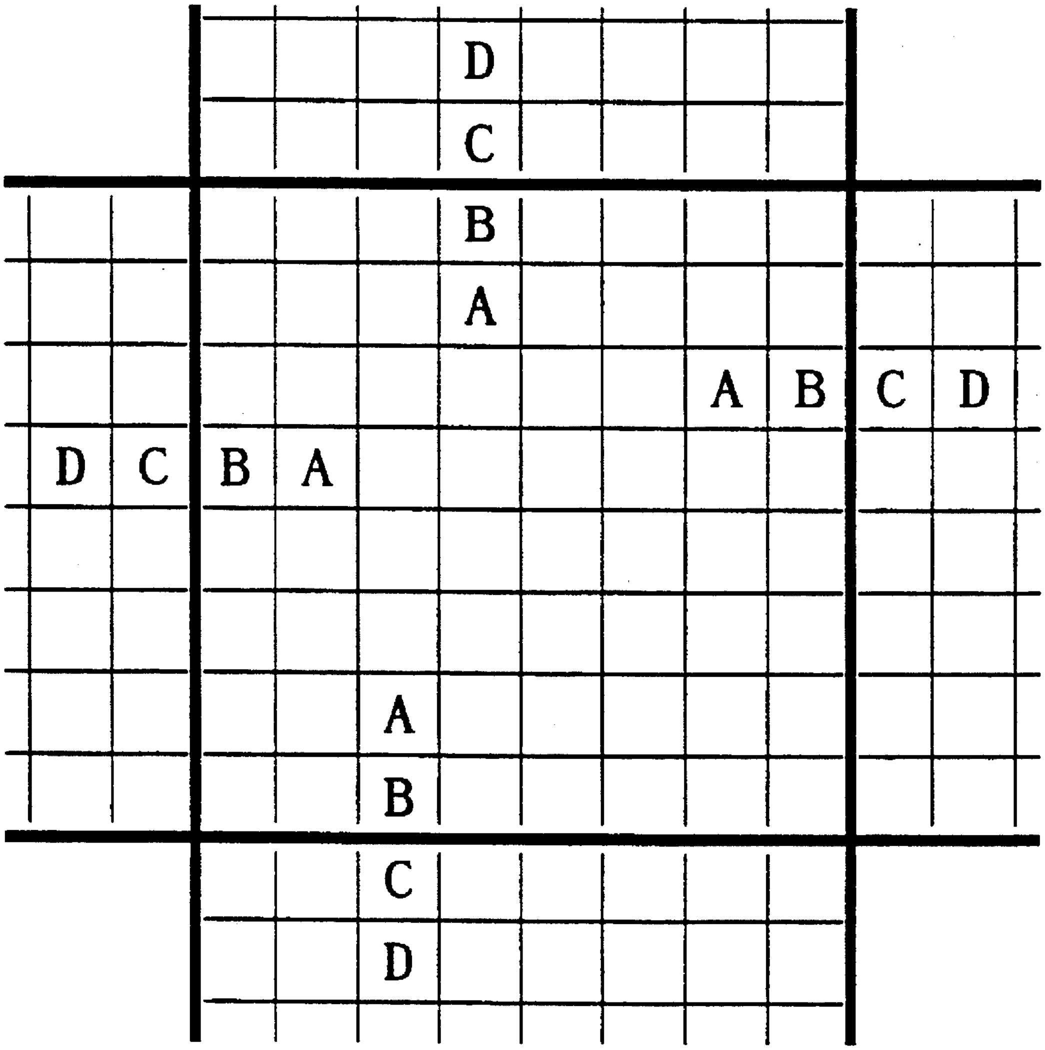
FIG. 31 is a representation of the four block edges between an (8×8) block of components and its four neighboring blocks.

Referring now to FIG. 31, there is shown a representation of the four block edges between an (8×8) block of component signals and its four neighboring blocks. According to a preferred embodiment, for each of the four edges of each (8×8) block, a test is applied to determine whether to apply block edge filtering. A preferred test may be expressed as follow:

if:

$q_1 \geqq T$ and if Block 1 is not {empty and inter and $MV=0$} or $q_2 \geqq T$ and if Block 2 is not {empty and inter and $MV=0$}, then:

apply the block edge filter to the corresponding edge, where $q_1$ is the quantization level of Block 1, $q_2$ is the quantization level of Block 2, and T is a specified threshold level (preferably, 12). Blocks 1 and 2 are the two adjacent blocks that define the edge in question. According to the test, either Block 1 or Block 2 is not an empty inter block with a motion vector of 0.

The quantization portion of the test (i.e., $q_i \geqq T$) causes block edge filtering to be applied if the block on either side of the edge has a high quantization level, in which case there is probably a blocky artifact at this edge. The second portion of the test (i.e., Block i is not {empty and inter and MV=0}) prevents block edge filtering from being applied in stationary areas of the image, which are presumably high quality.

If the test is satisfied, then block edge filtering is preferably applied to each of the 8 pairs of component signals along the corresponding edge to replace the B and C component signals, as follows:

$x=A+B$ $y=B+C$ $z=C+D$ $B=(x+y)>>2$ $C=(y+z)>>2$ where A, B, C, and D are the component signals as shown in the examples of FIG. 31. Those skilled in the art will understand that the above preferred block edge filter is equivalent to replacing B with a 121 filter of ABC, and C with a 121 filter of BCD. In a preferred embodiment, the block edge filter is applied first to vertical edges and then to horizontal edges. Those skilled in the art will understand that this order may be reversed without significant impact to the final result.

Variable-Length Decoding

As described earlier in this specification in the section entitled "Variable-Length Encoding," each Huffman-encoded video signal of the present invention comprises a prefix followed by a number of code bits (also known in the art as free bits or data bits), where the prefix and code bits vary in length from signal to signal, but where a particular prefix determines the number of code bits. Decoding Huffman-encoded signals comprises parsing the encoded bitstream into individual variable-length signals and mapping the variable-length signals to their corresponding codebook values. The decoding of Huffman-encoded video signals may be implemented different ways.

One decoding method is to read in one bit at a time from the encoded bitstream, append the new bit to a running prefix field, determine whether the prefix field is identical to one of the predefined signal prefixes, and either read in another bit from the bitstream to repeat the processing (if the prefix field is not one of the signal prefixes) or read in and decode the predefined number of code bits (if the prefix field is one of the signal prefixes).

Under this decoding method, the current bit location within the encoded bitstream may be represented by a byte pointer and a bit pointer. After each variable-length signal is decoded, the byte and bit pointers are updated according to the number of bits in the signal. This updating may be accomplished using the following processing:

```
add code length to bit pointer
loop while (bit pointer >= 8) {
    increment byte pointer by 1;
    decrement bit pointer by 8;
    }
```

For example, assume that the bit pointer after the previous encoded signal was 7 and that the current encoded signal is 14 bits long. After decoding the current encoded signal, the bit pointer is updated to 7+14 or 21. Since 21 is greater than 8, the byte pointer is incremented by 1 and the bit pointer is decremented by 8. The bit pointer is then 21−8 or 13. Since the bit pointer value (13) is still greater than 8, the byte pointer is again incremented by 1 and the bit pointer is again decremented by 8 to yield a bit pointer of 5 for the next encoded signal.

Those skilled in the art will understand that the loop processing of the above scheme for pointer updating involves the overhead of jumps and tests and, as in the example, possible multiple executions.

After adding in the code length, the lower three bits of the bit pointer represent the desired value for the updated bit pointer, while the higher bits indicate the value to add to the byte pointer. One way to update the bit and byte pointers is, after saving the three lower bits of the bit pointer, to shift the bit pointer right by three bits to yield the value to add to the byte pointer. This method involves shifting bits and the use of one additional register, since the lower three bits are saved for the updated bit pointer.

Another method is to maintain a single cumulative bit pointer. Under this method, the lower three bits provides the bit address and the bit pointer shifted right three bits provides the byte address.

Figure 32:
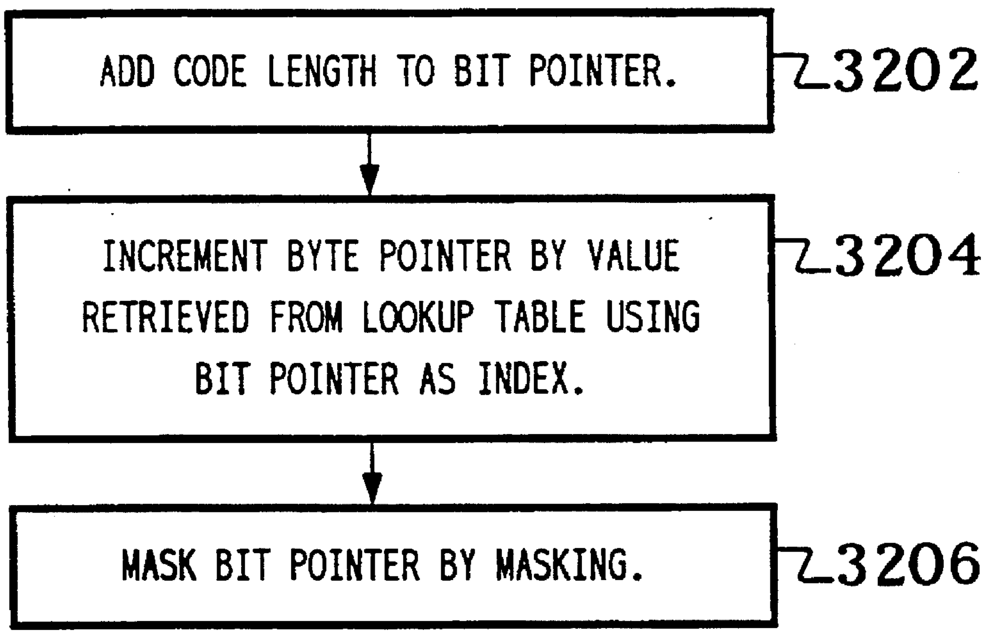
FIG. 32 is a process flow diagram of bit/byte pointer update processing, according to a preferred embodiment of the present invention.

Referring now to FIG. 32, there is shown a process flow diagram of bit/byte pointer update processing, according to a preferred embodiment of the present invention. The processing of FIG. 32 may be represented as follows:

add code length to bit pointer
add Table[bit pointer] to byte pointer
mask out all but lower 3 bits of bit pointer This processing is based on a lookup table that maps the possible bit pointer values to the values to be added to the byte pointer. The bit pointer is used as the index to the table, where:

| | |
|---|---|
| Table[bit pointer] = 0 | for bit pointer = 0, . . . , 7 |
| Table[bit pointer] = 1 | for bit pointer = 8, . . . , 15 |
| Table[bit pointer] = 2 | for bit pointer = 16, . . . , 23 |
| | etc. |

For the previous example where the bit pointer is 7 and the code length is 14, the bit pointer is updated by the code length to yield 7+14 or 21 (step 3202 of FIG. 32). The byte pointer is then incremented by the value (2) retrieved from the lookup table using the updated bit pointer (21) as the index (step 3204). The bit pointer (21) is then updated by masking out all but the lower three bits to yield an updated bit pointer of 5 (step 3206).

Those skilled in the art will understand that the bit/byte pointer update processing of FIG. 32 may also be used to maintain bit and byte pointers for applications, other than Huffman decoding, in which bit location is tracked in a byte-based processing system.

Methods which involve reading the encoded bitstream one bit at a time may be prohibitively expensive from the perspective of CPU processing bandwidth. Another method for decoding Huffman-encoded signals is to read in from the bitstream at each cycle enough bits to complete a test field of length equal to that of the longest Huffman-encoded signal. The test field is then used as the index to a lookup table that maps from each possible test field value to (1) the appropriate decoded signal and (2) the number of bits in the test field to retain for the next test field (for those encoded signals that are shorter than the longest Huffman-encoded signal). This method may be prohibitively expensive due to the large size of the lookup table required to map from every possible test field value.

Figure 33:
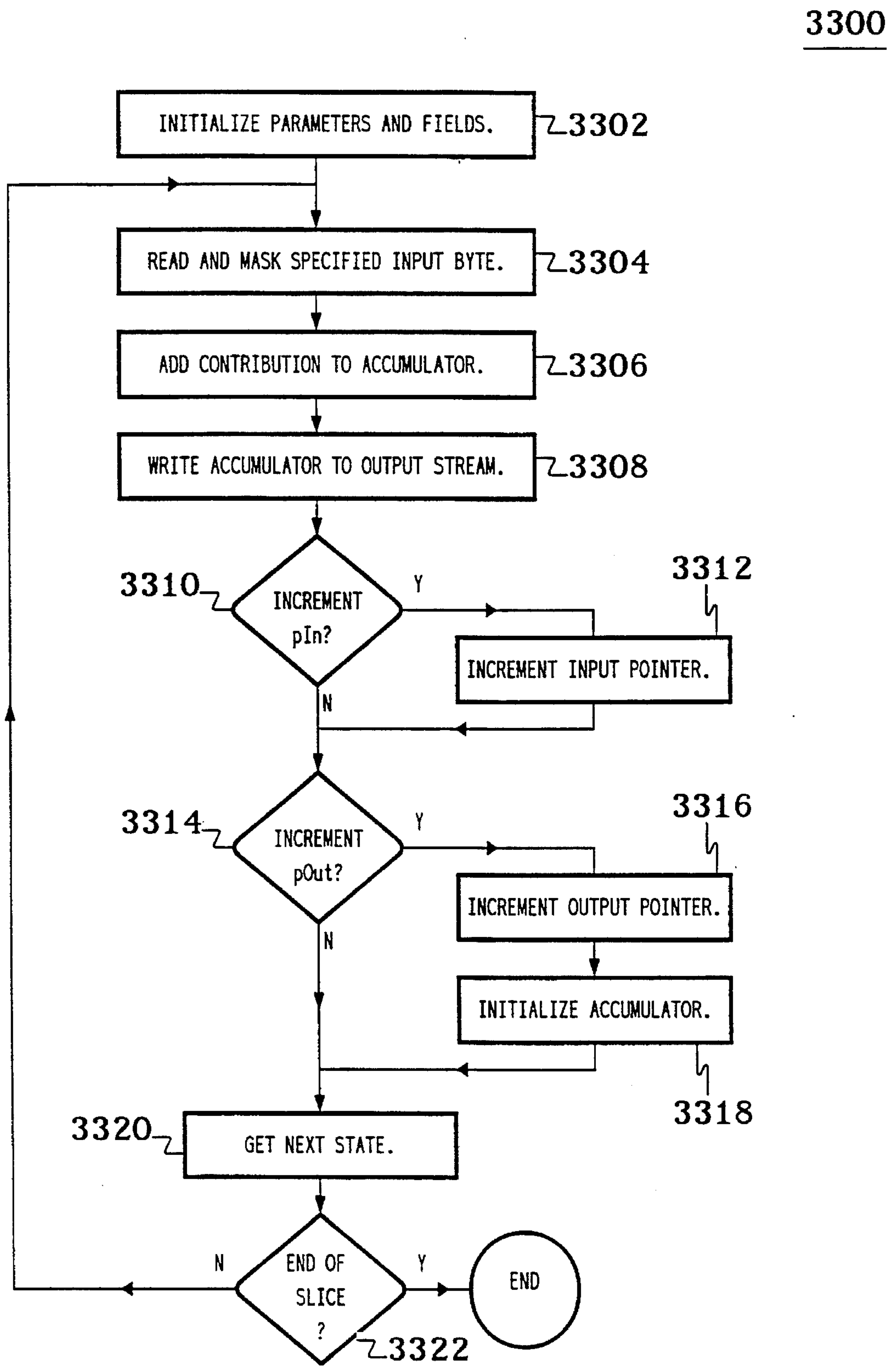
FIG. 33 is a process flow diagram of the processing of the decoder implemented by the host processor of FIG. 2 to decode Huffman-encoded video signals.

Referring now to FIG. 33, there is shown a process flow diagram of the processing of decoder 3300 implemented by host processor 3300 of FIG. 2 to decode Huffman-encoded video signals, according to a preferred embodiment of the present invention. Decoder 3300 is implemented to decode both the Huffman-encoded macroblock signals and the Huffman-encoded block signals of the present invention. Decoder 3300 comprises a state-machine implementation whose states dictate whether the bits of the current bitstream byte correspond to prefixes or free bits or both and how many more bits are needed to move to the next state. Decoder 3300 reads Huffman-encoded signals from the encoded bitstream in one-byte increments and writes out decoded signals to an output stream in one-byte increments.

As described earlier in this specification in the section entitled "Variable-Length Encoding," Table II presents the Huffman codebook for encoding macroblock signals and Table III presents the Huffman codebook for encoding block signals. According to Tables II and III, Huffman-encoded macroblock signals are either 2, 4, 6, or 8 bits long, while Huffman-encoded block signals are either 2, 4, 6, 8, 10, 12, or 14 bits long. Each byte in the Huffman-encoded bitstream may therefore comprise a whole or part of one or more Huffman-encoded signals.

Because each Huffman-encoded signal comprises an even number of bits and because the sequences of Huffman-encoded macroblock signals begin on byte boundaries, Huffman-encoded signals always begin on even bits (i.e., bits 0, 2, 4, or 6) and end on odd bits (i.e., bits 1, 3, 5, or 7). Based on these facts and the known lengths of the allowable Huffman-encoded signals, a relatively small set of states can be defined to cover all the possible permutations for the status of decoder 3300 after each processing cycle.

In each processing cycle, decoder 3300 determines that either (1) the current Huffman-encoded signal terminates at either bit 1, 3, 5, or 7 of the current bitstream byte or (2) the current Huffman-encoded signal does not terminate within the current bitstream byte. If the current Huffman-encoded signal does not terminate within the current bitstream byte, then, during the next processing cycle, decoder 3300 reads in the next bitstream byte to continue processing the current Huffman-encoded signal.

If the current Huffman-encoded signal terminates within the current bitstream byte, then decoder 3300 begins decoding the next Huffman-encoded signal during the next processing cycle. If the current Huffman-encoded signal terminates at bit 7 of the current bitstream byte, then decoder 3300 reads in the next bitstream byte during the next processing cycle; otherwise, the current Huffman-encoded signal terminates on either bits 1, 3, or 5, and decoder 3300 begins processing the next Huffman-encoded signal during the next processing cycle using the same bitstream byte.

The state at the beginning of a processing cycle and the value of the appropriate bits of the current byte determine:

(1) The contribution to be made by decoder 3300 to an accumulator during the current processing cycle;

(2) The state of decoder 3300 at the beginning of the next processing cycle;

(3) Whether or not to increment the input pointer used by decoder 3300 to read a byte from the encoded bitstream during the next processing cycle; and (4) Whether or not to re-initialize the accumulator and increment the output pointer used by decoder 3300 to write out the accumulator to the output stream during the next processing cycle.

The appropriate bits of the current byte depend upon the current state.

Referring again to FIG. 33, decoder 3300 is initialized at the start of decoding a stream of Huffman-encoded macroblock signals (step 3302 of FIG. 33). Decoder 3300 is initialized to the state signifying that the macroblock signal prefix begins at bit 0 (i.e., MPrefixAt0 of Table X below). Decoder 3300 need not be re-initialized at the start of decoding a stream of Huffman-encoded block signals, since the block signals immediately follow the macroblock signals for a given slice of a video frame. Decoder 3300 handles the transition from decoding macroblock signals to decoding block signals. Since a stream of Huffman-encoded block signals may begin at either bits 0, 2, 4, or 6 of the current byte, there are four different states for the beginning of decoding block signals (i.e., BlkDataAt0, BlkDataAt2, BlkDataAt4, and BlkDataAt6 of Table XI below). The initialization of step 3302 also involves initializing the input and output pointers and the accumulator.

After initialization, decoder 3300 reads in the byte from the encoded bitstream specified by the input pointer and masks the byte according to the current state (step 3304). Masking is used to eliminate (i.e., set to 0) those bits of the current byte that are not relevant to the currently available state transitions. Step 3304 may be represented by the following C language computer code:

```
B=*pIn & MASK[STATE]
```

where B is the masked byte, *pIn retrieves the byte specified by the pIn pointer, MASK is a lookup table of the possible masks, and STATE is a value assigned to the current state. The possible masks may be represented as (11111111), (00111111), (00001111), (00000011), (00000000), (11000000), (11110000), and (11111100).

Decoder 3300 uses the masked byte B in conjunction with the current state STATE to access the following four lookup tables:

| | |
|---|---|
| Contrib□□ | Specifies the contribution to the 8-bit accumulator. |
| NextState□□ | Specifies a 6-bit value corresponding to the next state. |
| IncIn□□ | Specifies a 1-bit flag indicating whether the input pointer (pIn) is to be incremented. |
| IncOut□□ | Specifies a 1-bit flag indicating whether the accumulator is to be initialized and whether the output pointer (pOut) is to be incremented. |

The specified contribution (Contrib[B][STATE]) is added to the accumulator (step 3306), a register that holds the running decoded value corresponding to those bits of the current Huffman-encoded signal that have been processed. The accumulator is then written out to the output stream to the location specified by the output pointer (pOut) (step 3308). If the output pointer pOut was not updated in the previous processing cycle, then step 3308 writes over what was previously written.

If the input pointer flag (IncIn[B][STATE]) indicates that the input pointer pIn is to be incremented (step 3310), then the current bitstream byte has been completely processed and the input pointer pIn is incremented to ensure that the next bitstream byte is read during the next processing cycle (step 3312).

If the output pointer flag (IncOut[B][STATE]) indicates that the output pointer pOut is to be incremented (step 3314), then the current Huffman-encoded signal is complete. In that case, the output pointer pOut is incremented (step 3316) and the accumulator is initialized to 0 (step 3318).

The next state (NextState[B][STATE]) for decoder 3300 for the beginning of the next processing cycle is then retrieved (step 3320). If the next state does not indicate the end of the current slice (step 3322), then decoder 3300 returns to step 3304 to repeat the processing for the next processing cycle. Otherwise, the next state is the terminal state and decoding of the Huffman-encoded signals of the current slice ends.

Table X presents the set of possible states for decoder 3300 for decoding Huffman-encoded macroblock signals. Table XI presents the set of possible states for decoder 3300 for decoding Huffman-encoded block signals.

TABLE X

Possible States for Parsing Huffman-Encoded Macroblock Signals.

| STATE | MEANING |
|---|---|
| MPrefixAt0 | Prefix starts at bit 0 of current byte. |
| MPrefixAt2 | Prefix starts at bit 2 of current byte. |
| MPrefixAt4 | Prefix starts at bit 4 of current byte. |
| MPrefixAt6 | Prefix starts at bit 6 of current byte. |
| MGot2Prefix | Bit 0 of current byte is the third bit (bit 2) of prefix started in previous byte. |
| MNeed2Code | Bits 0–1 of current byte complete free bits. |
| MNeed4Code | Bits 0–3 of current byte complete free bits. |
| MNeed2Non0 | Bits 0–1 of current byte complete free bits, but they are not both 0. |
| MNeed2Non1 | Bits 0–1 of current byte complete free bits, but they are not both 1. |
| MNeed4Non0 | Bits 0–3 of current byte complete free bits, but they are not all 0. |
| MNeed4Non1 | Bits 0–3 of current byte complete free bits, but they are not all 1. |

TABLE XI

Possible States for Parsing Huffman-Encoded Block Signals.

| STATE | MEANING |
|---|---|
| BPrefixAt0 | Prefix starts at bit 0 of current byte. |
| BPrefixAt2 | Prefix starts at bit 2 of current byte. |
| BPrefixAt4 | Prefix starts at bit 4 of current byte. |
| BPrefixAt6 | Prefix starts at bit 6 of current byte. |
| BGot2Prefix | Bit 0 of current byte is bit 2 of prefix. |
| BGot4Prefix | Bit 0 of current byte is bit 4 of prefix. |
| BGot8PAt4 | Bit 4 of current byte is bit 8 of prefix. |
| BGot6Prefix | Bit 0 of current byte is bit 6 of prefix. |
| BGot8Prefix | Bit 0 of current byte is bit 8 of prefix. |
| BNeed2Code | Bits 0–1 of current byte complete free bits. |
| BNeed4Code | Bits 0–3 of current byte complete free bits. |
| BNeed6Code | Bits 0–5 of current byte complete free bits. |
| BNeed2At4 | Bits 4–5 of current byte complete free bits. |
| BNeed4At4 | Bits 4–7 of current byte complete free bits. |
| BNeed6At4 | Bits 4–7 of current byte and bits 0–1 of next byte complete free bits. |
| IllegalCode | Code not allowed. |
| BEnd | End of block signals (end of slice). |
| BlkDataAt0 | Block signals begin at bit 0 of current byte. |
| BlkDataAt2 | Block signals begin at bit 2 of current byte. |
| BlkDataAt4 | Block signals begin at bit 4 of current byte. |
| BlkDataAt6 | Block signals begin at bit 6 of current byte. |

Tables XII–XV present the information encoded in the four lookup tables Contrib[][], NextState[][], IncIn[][], and IncOut[][] which define the allowable state transitions used by decoder 3300. Each line of Tables XII–XV represents a macro (or abstract rule) that defines a set of rules for the allowable state transitions. The number of rules defined by each macro is the number of possible combinations of the masked byte for that macro as defined below.

Column (1) in Tables XII–XV is a representation of the masked bytes (B) corresponding to the possible current byte values. Column (2) is the current state (STATE) of decoder 3300. The masked byte and the current state are the indices for the lookup tables that map to Columns 4–6. Column 4 is the next state. Column 3 is a base value for the contribution that gets added to the accumulator. Column 5 is the bitstream pointer flag, where 1 means increment the bitstream pointer. Column 6 is the output pointer flag, where 0 means increment the output pointer and initialize the accumulator.

The masked bytes in Column (1), in which bit 0 is the right-most bit and bit 7 is the left-most bit, are represented with the following definitions:

| | |
|---|---|
| 0 | Bit is zero. |
| 1 | Bit is one. |
| X | Bit may be either zero or one. |
| Y | Bit may be either zero or one, but not all Ys in the byte are zero. |
| Z | Bit may be either zero or one, but has been masked to zero in the current state of decoder 3300. |
| A | If bit is zero, contributes 0 to index. If one, contributes 32. |
| B | If bit is zero, contributes 0 to index. If one, contributes 16. |
| C | If bit is zero, contributes 0 to index. If one, contributes 8. |
| D | If bit is zero, contributes 0 to index. If one, contributes 4. |
| E | If bit is zero, contributes 0 to index. If one, contributes 2. |
| F | If bit is zero, contributes 0 to index. If one, contributes 1. |
| a–f | Same as A–F, but there are other special cases that are handled by other rules. |

Assume, for example, that the first two values to be encoded into the Huffman-encoded macroblock stream are 11 followed by 2. According to Table II, 11 is Huffman-encoded as the 6-bit signal (001101), where (001) is the 3-bit prefix and (101) are the three free bits. Similarly, 2 is Huffman-encoded as the 4-bit signal (0100), where (01) is the 2-bit prefix and (00) are the two free bits. In these binary representations, the bits are read from left to right.

In this example, the first byte in the Huffman-encoded bitstream will be (10101100) and the second byte will be (xxxxxx00), where the bits are read from right to left and the xxxxxx bits are 1s or 0s corresponding to the next Huffman-encoded signal(s) in the bitstream. The first byte contains the entire 6-bit first Huffman-encoded signal (for 11) as well as the first 2-bits of the second Huffman-encoded signal (for 2), which happen to be the entire 2-bit prefix for the second Huffman-encoded signal. The second byte begins with the last two bits (the free bits) of the second Huffman-encoded signal.

Decoder 3300 is initialized to the MPrefixAt0 state in step 3302 of FIG. 33. In step 3304, decoder 3300 then reads in and masks (if appropriate) the first bitstream byte (10101100). According to Table XII, for the MPrefixAt0 state, the byte (10101100) is represented as (10FED100), where (100) is the 3-bit prefix of the first Huffman-encoded signal, (FED) are the 3 free bits of the first Huffman-encoded signal, and (10) is the 2-bit prefix of the second Huffman-encoded signal. The state and masked byte are used as indices to the lookup tables to determine the next state (MNeed2Code), the base contribution (6), the bitstream pointer flag (1), and the output pointer flag (0).

To determine the total contribution to the accumulator for the current processing cycle, the free bits (FED) are interpreted as follows: Since D is 1, bit D contributes 4 to the accumulator, since E is 0, bit E contributes 0, and since F is 1, bit F contributes 1. The total contribution is the sum of the contributions from the free bits plus the base contribution (6) for a total of 4+0+1+6 or 11. The contribution of 11 is added to the accumulator (which had been initialized to 0) (in step 3306) and the accumulator value of 11 is then written out to the output stream (in step 3308).

Since the bitstream pointer flag is set to 1, the input pointer (pin) is incremented (in step 3312) to ensure that the second bitstream byte will be read during the next processing cycle. Since the output pointer flag is set to 0, the output pointer (pOut) is incremented (in step 3316) to ensure that the next output signal will not overwrite the first output signal, and the accumulator is initialized to 0 (in step 3318).

The next state is set to MNeed2Code (in step 3320). Although the first Huffman-encoded signal in the bitstream was only 6 bits long, the lookup tables are preferably designed to interpret all or part of certain prefixes that occur at the end of bitstream bytes. Thus, in the example, the lookup tables are designed to recognize that the last two bits in the first bitstream byte is a complete 2-bit prefix. Rather than have a separate state that means "start looking for macroblock prefix at bit 6," the lookup tables take into account the different possible values for the last two bits and skip directly to the state for the beginning of the next byte (i.e., MNeed2Code).

During the second processing cycle, the initial state is MNeed2Code (see Table XII) and the next byte is read in from the bitstream and masked to the representation (ZZZZZZFE). The processing is repeated for these two free bits to generate a contribution to the accumulator of 2 which is written to the output stream. The output pointer is incremented and the accumulator is initialized, but the input pointer is not incremented. With a next state of MPrefixAt2, the second bitstream byte is used again during the third processing cycle.

Those skilled in the art will understand that the bits represented by Z's in Tables XII–XV indicate the masking implemented for each state. Masking off bits that are known to be insignificant for the calculation of the next code or code portion, reduces the total number of decoder rules needed. As a result, less memory is required to express the rules, thereby improving system performance by improving the behavior of the data cache on the CPU.

TABLE XII

Abstract Rules for Variable-Length Decoding.

| Byte Value | Current State | Next State | Base Contrib | Increment Bitstream Pointer | Signal Not Complete |
|---|---|---|---|---|---|
| XXXXXXF1 | MPrefixAt0 | MPrefixAt2 | 0 | 0 | 0 |
| XXXXFE10 | MPrefixAt0 | MprefixAt4 | 2 | 0 | 0 |
| X1FED100 | MPrefixAt0 | MPrefixAt6 | 6 | 0 | 0 |
| 10FED100 | MPrefixAt0 | MNeed2Code | 6 | 1 | 0 |
| 00FED100 | MPrefixAt0 | MGot2Prefix | 6 | 1 | 0 |
| fedcb000 | MPrefixAt0 | MPrefixAt0 | 14-1 | 1 | 0 |
| 00000000 | MPrefixAt0 | IllegalCode | 255 | 1 | 0 |
| 11111000 | MPrefixAt0 | BlkDataAt0 | 255 | 1 | 0 |
| XXXXF1ZZ | MPrefixAt2 | MPrefixAt4 | 0 | 0 | 0 |
| X1FE10ZZ | MPrefixAt2 | MPrefixAt6 | 2 | 0 | 0 |
| 10FE10ZZ | MPrefixAt2 | MNeed2Code | 2 | 1 | 0 |
| 00FE10ZZ | MPrefixAt2 | MGot2Prefix | 2 | 1 | 0 |
| FED100ZZ | MPrefixAt2 | MPrefixAt0 | 6 | 1 | 0 |
| dcb000ZZ | MPrefixAt2 | MNeed2Code | 14-3 | 1 | 1 |
| 000000ZZ | MPrefixAt2 | MNeed2Non0 | 0 | 1 | 1 |
| 111000ZZ | MPrefixAt2 | MNeed2Non1 | 28 | 1 | 1 |
| X1F1ZZZZ | MPrefixAt4 | MPrefixAt6 | 0 | 0 | 0 |
| 10F1ZZZZ | MPrefixAt4 | MNeed2Code | 0 | 1 | 0 |
| 00F1ZZZZ | MPrefixAt4 | MGot2Prefix | 0 | 1 | 0 |
| FE10ZZZZ | MPrefixAt4 | MPrefixAt0 | 2 | 1 | 0 |
| D100ZZZZ | MPrefixAt4 | MNeed2Code | 6-2 | 1 | 1 |
| 0000ZZZZ | MPrefixAt4 | MNeed4Non0 | 0 | 1 | 1 |
| 1000ZZZZ | MPrefixAt4 | MNeed4Non1 | 16 | 1 | 1 |
| F1ZZZZZZ | MPrefixAt6 | MPrefixAt0 | 0 | 1 | 0 |
| 10ZZZZZZ | MPrefixAt6 | MNeed2Code | 0 | 1 | 1 |

TABLE XII-continued

Abstract Rules for Variable-Length Decoding.

| Byte Value | Current State | Next State | Base Contrib | Increment Bitstream Pointer | Signal Not Complete |
|---|---|---|---|---|---|
| 00ZZZZZZ | MPrefixAt6 | MGot2Prefix | 0 | 1 | 1 |
| ZZXXFED1 | MGot2Prefix | MPrefixAt4 | 6 | 0 | 0 |
| ZZfedcb0 | MGot2Prefix | MPrefixAt6 | 14-1 | 0 | 0 |
| ZZ000000 | MGot2Prefix | IllegalCode | 255 | 1 | 0 |
| ZZ111110 | MGot2Prefix | BlkDataAt6 | 255 | 0 | 0 |
| ZZZZZZFE | MNeed2Code | MPrefixAt2 | 2 | 0 | 0 |
| ZZZZFEDC | MNeed4Code | MPrefixAt4 | 2 | 0 | 0 |

TABLE XIII

Abstract Rules for Variable-Length Decoding.

| Byte Value | Current State | Next State | Base Contrib | Increment Bitstream Pointer | Signal Not Complete |
|---|---|---|---|---|---|
| ZZZZZZfe | MNeed2Non0 | MPrefixAt2 | 14-1 | 0 | 0 |
| ZZZZZZ00 | MNeed2Non0 | IllegalCode | 255 | 0 | 0 |
| ZZZZZZfe | MNeed2Non1 | MPrefixAt2 | 14-1 | 0 | 0 |
| ZZZZZZ11 | MNeed2Non1 | BlkDataAt2 | 255-28 | 0 | 0 |
| ZZZZfedc | MNeed4Non0 | MPrefixAt4 | 14-1 | 0 | 0 |
| ZZZZ0000 | MNeed4Non0 | IllegalCode | 255 | 0 | 0 |
| ZZZZfedc | MNeed4Non1 | MPrefixAt4 | 14-1 | 0 | 0 |
| ZZZZ1111 | MNeed4Non1 | BlkDataAt4 | 255-16 | 0 | 0 |
| XYYYYYF1 | BPrefixAt0 | BPrefixAt2 | 0 | 0 | 0 |
| 000000F1 | BPrefixAt0 | BGot6Prefix | 0 | 1 | 0 |
| 100000F1 | BPrefixAt0 | BNeed6Code | 0 | 1 | 0 |
| XYYYFE10 | BPrefixAt0 | BPrefixAt4 | 2 | 0 | 0 |
| 0000FE10 | BPrefixAt0 | BGot4Prefix | 2 | 1 | 0 |
| 1000FE10 | BPrefixAt0 | BNeed4Code | 2 | 1 | 0 |
| X1FED100 | BPrefixAt0 | BPrefixAt6 | 6 | 0 | 0 |
| 00FED100 | BPrefixAt0 | BGot2Prefix | 6 | 1 | 0 |
| 10FED100 | BPrefixAt0 | BNeed2Code | 6 | 1 | 0 |
| FEDC1000 | BPrefixAt0 | BPrefixAt0 | 14 | 1 | 0 |
| DCB10000 | BPrefixAt0 | BNeed2Code | 30-2 | 1 | 1 |
| BA100000 | BPrefixAt0 | BNeed4Code | 62-14 | 1 | 1 |
| B1000000 | BPrefixAt0 | BNeed4Code | 126-14 | 1 | 1 |
| 10000000 | BPrefixAt0 | BNeed6Code | 206-62 | 1 | 1 |
| 00000000 | BPrefixAt0 | BGot8Prefix | 0 | 1 | 1 |
| XYYYF1ZZ | BPrefixAt2 | BPrefixAt4 | 0 | 0 | 0 |
| 0000F1ZZ | BPrefixAt2 | BGot4Prefix | 0 | 1 | 0 |
| 1000F1ZZ | BPrefixAt2 | BNeed4Code | 0 | 1 | 0 |
| X1FE10ZZ | BPrefixAt2 | BPrefixAt6 | 2 | 0 | 0 |
| 00FE10ZZ | BPrefixAt2 | BGot2Prefix | 2 | 1 | 0 |
| 10FE10ZZ | BPrefixAt2 | BNeed2Code | 2 | 1 | 0 |
| FED100ZZ | BPrefixAt2 | BPrefixAt0 | 6 | 1 | 0 |
| DC1000ZZ | BPrefixAt2 | BNeed2Code | 14-2 | 1 | 1 |
| B10000ZZ | BPrefixAt2 | BNeed4Code | 30-14 | 1 | 1 |
| 100000ZZ | BPrefixAt2 | BNeed6Code | 0 | 1 | 1 |
| 000000ZZ | BPrefixAt2 | BGot6Prefix | 0 | 1 | 1 |

TABLE XIV

Abstract Rules for Variable-Length Decoding.

| Byte Value | Current State | Next State | Base Contrib | Increment Bitstream Pointer | Signal Not Complete |
|---|---|---|---|---|---|
| X1F1ZZZZ | BPrefixAt4 | BPrefixAt6 | 0 | 0 | 0 |
| 00F1ZZZZ | BPrefixAt4 | BGot2Prefix | 0 | 1 | 0 |
| 10F1ZZZZ | BPrefixAt4 | BNeed2Code | 0 | 1 | 0 |

TABLE XIV-continued

Abstract Rules for Variable-Length Decoding.

| Byte Value | Current State | Next State | Base Contrib | Increment Bitstream Pointer | Signal Not Complete |
|---|---|---|---|---|---|
| FE10ZZZZ | BPrefixAt4 | BPrefixAt0 | 2 | 1 | 0 |
| D100ZZZZ | BPrefixAt4 | BNeed2Code | 6-2 | 1 | 1 |
| 1000ZZZZ | BPrefixAt4 | BNeed4Code | 0 | 1 | 1 |
| 0000ZZZZ | BPrefixAt4 | BGot4Prefix | 0 | 1 | 1 |
| F1ZZZZZZ | BPrefixAt6 | BPrefixAt0 | 0 | 1 | 0 |
| 10ZZZZZZ | BPrefixAt6 | BNeed2Code | 0 | 1 | 1 |
| 00ZZZZZZ | BPrefixAt6 | BGot2Prefix | 0 | 1 | 1 |
| XYYYFED1 | BGot2Prefix | BPrefixAt4 | 6 | 0 | 0 |
| 0000FED1 | BGot2Prefix | BGot4Prefix | 6 | 1 | 0 |
| 1000FED1 | BGot2Prefix | BNeed4Code | 6 | 1 | 0 |
| X1FEDC10 | BGot2Prefix | BPrefixAt6 | 14 | 0 | 0 |
| 00FEDC10 | BGot2Prefix | BGot2Prefix | 14 | 1 | 0 |
| 10FEDC10 | BGot2Prefix | BNeed2Code | 14 | 1 | 0 |
| FEDCB100 | BGot2Prefix | BPrefixAt0 | 30 | 1 | 0 |
| DCBA1000 | BGot2Prefix | BNeed2Code | 62-2 | 1 | 1 |
| DCB10000 | BGot2Prefix | BNeed2Code | 126-2 | 1 | 1 |
| BA100000 | BGot2Prefix | BNeed4Code | 206-14 | 1 | 1 |
| ba000000 | BGot2Prefix | BNeed4Code | 158-30 | 1 | 1 |
| 00000000 | BGot2Prefix | BEnd | 255 | 0 | 1 |
| ZZZZDCB1 | BGot4Prefix | BNeed2At4 | 30 | 0 | 1 |
| ZZZZBA10 | BGot4Prefix | BNeed4At4 | 62 | 0 | 1 |
| ZZZZB100 | BGot4Prefix | BNeed4At4 | 126 | 0 | 1 |
| ZZZZ1000 | BGot4Prefix | BNeed6At4 | 206 | 0 | 1 |
| ZZZZ0000 | BGot4Prefix | BGot8PAt4 | 0 | 0 | 1 |
| DCbaZZZZ | BGot8PAt4 | BNeed2Code | 158-18 | 1 | 1 |
| 0000ZZZZ | BGot8PAt4 | BEnd | 255 | 0 | 1 |
| ZZZZDCB1 | BGot6Prefix | BNeed2At4 | 126 | 0 | 1 |
| ZZZZBA10 | BGot6Prefix | BNeed4At4 | 206 | 0 | 1 |
| ZZZZba00 | BGot6Prefix | BNeed4At4 | 158-16 | 0 | 1 |
| ZZZZ0000 | BGot6Prefix | BEnd | 255 | 0 | 1 |

TABLE XV

Abstract Rules for Variable-Length Decoding.

| Byte Value | Current State | Next State | Base Contrib | Increment Bitstream Pointer | Signal Not Complete |
|---|---|---|---|---|---|
| ZZZZZZYY | BGot8Prefix | BNeed6Code | 158-78 | 0 | 1 |
| ZZZZZZ00 | BGot8Prefix | BEnd | 255 | 0 | 1 |
| ZZZZZZFE | BNeed2Code | BPrefixAt2 | 2 | 0 | 0 |
| ZZZZFEDC | BNeed4Code | BPrefixAt4 | 14 | 0 | 0 |
| ZZFEDCBA | BNeed6Code | BPrefixAt6 | 62 | 0 | 0 |
| X1FEZZZZ | BNeed2At4 | BPrefixAt6 | 0 | 0 | 0 |
| 00FEZZZZ | BNeed2At4 | BGot2Prefix | 0 | 1 | 0 |
| 10FEZZZZ | BNeed2At4 | BNeed2Code | 0 | 1 | 0 |
| FEDCZZZZ | BNeed4At4 | BPrefixAt0 | 0 | 1 | 0 |
| DCBAZZZZ | BNeed6At4 | BNeed2Code | 0xFE | 1 | 1 |
| ZZZZZZZZ | BlkDataAt0 | BPrefixAt0 | 0 | 0 | 1 |
| ZZZZZZZZ | BlkDataAt2 | BPrefixAt2 | 0 | 0 | 1 |
| ZZZZZZZZ | BlkDataAt4 | BPrefixAt4 | 0 | 0 | 1 |
| ZZZZZZZZ | BlkDataAt6 | BPrefixAt6 | 0 | 0 | 1 |

Generation of Quantization Matrices

The procedure for generating the 32 quantization matrices (Qmatrix[2][16][8][8]) from the two base matrices (Base[2][8][8]), the five quantization parameters (QuantStart, QuantStep, DCstep, Tilt[0], and Tilt[1]), and the PowersOf2 flag is specified by the following C computer language code:

```
for (k=0; k<2; k++)          \\ for each of inter, intra base matrices
{
    \\ Apply tilt to base matrix
    for (j=0; j<8; j++)
        for (i=0; i<8; i++)
            Base [k] [j] [i] = (Base [k] [j] [i] *
                        (32 + (i+j)*(Tilt [k] -32)/32))/32;
    \\ Generate the 16 quantization matrices of this type
    for (m=0; m<16; m++)
    {
```

-continued

```
    for (j=0; j<8; j++)
    {
        for (i=0; i<8; i++)
        {
            if (i==0 && j==0 && k==1)
                s = DCstep;
            else
                s = QuantStep;
            q = (Base [k] [j] [i] *
                (QuantStart + ((s*m)>>2))) >> 6;
            if (q<2) q=2;
            if (q>127) q=127;
            if (PowersOf2)
                q = Round2 [q];
            else
                q = q >> 1;
            Qmatrix [k] [m] [j] [i]= q;
        }
    }
  }
}
```

where Round2[] is a lookup table that divides by two and rounds to the nearest power of two, as follows:

```
Round2[] =
{
        0,  0,  1,  2,  2,  2,  4,  4,
        4,  4,  4,  4,  8,  8,  8,  8,
        8,  8,  8,  8,  8,  8,  8, 16,
       16, 16, 16, 16, 16, 16, 16, 16,
       16, 16, 16, 16, 16, 16, 16, 16,
       16, 16, 16, 16, 16, 16, 32, 32,
       32, 32, 32, 32, 32, 32, 32, 32,
       32, 32, 32, 32, 32, 32, 32, 32,
       32, 32, 32, 32, 32, 32, 32, 32,
       32, 32, 32, 32, 32, 32, 32, 32,
       32, 32, 32, 32, 32, 32, 32, 32,
       32, 32, 32, 64, 64, 64, 64, 64,
       64, 64, 64, 64, 64, 64, 64, 64,
       64, 64, 64, 64, 64, 64, 64, 64,
       64, 64, 64, 64, 64, 64, 64, 64,
       64, 64, 64, 64, 64, 64, 64, 64
};
```

The encoder may use the PowersOf2 option to make the compressed video bitstream easier to encode and decode, since, when the PowersOf2 flag is 1, all quantization and dequantization may be implemented with bit shifts.

The Tilt[] parameters tilt the main diagonal of the base matrices, thus changing how heavily or lightly high-frequency coefficients are quantized, relative to low-frequency coefficients. A tilt value of 32 applies no tilt, and leaves the base matrix unchanged. Tilt values less than 32 decrease high-frequency quantization, and tilt values greater than 32 increase high-frequency quantization.

Once the base matrices have been tilted, the 16 quantization matrices of each type are computed as multiples of the base matrix. The QuantStart and QuantStep parameters provide control over both the absolute multiplier as well as the "spread" between the 16 matrices. The DC term in the intra matrices has a separate DCstep parameter since its value may need to be spread differently from the rest of the terms.

The default values for the five quantization parameters are as follows:

| | |
|---|---|
| QuantStart | = 30 |
| QuantStep | = 36 |
| DCstep | = 8 |
| Tilt [0] = Tilt [1] | = 32 |
| PowersOf2 | = 1 |

The default values for the inter and intra base matrices are as follows:

| | | | | | | | | |
|---|---|---|---|---|---|---|---|---|
| Inter: | 8 | 8 | 8 | 8 | 9 | 9 | 10 | 10 |
| | 8 | 8 | 8 | 9 | 9 | 10 | 10 | 11 |
| | 8 | 8 | 8 | 9 | 10 | 11 | 11 | 12 |
| | 8 | 9 | 9 | 10 | 10 | 11 | 12 | 13 |
| | 9 | 9 | 10 | 10 | 11 | 12 | 12 | 14 |
| | 9 | 10 | 11 | 11 | 11 | 12 | 13 | 15 |
| | 10 | 10 | 11 | 12 | 13 | 13 | 14 | 15 |
| | 10 | 11 | 12 | 13 | 14 | 15 | 15 | 16 |
| Intra: | 6 | 8 | 9 | 11 | 13 | 13 | 14 | 17 |
| | 8 | 8 | 11 | 12 | 13 | 14 | 17 | 18 |
| | 9 | 11 | 13 | 13 | 14 | 17 | 17 | 19 |
| | 11 | 11 | 13 | 13 | 14 | 17 | 18 | 20 |
| | 11 | 13 | 13 | 14 | 16 | 17 | 20 | 24 |
| | 13 | 13 | 14 | 16 | 17 | 20 | 24 | 29 |
| | 13 | 13 | 14 | 17 | 19 | 23 | 28 | 34 |
| | 13 | 14 | 17 | 19 | 23 | 28 | 34 | 41 |

It will be further understood that various changes in the details, materials, and arrangements of the parts which have been described and illustrated in order to explain the nature of this invention may be made by those skilled in the art without departing from the principle and scope of the invention as expressed in the following claims.

What is claimed is:

1. A computer-implemented process for encoding video signals comprising a plurality of video frames, comprising the steps of:

(a) segmenting each video frame of the plurality of video frames into one or more slices;

(b) segmenting each slice into one or more macroblocks;

(c) segmenting each macroblock into one or more blocks;

(d) generating encoded macroblock signals corresponding to macroblock information of each slice;

(e) generating encoded block signals corresponding to block information of each slice; and (f) generating an encoded bitstream in accordance with the encoded macroblock signals and the encoded block signals, wherein all of the macroblock signals for each slice precede all of the block signals for each slice.

2. The process of claim 1, wherein:

each video frame comprises a Y component plane, a U component plane, and a V component plane;

step (a) comprises the step of segmenting each of the component planes into one or more slices;

each macroblock comprises a (16×16) block of component signals; and each block comprises an (8×8) block of component signals.

3. The process of claim 2, wherein:

for each video frame, the encoded bitstream comprises a frame header signal, followed by one or more slice signals; and each slice signal comprises a slice header signal, followed by one or more macroblock signals, followed by one or more block signals.

4. The process of claim 3, wherein:

each frame header signal comprises:

a picture start code signal;

a version number signal;

an image size signal;

a temporal filter strength signal;

a quantization matrices signal;

an intra flag signal;

a frame number signal;

an optional image X size signal;

an optional image Y size signal, wherein the presence of the optional image X size signal and the optional image Y size signal depend upon the value of the image size signal; and an optional quantization data signal, wherein the presence of the optional quantization data signal depends upon the value of the quantization matrices signal;

each slice header signal comprises:

a slice start code signal;

a slice start signal; and a slice size signal;

the macroblock signals for each slice comprise one or more macroblock records;

each macroblock record comprises:

one or more empty macroblock signals;

a macroblock type signal;

an optional macroblock quantization value signal;

an optional macroblock motion vector signal; and an optional macroblock coded block pattern signal, wherein the presence of each of the three optional macroblock signals depends upon the value of the macroblock type signal; and the block signals for each slice comprise one or more run-val pairs.

5. The process of claim 4, wherein:

the picture start code signal comprises an 18-bit PictureStartCode signal;

the version number signal comprises a 4-bit VersionNumber signal;

the image size signal comprises a 2-bit ImageSize signal;

the temporal filter strength signal comprises a 2-bit TempFiltStrength signal;

the quantization matrices signal comprises a 3-bit QuantMatrices signal;

the intra flag signal comprises a 1-bit IntraFlag signal;

the frame number signal comprises a 10-bit FrameNumber signal;

the optional image X size signal comprises a 16-bit ImageXSize signal;

the optional image Y size signal comprises a 16-bit ImageYSize signal;

the optional quantization data signal comprises:

a 6-bit QuantStart signal;

a 6-bit QuantStep signal;

a 6-bit DCstep signal;

a 6-bit Tilt[0] signal;

a 6-bit Tilt[1] signal;

a 1-bit PowersOf2 signal;

an optional 384-bit Inter Base Matrix; and an optional 384-bit Intra Base Matrix, wherein the presence of the optional Inter Base Matrix and the optional Intra Base Matrix depend upon the value of the QuantMatrices signal;

the slice start code signal comprises an 18-bit SliceStartCode signal;

the slice start signal comprises a 6-bit SliceStart signal;

the slice size signal comprises a 6-bit SliceSize signal;

the one or more empty macroblock signals comprise one or more Huffman-encoded Empty signals;

the macroblock type signal comprises a Huffman-encoded Type signal;

the optional macroblock quantization value signal comprises a Huffman-encoded QValue signal;

the optional macroblock motion vector signal comprises a Huffman-encoded MV signal;

the optional macroblock coded block pattern signal comprises a Huffman-encoded CBP signal; and each run-val pair comprises one or more Huffman-encoded signals.

6. The process of claim 1, wherein:

step (d) comprises the step of generating the encoded macroblock signals using a single first Huffman codebook; and step (e) comprises the step of generating the encoded block signals using a single second Huffman codebook.

7. An apparatus for encoding video signals comprising a plurality of video frames, comprising:

(a) means for segmenting each video frame of the plurality of video frames into one or more slices;

(b) mean for segmenting each slice into one or more macroblocks;

(c) means for segmenting each macroblock into one or more blocks;

(d) means for generating encoded macroblock signals corresponding to macroblock information of each slice;

(e) means for generating encoded block signals corresponding to block information of each slice; and (f) means for generating an encoded bitstream in accordance with the encoded macroblock signals and the encoded block signals, wherein all of the macroblock signals for each slice precede all of the block signals for each slice.

8. The apparatus of claim 7, wherein:

each video frame comprises a Y component plane, a U component plane, and a V component plane;

means (a) comprises means for segmenting each of the component planes into one or more slices;

each macroblock comprises a (16×16) block of component signals; and each block comprises an (8×8) block of component signals.

9. The apparatus of claim 8, wherein:

for each video frame, the encoded bitstream comprises a frame header signal, followed by one or more slice signals; and each slice signal comprises a slice header signal, followed by one or more macroblock signals, followed by one or more block signals.

10. The apparatus of claim 9, wherein:

each frame header signal comprises:

a picture start code signal;

a version number signal;

an image size signal;

a temporal filter strength signal;

a quantization matrices signal;

an intra flag signal;

a frame number signal;

an optional image X size signal;

an optional image Y size signal, wherein the presence of the optional image X size signal and the optional image Y size signal depend upon the value of the image size signal; and.

an optional quantization data signal, wherein the presence of the optional quantization data signal depends upon the value of the quantization matrices signal;

each slice header signal comprises:

a slice start code signal;

a slice start signal; and a slice size signal;

an optional macroblock coded block pattern signal, wherein the presence of each of the three optional macroblock signals depends upon the value of the macroblock type signal; and the block signals for each slice comprise one or more run-val pairs.

19. The system of claim 18, wherein:

the picture start code signal comprises an 18-bit PictureStartCode signal;

the version number signal comprises a 4-bit VersionNumber signal;

the image size signal comprises a 2-bit ImageSize signal;

the temporal filter strength signal comprises a 2-bit TempFiltStrength signal;

the quantization matrices signal comprises a 3-bit QuantMatrices signal;

the intra flag signal comprises a 1-bit IntraFlag signal;

the frame number signal comprises a 10-bit FrameNumber signal;

the optional image X size signal comprises a 16-bit ImageXSize signal;

the optional image Y size signal comprises a 16-bit ImageYSize signal;

the optional quantization data signal comprises:

a 6-bit QuantStart signal;

a 6-bit QuantStep signal;

a 6-bit DCstep signal;

a 6-bit Tilt[0] signal;

a 6-bit Tilt[1] signal;

a 1-bit PowersOf2 signal;

an optional 384-bit Inter Base Matrix; and an optional 384-bit Intra Base Matrix, wherein the presence of the optional Inter Base Matrix and the optional Intra Base Matrix depend upon the value of the QuantMatrices signal;

the slice start code signal comprises an 18-bit SliceStartCode signal;

the slice start signal comprises a 6-bit SliceStart signal;

the slice size signal comprises a 6-bit SliceSize signal;

the one or more empty macroblock signals comprise one or more Huffman-encoded Empty signals;

the macroblock type signal comprises a Huffman-encoded Type signal;

the optional macroblock quantization value signal comprises a Huffman-encoded QValue signal;

the optional macroblock motion vector signal comprises a Huffman-encoded MV signal;

the optional macroblock coded block pattern signal comprises a Huffman-encoded CBP signal; and each run-val pair comprises one or more Huffman-encoded signals.

20. The system of claim 15, wherein:

the conferencing system generates the encoded macroblock signals using a single first Huffman codebook; and the conferencing system generates the encoded block signals using a single second Huffman codebook.

21. The system of claim 15, wherein the conferencing system comprises:

(1) a host processor; and (2) a video board, wherein:

the video board receives the unencoded video signals from the video source and generates the encoded bitstream; and the host processor controls the operations of the video board.

22. The system of claim 21, wherein the video board comprises:

a video analog-to-digital converter for receiving unencoded analog video signals from the video source and for generating unencoded digital video signals;

a video capture module for capturing the unencoded digital video signals and generating unencoded captured video signals;

a memory device for storing the unencoded captured video signals;

a pixel processor for generating the encoded bitstream from the unencoded captured video signals and storing the encoded bitstream in the memory device; and a bus interface for transmitting the encoded bitstream to the host processor.

23. A computer-implemented process for decoding video signals, comprising the steps of:

(a) receiving an encoded bitstream corresponding to a plurality of video frames, wherein:

a portion of the encoded bitstream corresponding to each video frame of the plurality of video frames corresponds to one or more slices; and a portion of the encoded bitstream corresponding to each slice comprises encoded macroblock signals for the entire slice followed by block signals for the entire slice;

(b) decoding the macroblock signals of each of the slices of each of the video frames;

(c) decoding the blocks signals of each of the slices of each of the video frames; and (d) generating decoded video signals in accordance with the decoded macroblock signals and the decoded block signals.

24. The process of claim 23, wherein:

the portion of the encoded bitstream corresponding to each video frame corresponds to a Y component plane, a U component plane, and a V component plane;

a portion of the encoded bitstream corresponding to each component plane comprises one or more slice signals, each slice signal corresponding to a slice of the component plane; and each slice signal corresponds to one or more macroblocks, each macroblock comprising four (8×8) blocks of component signals.

25. The process of claim 24, wherein:

for each video frame, the encoded bitstream comprises a frame header signal, followed by one or more slice signals; and each slice signal comprises a slice header signal, followed by one or more macroblock signals, followed by one or more block signals.

26. The process of claim 25, wherein:

each frame header signal comprises:

a picture start code signal;

a version number signal;

an image size signal;

a temporal filter strength signal;

a quantization matrices signal;

an intra flag signal;

a frame number signal;

an optional image X size signal;

an optional image Y size signal, wherein the presence of the optional image X size signal and the optional image Y size signal depend upon the value of the image size signal; and the macroblock signals for each slice comprise one or more macroblock records;

each macroblock record comprises:

one or more empty macroblock signals;

a macroblock type signal;

an optional macroblock quantization value signal;

an optional macroblock motion vector signal; and an optional macroblock coded block pattern signal, wherein the presence of each of the three optional macroblock signals depends upon the value of the macroblock type signal; and the block signals for each slice comprise one or more run-val pairs.

11. The apparatus of claim 10, wherein:

the picture start code signal comprises an 18-bit PictureStartCode signal;

the version number signal comprises a 4-bit VersionNumber signal;

the image size signal comprises a 2-bit ImageSize signal;

the temporal filter strength signal comprises a 2-bit TempFiltStrength signal;

the quantization matrices signal comprises a 3-bit QuantMatrices signal;

the intra flag signal comprises a 1-bit IntraFlag signal;

the frame number signal comprises a 10-bit FrameNumber signal;

the optional image X size signal comprises a 16-bit ImageXSize signal;

the optional image Y size signal comprises a 16-bit ImageYSize signal;

the optional quantization data signal comprises:

a 6-bit QuantStart signal;

a 6-bit QuantStep signal;

a 6-bit DCstep signal;

a 6-bit Tilt[0] signal;

a 6-bit Tilt[1] signal;

a 1-bit PowersOf2 signal;

an optional 384-bit Inter Base Matrix; and an optional 384-bit Intra Base Matrix, wherein the presence of the optional Inter Base Matrix and the optional Intra Base Matrix depend upon the value of the QuantMatrices signal;

the slice start code signal comprises an 18-bit SliceStartCode signal;

the slice start signal comprises a 6-bit SliceStart signal;

the slice size signal comprises a 6-bit SliceSize signal;

the one or more empty macroblock signals comprise one or more Huffman-encoded Empty signals;

the macroblock type signal comprises a Huffman-encoded Type signal;

the optional macroblock quantization value signal comprises a Huffman-encoded QValue signal;

the optional macroblock motion vector signal comprises a Huffman-encoded MV signal;

the optional macroblock coded block pattern signal comprises a Huffman-encoded CBP signal; and each run-val pair comprises one or more Huffman-encoded signals.

12. The apparatus of claim 7, wherein:

means (d) comprises means for generating the encoded macroblock signals using a single first Huffman codebook; and means (e) comprises means for generating the encoded block signals using a single second Huffman codebook.

13. The apparatus of claim 7, wherein the apparatus comprises a pixel processor.

14. The apparatus of claim 7, wherein the apparatus comprises a host processor.

15. A system for encoding video signals, comprising:

(a) a video source for providing unencoded video signals comprising a plurality of video frames;

(b) a conferencing system for:

(1) segmenting each video frame of the plurality of video frames into one or more slices;

(2) segmenting each slice into one or more macroblocks;

(3) segmenting each macroblock into one or more blocks;

(4) generating encoded macroblock signals corresponding to macroblock information of each slice;

(5) generating encoded block signals corresponding to block information of each slice; and (6) generating an encoded bitstream in accordance with the encoded macroblock signals and the encoded block signals, wherein all of the macroblock signals for each slice precede all of the block signals for each slice.

16. The system of claim 15, wherein:

each video frame comprises a Y component plane, a U component plane, and a V component plane;

the conferencing system segments each of the component planes into one or more slices;

each macroblock comprises a (16×16) block of component signals; and each block comprises an (8×8) block of component signals.

17. The system of claim 16, wherein:

for each video frame, the encoded bitstream comprises a frame header signal, followed by one or more slice signals; and each slice signal comprises a slice header signal, followed by one or more macroblock signals, followed by one or more block signals.

18. The system of claim 17, wherein:

each frame header signal comprises:

a picture start code signal;

a version number signal;

an image size signal;

a temporal filter strength signal;

a quantization matrices signal;

an intra flag signal;

a frame number signal;

an optional image X size signal;

an optional image Y size signal, wherein the presence of the optional image X size signal and the optional image Y size signal depend upon the value of the image size signal; and an optional quantization data signal, wherein the presence of the optional quantization data signal depends upon the value of the quantization matrices signal;

each slice header signal comprises:

a slice start code signal;

a slice start signal; and a slice size signal;

the macroblock signals for each slice comprise one or more macroblock records;

each macroblock record comprises:

one or more empty macroblock signals;

a macroblock type signal;

an optional macroblock quantization value signal;

an optional macroblock motion vector signal; and an optional quantization data signal, wherein the presence of the optional quantization data signal depends upon the value of the quantization matrices signal;

each slice header signal comprises:

a slice start code signal;

a slice start signal; and a slice size signal;

the macroblock signals for each slice comprise one or more macroblock records;

each macroblock record comprises:

one or more empty macroblock signals;

a macroblock type signal;

an optional macroblock quantization value signal;

an optional macroblock motion vector signal; and an optional macroblock coded block pattern signal, wherein the presence of each of the three optional macroblock signals depends upon the value of the macroblock type signal; and the block signals for each slice comprise one or more run-val pairs.

27. The process of claim 26, wherein:

the picture start code signal comprises an 18-bit PictureStartCode signal;

the version number signal comprises a 4-bit VersionNumber signal;

the image size signal comprises a 2-bit ImageSize signal;

the temporal filter strength signal comprises a 2-bit TempFiltStrength signal;

the quantization matrices signal comprises a 3-bit QuantMatrices signal;

the intra flag signal comprises a 1-bit IntraFlag signal;

the frame number signal comprises a 10-bit FrameNumber signal;

the optional image X size signal comprises a 16-bit ImageXSize signal;

the optional image Y size signal comprises a 16-bit ImageYSize signal;

the optional quantization data signal comprises:

a 6-bit QuantStart signal;

a 6-bit QuantStep signal;

a 6-bit DCstep signal;

a 6-bit Tilt[0] signal;

a 6-bit Tilt[1] signal;

a 1-bit PowersOf2 signal;

an optional 384-bit Inter Base Matrix; and an optional 384-bit Intra Base Matrix, wherein the presence of the optional Inter Base Matrix and the optional Intra Base Matrix depend upon the value of the QuantMatrices signal;

the slice start code signal comprises an 18-bit SliceStartCode signal;

the slice start signal comprises a 6-bit SliceStart signal;

the slice size signal comprises a 6-bit SliceSize signal;

the one or more empty macroblock signals comprise one or more Huffman-encoded Empty signals;

the macroblock type signal comprises a Huffman-encoded Type signal;

the optional macroblock quantization value signal comprises a Huffman-encoded QValue signal;

the optional macroblock motion vector signal comprises a Huffman-encoded MV signal;

the optional macroblock coded block pattern signal comprises a Huffman-encoded CBP signal; and each run-val pair comprises one or more Huffman-encoded signals.

28. The process of claim 23, wherein:

step (b) comprises the step of decoding the encoded macroblock signals using a single first Huffman codebook; and step (c) comprises the step of decoding the encoded block signals using a single second Huffman codebook.

29. An apparatus for decoding video signals, comprising:

(a) means for receiving an encoded bitstream corresponding to a plurality of video frames, wherein:

a portion of the encoded bitstream corresponding to each video frame of the plurality of video frames corresponds to one or more slices; and a portion of the encoded bitstream corresponding to each slice comprises encoded macroblock signals for the entire slice followed by block signals for the entire slice;

(b) means for decoding the macroblock signals of each of the slices of each of the video frames;

(c) means for decoding the blocks signals of each of the slices of each of the video frames; and (d) means for generating decoded video signals in accordance with the decoded macroblock signals and the decoded block signals.

30. The apparatus of claim 29, wherein:

the portion of the encoded bitstream corresponding to each video frame corresponds to a Y component plane, a U component plane, and a V component plane;

a portion of the encoded bitstream corresponding to each component plane comprises one or more slice signals, each slice signal corresponding to a slice of the component plane; and each slice signal corresponds to one or more macroblocks, each macroblock comprising four (8×8) blocks of component signals.

31. The apparatus of claim 30, wherein:

for each video frame, the encoded bitstream comprises a frame header signal, followed by one or more slice signals; and each slice signal comprises a slice header signal, followed by one or more macroblock signals, followed by one or more block signals.

32. The apparatus of claim 31, wherein:

each frame header signal comprises:

a picture start code signal;

a version number signal;

an image size signal;

a temporal filter strength signal;

a quantization matrices signal;

an intra flag signal;

a frame number signal;

an optional image X size signal;

an optional image Y size signal, wherein the presence of the optional image X size signal and the optional image Y size signal depend upon the value of the image size signal; and an optional quantization data signal, wherein the presence of the optional quantization data signal depends upon the value of the quantization matrices signal;

each slice header signal comprises:

a slice start code signal;

a slice start signal; and a slice size signal;

the macroblock signals for each slice comprise one or more macroblock records;

each macroblock record comprises:

one or more empty macroblock signals;

a macroblock type signal;

an optional macroblock quantization value signal;

an optional macroblock motion vector signal; and an optional macroblock coded block pattern signal, wherein the presence of each of the three optional macroblock signals depends upon the value of the macroblock type signal; and the block signals for each slice comprise one or more run-val pairs.

33. The apparatus of claim 32, wherein:

the picture start code signal comprises an 18-bit PictureStartCode signal;

the version number signal comprises a 4-bit VersionNumber signal;

the image size signal comprises a 2-bit ImageSize signal;

the temporal filter strength signal comprises a 2-bit TempFiltStrength signal;

the quantization matrices signal comprises a 3-bit QuantMatrices signal;

the intra flag signal comprises a 1-bit IntraFlag signal;

the frame number signal comprises a 10-bit FrameNumber signal;

the optional image X size signal comprises a 16-bit ImageXSize signal;

the optional image Y size signal comprises a 16-bit ImageYSize signal;

the optional quantization data signal comprises:

a 6-bit QuantStart signal;

a 6-bit QuantStep signal;

a 6-bit DCstep signal;

a 6-bit Tilt[0] signal;

a 6-bit Tilt[1] signal;

a 1-bit PowersOf2 signal;

an optional 384-bit Inter Base Matrix; and an optional 384-bit Intra Base Matrix, wherein the presence of the optional Inter Base Matrix and the optional Intra Base Matrix depend upon the value of the QuantMatrices signal;

the slice start code signal comprises an 18-bit SliceStartCode signal;

the slice start signal comprises a 6-bit SliceStart signal;

the slice size signal comprises a 6-bit SliceSize signal;

the one or more empty macroblock signals comprise one or more Huffman-encoded Empty signals;

the macroblock type signal comprises a Huffman-encoded Type signal;

the optional macroblock quantization value signal comprises a Huffman-encoded QValue signal;

the optional macroblock motion vector signal comprises a Huffman-encoded MV signal;

the optional macroblock coded block pattern signal comprises a Huffman-encoded CBP signal; and each run-val pair comprises one or more Huffman-encoded signals.

34. The apparatus of claim 29, wherein:

means (b) comprises means for decoding the encoded macroblock signals using a single first Huffman codebook; and means (c) comprises means for decoding the encoded block signals using a single second Huffman codebook.

35. The apparatus of claim 29, wherein the apparatus comprises a pixel processor.

36. The apparatus of claim 29, wherein the apparatus comprises a host processor.

37. A system for decoding video signals, comprising the steps of:

(a) a monitor; and (b) a conferencing system for:

(1) receiving an encoded bitstream corresponding to a plurality of video frames, wherein:

a portion of the encoded bitstream corresponding to each video frame of the plurality of video frames corresponds to one or more slices; and a portion of the encoded bitstream corresponding to each slice comprises encoded macroblock signals for the entire slice followed by block signals for the entire slice;

(2) decoding the macroblock signals of each of the slices of each of the video frames;

(3) decoding the blocks signals of each of the slices of each of the video frames;

(4) generating decoded video signals in accordance with the decoded macroblock signals and the decoded block signals; and (5) transmitting the decoded video signals to the monitor for display.

38. The system of claim 37, wherein:

the portion of the encoded bitstream corresponding to each video frame corresponds to a Y component plane, a U component plane, and a V component plane;

a portion of the encoded bitstream corresponding to each component plane comprises one or more slice signals, each slice signal corresponding to a slice of the component plane; and each slice signal corresponds to one or more macroblocks, each macroblock comprising four (8×8) blocks of component signals.

39. The system of claim 38, wherein:

for each video frame, the encoded bitstream comprises a frame header signal, followed by one or more slice signals; and each slice signal comprises a slice header signal, followed by one or more macroblock signals, followed by one or more block signals.

40. The system of claim 39, wherein:

each frame header signal comprises:

a picture start code signal;

a version number signal;

an image size signal;

a temporal filter strength signal;

a quantization matrices signal;

an intra flag signal;

a frame number signal;

an optional image X size signal;

an optional image Y size signal, wherein the presence of the optional image X size signal and the optional image Y size signal depend upon the value of the image size signal; and an optional quantization data signal, wherein the presence of the optional quantization data signal depends upon the value of the quantization matrices signal;

each slice header signal comprises:

a slice start code signal;

a slice start signal; and a slice size signal;

the macroblock signals for each slice comprise one or more macroblock records;

each macroblock record comprises:

one or more empty macroblock signals;

a macroblock type signal;

an optional macroblock quantization value signal;

an optional macroblock motion vector signal; and an optional macroblock coded block pattern signal, wherein the presence of each of the three optional macroblock signals depends upon the value of the macroblock type signal; and the block signals for each slice comprise one or more run-val pairs.

41. The system of claim 40, wherein:

the picture start code signal comprises an 18-bit PictureStartCode signal;

the version number signal comprises a 4-bit VersionNumber signal;

the image size signal comprises a 2-bit ImageSize signal;

the temporal filter strength signal comprises a 2-bit TempFiltStrength signal;

the quantization matrices signal comprises a 3-bit QuantMatrices signal;

the intra flag signal comprises a 1-bit IntraFlag signal;

the frame number signal comprises a 10-bit FrameNumber signal;

the optional image X size signal comprises a 16-bit ImageXSize signal;

the optional image Y size signal comprises a 16-bit ImageYSize signal;

the optional quantization data signal comprises:

a 6-bit QuantStart signal;

a 6-bit QuantStep signal;

a 6-bit DCstep signal;

a 6-bit Tilt[0] signal;

a 6-bit Tilt[1] signal;

a 1-bit PowersOf2 signal;

an optional 384-bit Inter Base Matrix; and an optional 384-bit Intra Base Matrix, wherein the presence of the optional Inter Base Matrix and the optional Intra Base Matrix depend upon the value of the QuantMatrices signal;

the slice start code signal comprises an 18-bit SliceStartCode signal;

the slice start signal comprises a 6-bit SliceStart signal;

the slice size signal comprises a 6-bit SliceSize signal;

the one or more empty macroblock signals comprise one or more Huffman-encoded Empty signals;

the macroblock type signal comprises a Huffman-encoded Type signal;

the optional macroblock quantization value signal comprises a Huffman-encoded QValue signal;

the optional macroblock motion vector signal comprises a Huffman-encoded MV signal;

the optional macroblock coded block pattern signal comprises a Huffman-encoded CBP signal; and each run-val pair comprises one or more Huffman-encoded signals.

42. The system of claim 37, wherein:

the conferencing system decodes the encoded macroblock signals using a single first Huffman codebook; and the conferencing system decodes the encoded block signals using a single second Huffman codebook.

43. The system of claim 37, wherein the conferencing system comprises a host processor for decoding the encoded bitstream to generate the decoded video signals.

* * * * *

UNITED STATES PATENT AND TRADEMARK OFFICE

CERTIFICATE OF CORRECTION

PATENT NO. : 5,493,514

DATED : February 20, 1996

INVENTOR(S) : Michael Keith and Brian Nickerson

It is certified that error appears in the above-identified patent and that said Letters Patent is hereby corrected as shown below:

Column 14, line 55 (equation 7), delete "$C_b^3(i-1)$" and insert therefore --$C_b^e(i-1)$--.

Signed and Sealed this

Thirty-first Day of December, 1996

Attest:

BRUCE LEHMAN

*Attesting Officer* *Commissioner of Patents and Trademarks*